United States Patent
Uto et al.

(10) Patent No.: US 7,104,516 B2
(45) Date of Patent: Sep. 12, 2006

(54) ELECTRONIC EQUIPMENT MOUNTING ANGLE VARYING APPARATUS

(75) Inventors: Yoshihiro Uto, Akishima (JP); Shinichi Yoshida, Hachiouji (JP); Tsutomu Hoshino, Otsuki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 556 days.

(21) Appl. No.: 10/038,834

(22) Filed: Jan. 8, 2002

(65) Prior Publication Data

US 2002/0088918 A1    Jul. 11, 2002

(30) Foreign Application Priority Data

Jan. 10, 2001   (JP)   ............................. 2001-002808
Jun. 25, 2001   (JP)   ............................. 2001-191410

(51) Int. Cl.
*F16M 11/00*   (2006.01)

(52) U.S. Cl. ...................... 248/688; 248/456

(58) Field of Classification Search ................ 248/688, 248/685, 126, 371, 454, 455, 456, 676, 677, 248/923; 379/454, 435

See application file for complete search history.

(56) References Cited

U.S. PATENT DOCUMENTS

| 4,259,568 | A | * | 3/1981 | Dynesen |
| 4,568,801 | A | | 2/1986 | Gates et al. |
| 4,624,433 | A | * | 11/1986 | Henneberg .................. 248/346 |
| 4,741,033 | A | | 4/1988 | Utoh et al. |
| 4,776,553 | A | * | 10/1988 | Kobayashi .................. 248/558 |
| 5,141,196 | A | | 8/1992 | Arnold et al. |
| 5,633,782 | A | | 5/1997 | Goodman et al. |
| 5,823,504 | A | | 10/1998 | Kuwajima |
| 5,915,661 | A | | 6/1999 | Silverman et al. |
| 6,045,108 | A | * | 4/2000 | Cziraky ...................... 248/454 |

FOREIGN PATENT DOCUMENTS

| JP | 64-13839 | | 1/1989 |
| JP | 1-174973 | | 12/1989 |
| JP | 9-326853 | * | 6/1996 |
| JP | 2002-094633 | | 3/2002 |

* cited by examiner

*Primary Examiner*—Ramon O Ramirez
(74) *Attorney, Agent, or Firm*—Finnegan, Henderson, Farabow, Garrett & Dunner, L.L.P.

(57) ABSTRACT

An electronic equipment mounting angle varying apparatus comprises a base member mounted at a place where electronic equipment is installed; a mounting member on which the electronic equipment is mounted, and which is supported by the base member so as to freely swing about a horizontal base support shaft axis; and an arm member supported by the mounting member so as to freely swing about a mounting member support shaft axis extending horizontally, which sets mounting angle of the electronic equipment by being latched by the base member, whereby the electronic equipment is mounted at a prescribed angle.

12 Claims, 46 Drawing Sheets

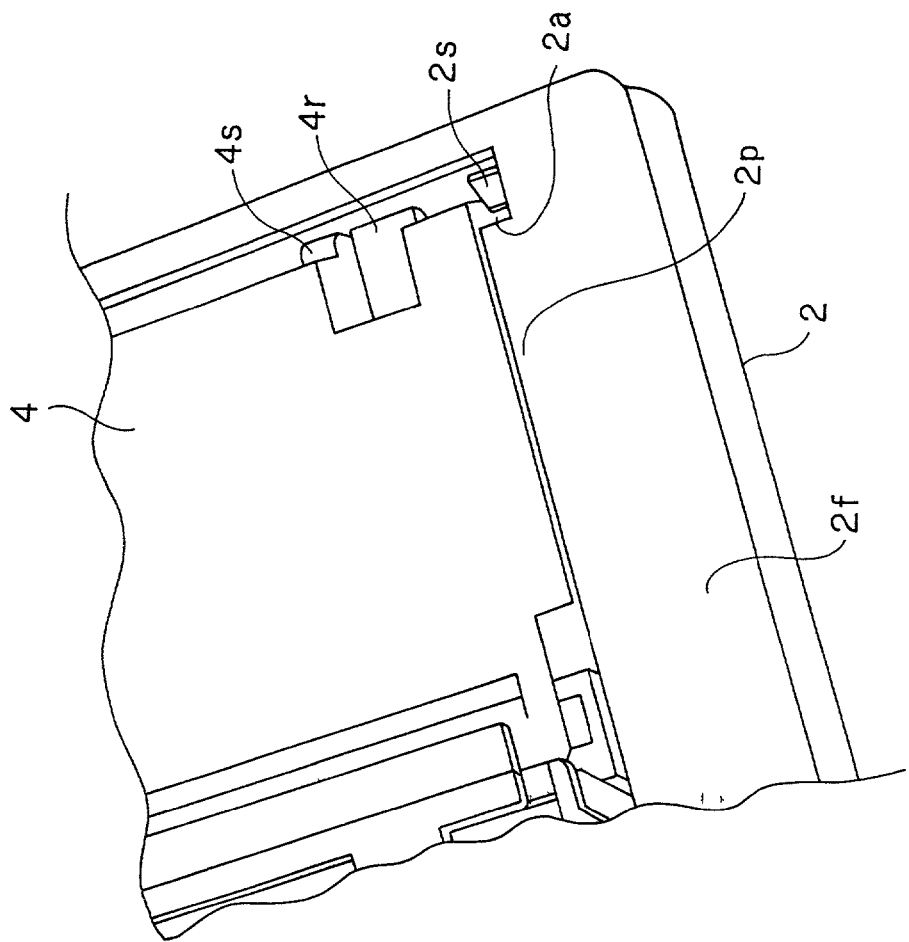
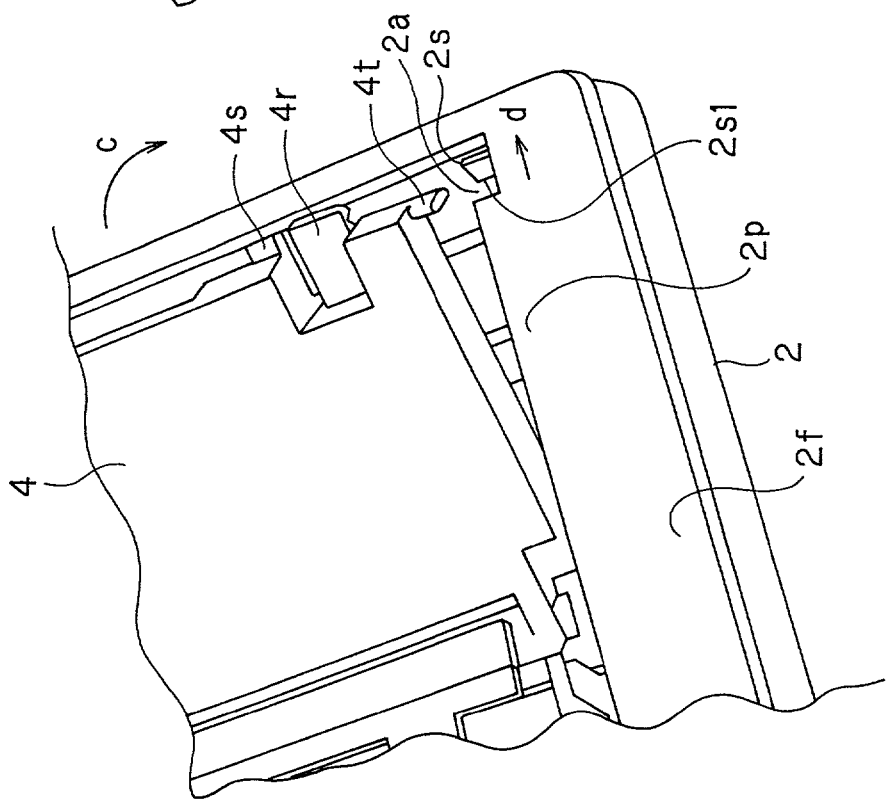
FIG. 12(a)
FIG. 12(b)

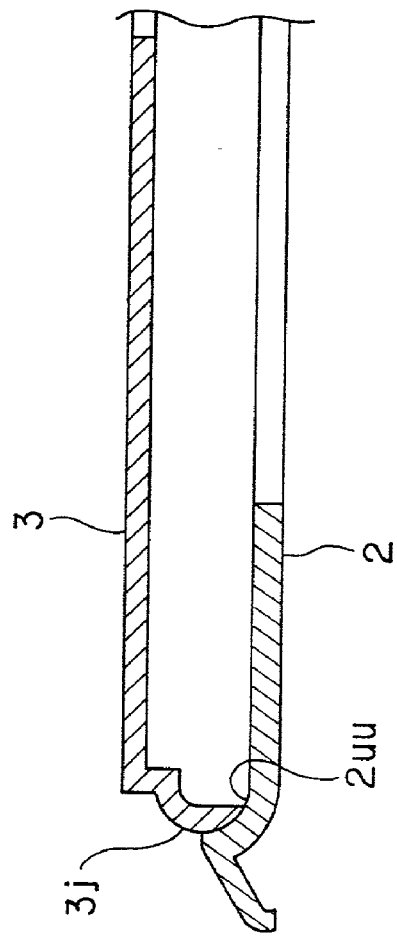
FIG.14(b)
FIG.14(c)
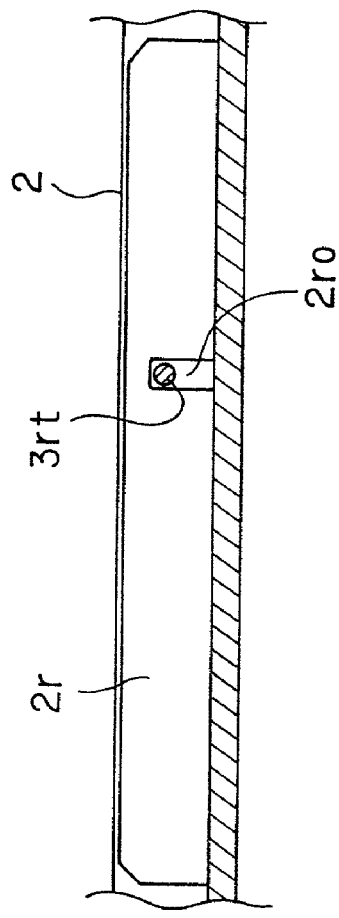
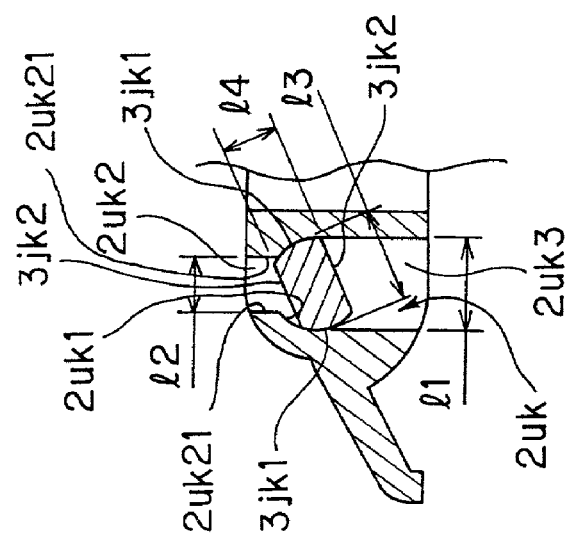
FIG.14(a)

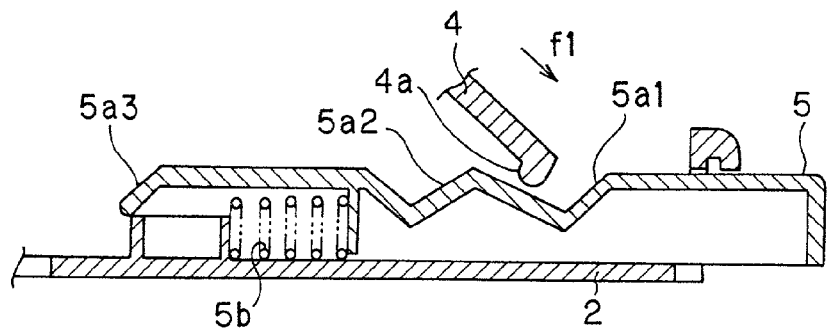
F I G. 21(a)
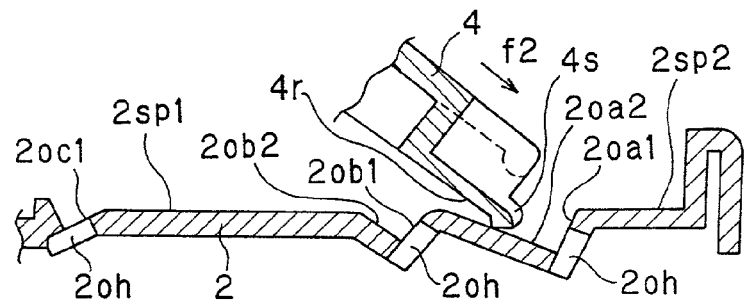
F I G. 21(b)
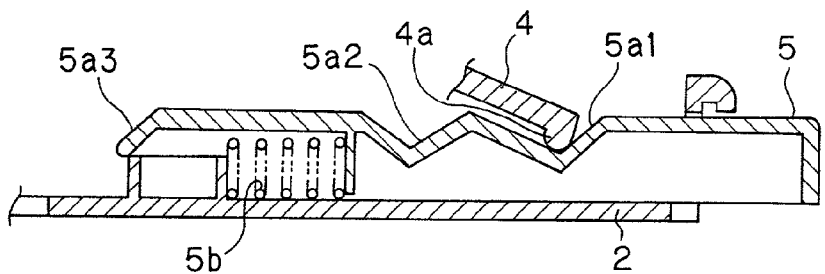
F I G. 22(a)
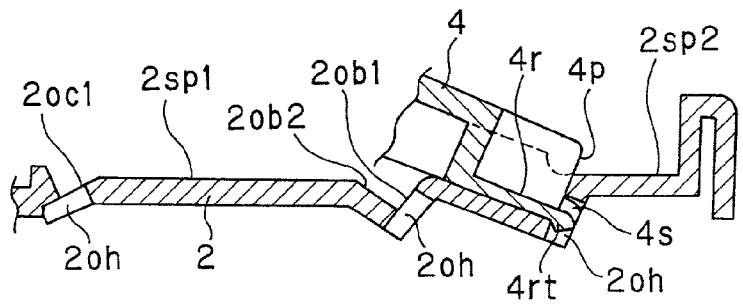
F I G. 22(b)

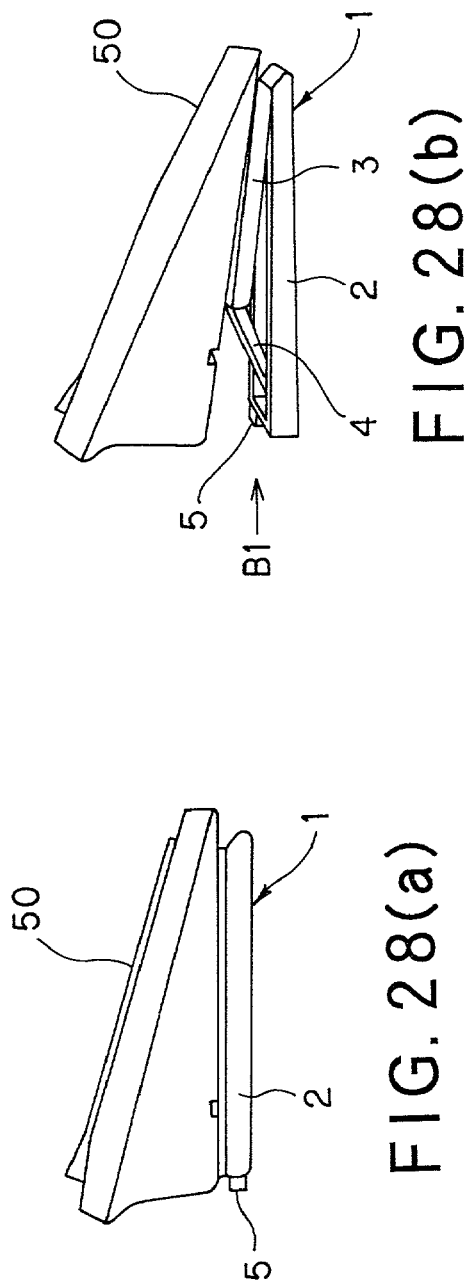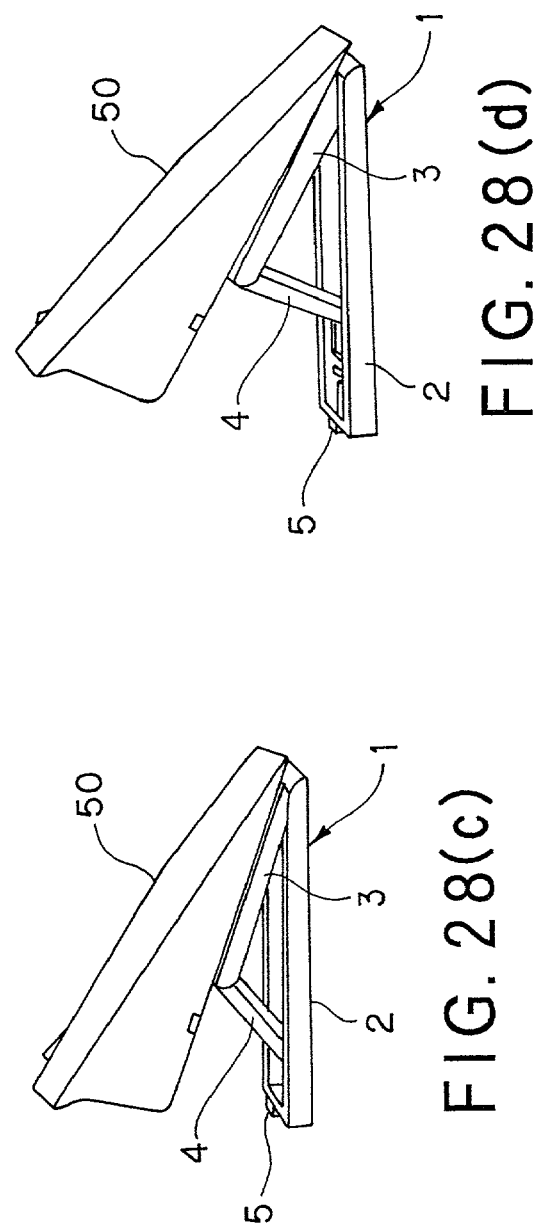

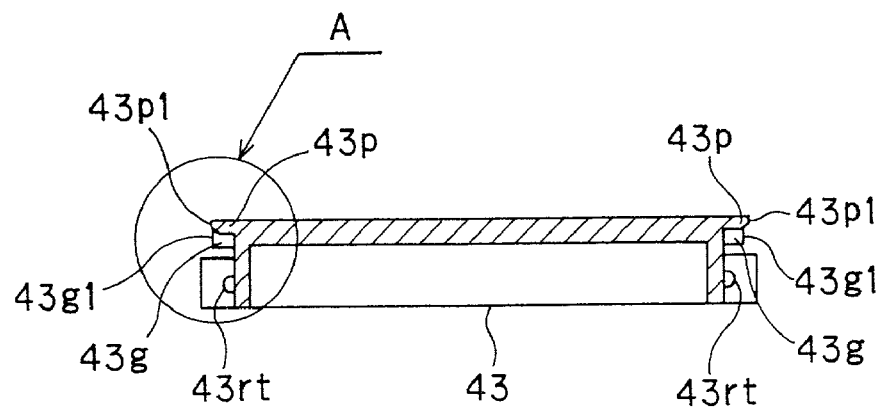
FIG. 41(a)
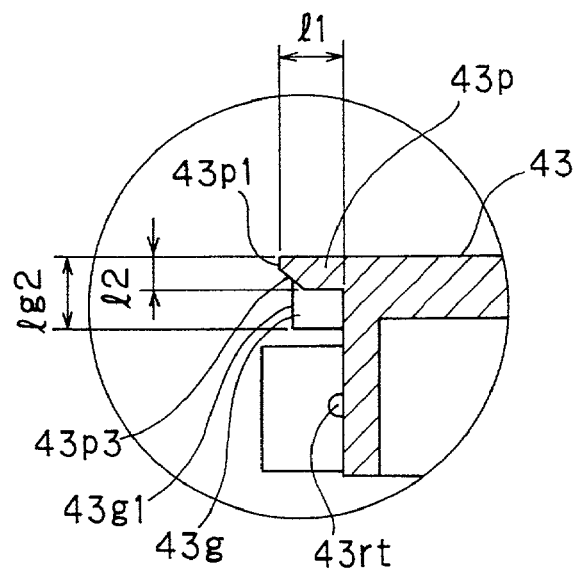 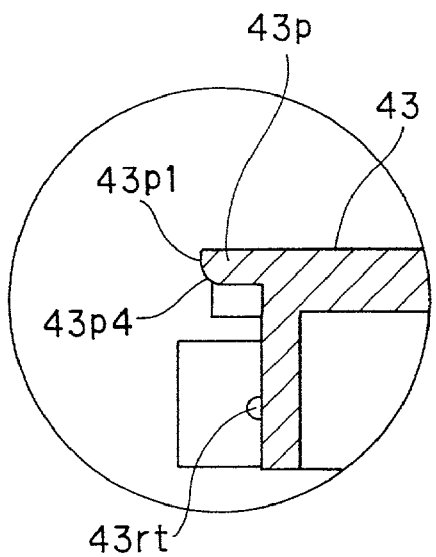
FIG. 41(b)   FIG. 41(c)

ELECTRONIC EQUIPMENT MOUNTING ANGLE VARYING APPARATUS

CROSS REFERENCE TO RELATED APPLICATIONS

This application is based upon and claims the benefit of priority from the prior Japanese Patent Application No. 2001-2808 filed on Jan. 10, 2001 and Japanese Patent Application No. 2001-191410 filed on Jun. 25, 2001; the entire contents of these prior applications being incorporated herein by reference.

BACKGROUND OF THE INVENTION

1. Field of the Invention

This invention relates to an electronic equipment mounting angle varying apparatus for setting electronic equipment at a desired angle.

2. Description of the Related Art

Referring to FIG. 48, conventionally, there has been a mounting angle varying apparatus 110 for electronic equipment such as telephone sets, which turn a telephone main body 111 relative to a telephone base 112 and set the telephone set at one of two angles.

This mounting angle varying apparatus 110 is such that, with the telephone main body 111 disposed so that it turns freely relative to the telephone base 112, a projection 112t formed in the upper part of the telephone base 112 is inserted into a cutout 111c1 or 111c2 formed integrally in the lower part of the telephone main body 111 for setting the angle of a case 111c, whereby the telephone set is set at one of two angles.

More specifically, when the telephone main body 111 is to be mounted with a small angle of inclination relative to the telephone set mounting surface, the setting is made so that the projection 112t on the upper part of the telephone base 112 is inserted into the cutout 111c2 in the lower part of the telephone main body 111, as shown in FIG. 48(a).

When the telephone main body 111 is to be mounted with a large angle of inclination relative to the telephone set mounting surface, the setting is made so that the projection 112t on the telephone base 112 is inserted into the cutout 111c1 positioned more to the front than the cutout 111c2 in the lower part of the telephone main body 111, as shown in FIG. 48(b).

Besides what is described above, there is a telephone set mounting angle varying apparatus wherewith a telephone main body 121 is set in one of two angles using a telephone base 122, as shown in FIG. 49.

That mounting angle varying apparatus 120 is such that an angle adjustment frame 121k is provided integrally in the lower part of the telephone main body 121.

The telephone base 122 is capable of accommodating the frame 121k, and is configured so that it engages an engagement indentation 121o in the lower part of the telephone main body 121.

With the mounting angle varying apparatus 120, when the telephone main body 121 is to be mounted with a small angle of inclination relative to the telephone set mounting surface, the setting is made so that the frame 121k in the lower part of the telephone main body 121 is accommodated inside the telephone base 122, and so that the engagement indentation 121o in the lower part of the telephone main body 121 engages the telephone base 122, as shown in FIG. 49(a).

When the telephone main body 121 is to be mounted with a large angle of inclination relative to the telephone set mounting surface, on the other hand, the setting is made so that the frame 121k at the bottom of the telephone main body 121 is disposed to the outside from the inside of the telephone base 122, and so that the engagement indentation 121ko of the frame 121k engages the telephone base 122, as shown in FIG. 49(b).

As another telephone mounting angle varying apparatus, there is one wherewith a telephone main body 131 is set at a plurality of kinds of angles relative to the telephone mounting surface using a telephone base 132, as shown in FIG. 50.

With the mounting angle varying apparatus 130, an angle adjustment member 131k that exhibits a cylindrical shape is provided integrally in the lower part of the telephone main body 131, and in the outer circumferential surface of the angle adjustment member 131k are made angle adjustment holes 131k1 to 131k4 for adjusting the angle of the telephone set.

In the telephone base 132 is provided an engagement portion (not shown) for engaging the angle adjustment holes 131k1 to 131k4 and in the telephone base 132 is provided a release button 132b for releasing the engagement between the engagement portion and the angle adjustment holes 131k1 to 131k4.

When the telephone main body 131 is to be adjusted to a predetermined mounting angle, that is done by engaging the engagement portion in the telephone base 132 into one of the angle adjustment holes 131k1 to 131k4 at a position that will set the telephone main body 131 at the predetermined angle.

In order to change the angle of the telephone main body 131, the engagement between the engagement portion in the telephone base 132 and the angle adjustment holes 131k1 to 131k4 is released by depressing the release button 132b, and the telephone main body 131 is again set at the desired mounting angle by the procedure described above.

As another telephone mounting angle varying apparatus, there is one wherewith a telephone main body 141 is set in a plurality of kinds of angles by changing the engagement position of an angle varying lever 142r in a telephone base 142, as shown in FIG. 51.

The mounting angle varying apparatus 140 is configured such that the telephone main body 141 is supported so that it turns freely at the front lower part thereof relative to the telephone base 142.

In the lower surface of the case of the telephone main body 141 are provided a plurality of angle varying grooves 141m (141m1, 141m2, 141m3, 141m4), and in the telephone base 142 are provided angle varying levers 142r which turn freely about a lever shaft 142rj and engage the angle varying grooves 141m.

In order to fix the telephone main body 141 at a desired mounting angle, the angle varying levers 142r on the telephone base 142 are turned and engaged in angle varying grooves 141m corresponding to the desired mounting angle.

As another telephone mounting angle varying apparatus, there is one wherewith a telephone main body 151 is set in a desired mounting angle by changing the engagement position with an angle varying member attached to a telephone base 152 so as to turn freely, as shown in FIG. 52.

The mounting angle varying apparatus 150 is such that the telephone main body 151 is supported so that it turns freely at the front lower part thereof relative to the telephone base 152.

In the lower surface of the case of the telephone main body 151 are provided angle regulating indentations 151o (151o1, 151o2), and in the back part of the telephone base 152 is provided an angle varying member 152b, one end whereof engages the angle adjustment indentations 151o, which turns freely about the other end.

In order to set the telephone main body 151 in a desired mounting angle, that is done by turning the angle varying member 152b of the telephone base 152, and engaging it in an angle adjustment indentation 151o corresponding to the desired mounting angle.

As another telephone mounting angle varying apparatus, there is one wherewith a telephone main body 161 is set in a desired mounting angle by changing the position of an angle varying member 161b attached so that it turns freely to the telephone main body 161, as shown in FIG. 53.

In the mounting angle varying apparatus 160, an angle varying member 161b is configured so that one end thereof is attached so that it turns freely to the lower surface portion of the telephone main body 161, and the other end abuts the mounting surface for the telephone set.

In order to set the telephone main body 161 at a small mounting angle, the angle varying member 161b is folded against the lower surface portion of the telephone main body 161, as shown in FIG. 53(a).

In order to set a large mounting angle, on the other hand, the angle 15 varying member 161b is separated from the lower surface portion of the telephone main body 161 and the other end thereof is made to come up against the mounting surface for the telephone set as shown in FIG. 53(b).

When an add-on module has been installed in the telephone set in order to increase the number of extensions or the like, the telephone set is either used with nothing added other than the mounting angle varying apparatus described above, or, alternatively, is used after attaching a dedicated mounting angle varying apparatus to the add-on module.

Now, the telephone set mounting angle varying apparatuses described in the foregoing are configured integrally beforehand with the telephone main bodies, and constitute an extra cost burden to a user who does not need a mounting angle varying apparatus.

Also, most mounting angle varying apparatuses provide a two-step telephone set mounting angle, as seen in the mounting angle varying apparatuses 110, 120, 150, and 160 described in the foregoing.

Even with mounting angle varying apparatuses wherewith a plurality of 5 mounting angles can be set, in order to set the mounting angle of the telephone main body 131, that must be done while visually verifying the engagement between the angle adjustment holes 131k1 to 131k4 and the engagement portion of the telephone base 132, as shown in FIG. 50, and there is a problem with operability in setting the mounting angle.

Or there are other problems, such as the telephone set being very wobbly when operated, as with the mounting angle varying apparatus 150 or the mounting angle varying apparatus 160, or that of the strength being weak, so that breakage occurs easily, as with the mounting angle varying apparatus 140 or the mounting angle varying apparatus 160.

Also, with the mounting angle varying apparatuses 110 and 120, it is necessary to separate the telephone main body from the telephone base when setting the telephone set mounting angle.

In the mounting angle varying apparatuses 130, 140, and 150 shown in FIG. 41 to 52, similarly, when changing the angle of the telephone main body, the telephone main body portion separates from the telephone base, and there is a problem in that the product does not have the feel of a high quality product.

With the mounting angle varying apparatuses described in the foregoing, furthermore, the structure is complex and die equipment costs are high, and most of the apparatuses are not easy to assemble, making them problematic in terms of escalating manufacturing costs.

In addition, when an add-on module (see FIG. 33) is attached to the telephone set, with only the mounting angle varying apparatuses described in the foregoing the balance becomes poor and stability is lacking.

When a mounting angle varying apparatus made specifically for the add-on module is additionally installed, moreover, the number of parts and the die equipment costs increase, leading to escalating manufacturing costs.

SUMMARY OF THE INVENTION

In view of the situation described in the foregoing, an object of the present invention is to provide an electronic equipment mounting angle varying apparatus of low manufacturing cost that is attachable and detachable to and from the electronic equipment.

In order to realize the object stated above, an electronic equipment mounting angle varying apparatus of the first aspect of the present invention comprises a base member mounted at a place where electronic equipment is installed; a mounting member on which the electronic equipment is mounted, and which is supported by the base member so as to freely swing about a horizontal base support shaft axis; and an arm member supported by the mounting member so as to freely swing about a mounting member support shaft axis extending horizontally, which sets mounting angle of the electronic equipment by being latched by the base member, whereby the electronic equipment is mounted at a prescribed angle.

An electronic equipment mounting angle varying apparatus relating to the second aspect of the invention is the electronic equipment mounting angle varying apparatus according to the first aspect of the present invention, wherein the base member holds the electronic equipment at a prescribed mounting angle by latching the arm member, and comprises an arm latched portion constituted by a plurality of holes formed along a direction perpendicular to the base support shaft axis; and the arm member has an arm latching portion comprising a positioning latching portion that is fit into the arm latched portion and determines a position relative to the base member, and an elastic latching portion that has a convex portion at the leading end thereof and is flexibly deformed so that the convex portion is fit inside the arm latched portion and engages therewith, the arm latching portion being latched by the engagement of the convex portion in the arm latched portion.

An electronic equipment mounting angle varying apparatus relating to the third aspect of the present invention is the electronic equipment mounting angle varying apparatus according to the second aspect of the present invention, wherein the base member comprises a latching guide surface portion against which the arm member abuts in a manner such that angle subtended with inner surface of the arm member is acute, wherein, by pressing the electronic equipment downward, the arm latching portion of the arm member is guided so as to be fitted into and latched by the arm latched portion of the base member, and the arm member is guided to a horizontal attitude.

An electronic equipment mounting angle varying apparatus relating to the fourth aspect of the present invention is the electronic equipment mounting angle varying apparatus according to any one the second and third aspect of the present invention, wherein the arm member comprises an arm guide portion for releasing latching of the arm latching portion, and the equipment angle varying apparatus further comprises an operating member having an operating guide portion which, by being moved from a normal position to an operating position, causes the arm guide portion of the arm member to move for releasing latching between the arm latching portion and the arm latched portion, the operating member being energized so as to return from the operating position to the normal position by return means.

An electronic equipment mounting angle varying apparatus relating to the fifth aspect of the present invention is the electronic equipment mounting angle varying apparatus according to any one of the first to fifth aspect of the present invention, wherein a shaft bearing structure between the base member and the mounting member comprises a base support shaft portion and a base support shaft bearing portion provided to one or another of the base member and the mounting member, respectively; the base support shaft portion comprises a main shaft portion, centered on the base support shaft axis, having a first cylindrical surface extending along the base support shaft axis; and a fitting shaft portion, deployed concentrically with the main shaft portion, having a second cylindrical surface one part of which is cut out with a fitting surface, and the base support shaft bearing portion comprises a first shaft bearing portion that has a circular arc shaped cross-section and receives the first cylindrical surface of the main shaft portion slidably; and fitting shaft bearing portion comprising a second shaft bearing portion which has a circular arc shaped cross-section provided concentrically with the first shaft bearing portion, which receives the second cylindrical surface of the fitting shaft portion slidably, and which supports the base support shaft portion together with the first shaft bearing portion rotatably; and a first attachment hole formed through the second shaft bearing portion, and including a fitting surface into which, from a relative position that cannot be assumed when the angle varying apparatus is in use, the base support shaft portion is fit into the base support shaft bearing portion, along a fitting surface of the fitting shaft portion in the base support shaft portion.

An electronic equipment mounting angle varying apparatus relating to the sixth aspect of the present invention is the electronic equipment mounting angle varying apparatus according to the fifth aspect of the present invention, wherein the base support shaft portion is provided with the fitting shaft portion at both ends of the main shaft, respectively, and the base support shaft bearing portion is provided with the fitting shaft bearing portion at both ends of the first shaft bearing portion, respectively.

An electronic equipment mounting angle varying apparatus relating to the seventh aspect of the present invention is the electronic equipment mounting angle varying apparatus according to any one of the fifth and sixth of the present invention, wherein the first shaft bearing portion in the base support shaft bearing portion has a die extraction space oriented in one of upper and lower die extraction directions outside of the first cylindrical surface; the fitting shaft bearing portion in the base support shaft bearing portion has a die extraction space, oriented in the other of the directions of upper and lower die extraction, outside of the shaft bearing surface of the second shaft bearing portion; and the first attachment hole is passed through in line with the upper and lower die extraction directions.

An electronic equipment mounting angle varying apparatus relating to the eight aspect of the present invention is the electronic equipment mounting angle varying apparatus according to any one of the first to seventh aspects of the present invention, wherein shaft bearing structure between the mounting member and the arm member comprises a mounting support shaft portion and a mounting support shaft bearing portion provided to one or another of the mounting member and the arm member, respectively; the mounting support shaft portion comprises a mounting main shaft portion centered on the mounting member support shaft axis, having a third cylindrical surface extending along the mounting member support shaft axis; and a mounting fitting shaft portion deployed concentrically with the mounting main shaft portion, having a fourth cylindrical surface one part of which is cut out with a fitting surface; and the mounting support shaft bearing portion comprises: a third shaft bearing portion that has a circular arc shaped cross-section and receives the third cylindrical surface of the mounting main shaft portion slidably; a fourth shaft bearing portion which has a circular arc shaped cross-section provided concentrically with the third shaft bearing portion, which receives the fourth cylindrical surface of the mounting fitting shaft portion slidably, and supports the mounting support shaft portion together with the third shaft bearing portion rotatably; and a second attachment hole, formed through the fourth shaft bearing portion, having a fitting surface into which, from a relative position that cannot be assumed when the angle varying apparatus is in use, the mounting support shaft portion is fit into the mounting support shaft bearing portion, along a fitting surface of the mounting fitting shaft portion in the mounting support shaft portion.

An electronic equipment mounting angle varying apparatus relating to the ninth aspect of the present invention is the electronic equipment mounting angle varying apparatus according to the eighth aspect of the present invention, wherein the mounting support shaft portion is provided with the mounting fitting shaft portion at both ends of the mounting main shaft, respectively; and the mounting support shaft bearing portion is provided with the mounting fitting shaft bearing portion at both ends of the third shaft bearing portion, respectively.

An electronic equipment mounting angle varying apparatus relating to the tenth aspect of the present invention is the electronic equipment mounting angle varying apparatus according to any one of the eighth and ninth aspects of the present invention, wherein the third shaft bearing portion in the mounting support shaft bearing portion has a die extraction space, oriented in one of the directions of upper and lower die extraction, outside of the third cylindrical surface; and the mounting fitting shaft bearing portion in the mounting support shaft bearing has a die extraction space oriented in the other direction of upper and lower die extraction outside of the shaft bearing surface of the fourth shaft bearing portion, and the second attachment hole is formed through in line with the upper and lower die extraction directions.

An electronic equipment mounting angle varying apparatus relating to the eleventh aspect of the present invention is the electronic equipment mounting angle varying apparatus according to any one of the first to tenth aspects of the present invention, wherein the base member further comprises a falling-out prevention portion for preventing the arm member from coming out; and the arm member further comprises an arm pulling-out prevention portion which engages the falling-out prevention portion of the base member.

An electronic equipment mounting angle varying apparatus relating to the twelfth aspect of the present invention is the electronic equipment mounting angle varying apparatus according to any one of the first to eleventh aspects of the present invention, wherein the electronic equipment comprises, on lower surface thereof, a pair of guide rails having L-shaped cross-sections in which engagement grooves extending to face each other are formed, wherein, and a guide portion protruding toward insides of the guide rails; the mounting member abuts against the guide portion, and comprises a pair of positioning guide portions that respectively abut against the guide rail, and a pair of attachment portions, projecting to the outside of the sides and having sloped surfaces formed in the lower end edge parts, which are for attaching the angle varying apparatus to the electronic equipment by being fit into the engagement grooves of the guide rails; and the attachment portions, respectively, are fitted to the guide rails at prescribed positions where the sloping surfaces of the attachment portions oppose the guide rail end edges by the abutment between the pair of positioning guide portions and the abutment between the guide portion and the mounting member.

An electronic equipment mounting angle varying apparatus relating to the thirteenth aspect of the present invention comprises a base unit disposed at a place where the electronic equipment is installed; a mounting unit on which the electronic equipment is detachably mounted and which includes a horizontal base support shaft and is supported by the base unit so as to swing freely about the base support shaft; and an arm unit which is supported by the mounting unit so as to swing freely and which is adapted to set an angle for mounting the electronic equipment by latching the base unit relative to the mounting unit, the base unit including a plurality of arm latched portions which are formed across a direction perpendicular to the base support shaft and hold the electronic equipment at a predetermined mounting angle by being latched by the arm unit, and a falling-out preventing portion which prevents the arm unit from being released; the arm unit including an arm latching portion which is latched with an elastic force to the arm latched portions of the base unit so as to hold the electronic equipment in a predetermined mounting angle, an arm guide portion which releases latching of the arm latched portions; and an arm pull-out preventing portion which engages the falling-out preventing portion of the base unit, and further comprises an operating unit including an operating guide portion that is moved from a normal position to an operating position so as to move the arm guide portion of the arm unit and release latching between the arm latching portion and the arm latched portion, and return means that urges the operating guide portion to return from the operating position to the normal position.

An electronic equipment mounting angle varying apparatus relating to the fourteenth aspect of the present invention is the electronic equipment mounting angle varying apparatus according to the thirteenth aspect, wherein the base unit includes an equipment support portion of narrower width than an equipment support portion of a standard base unit that is molded using an insert die in a standard die for molding the standard base unit for the mounting angle varying apparatus attached to an electronic equipment with no auxiliary equipment being installed therein, and at least two of the mounting angle varying apparatuses are attached to the electronic equipment and to the auxiliary equipment when an auxiliary equipment is installed in the electronic equipment.

An electronic equipment mounting angle varying apparatus relating to the sixteenth aspect of the present invention is the electronic equipment mounting angle varying apparatus according to the thirteenth or fourteenth aspect of the present invention, wherein the mounting unit includes a predetermined number of attachment hubs that are formed in the upper part thereof using an insert die in a standard die for forming the mounting unit, and is attached to the electronic equipment using the attachment hubs.

An electronic equipment mounting angle varying apparatus relating to the seventeenth aspect of the present invention is the electronic equipment mounting angle varying apparatus according to the thirteenth aspect of the present invention, wherein the base unit includes an operating unit insertion hole which an operating portion formed in one end of the operating unit passes through and exposes the operating portion to outside; an operating unit overhead guiding portion which supports and guides another end of the operating unit from overhead; and a disassembling hole provided so as to face the operating unit at a position between the operating unit insertion hole and the operating unit overhead guiding portion, and the operating unit comprises a sliding guided portion that is supported and guided by the operating unit overhead guiding portion, the operating unit being attached to the base unit by being inserted into operating unit insertion hole in the base unit from inside toward outside of the base unit, and brought back from outside to inside of the base unit so that the sliding guided portion is inserted in the operating unit below the operating unit overhead guiding portion of the base unit, and the operating unit being detached from the base unit by being passed through the disassembling hole from below the base unit and pressed upward, and being pressed from inside toward outside of the base unit in a horizontal direction so that the sliding guided portion is released from below the operating unit overhead guiding portion of the base unit.

BRIEF DESCRIPTION OF THE DRAWINGS

FIGS. 12(*a*) and 12(*b*) are perspective views showing the process of fitting the tilt arm to the tilt base in the first embodiment of the electronic equipment mounting angle varying apparatus according to the present invention;

FIGS. 14(*a*), 14(*b*) and 14(*c*) are sections of the first embodiment of the electronic equipment mounting angle varying apparatus according to the present invention, at the XIV(a)—XIV(a), XIV(b)—XIV(b) and XIV(c)—XIV(c) lines, respectively, as shown in FIG. 13;

FIGS. 21(*a*) and 21(*b*) provides cross-sections that respectively diagram the processes of setting the angle varying apparatus of the first embodiment diagrammed in FIG. 20(*a*) and 20(*b*) at the next smaller angle;

FIGS. 22(*a*) and 22(*b*) provide cross-sections of the angle varying apparatus of the first embodiment diagrammed in FIG. 20(*a*) and 20(*b*) when set at the next smaller angle, respectively;

FIGS. 28(*a*), 28(*b*), 28(*c*), and 28(*d*) are perspective views representing mounting angles in the first embodiment of the electronic equipment mounting angle varying apparatus according to the present invention;

FIGS. 41(a) and 41(b) provides the B—B cross-section of the tilt cover diagrammed in FIG. 39 and an enlarged detailed drawing of the A part in FIG. 41(c);

DESCRIPTION OF THE EMBODIMENTS

The present invention is now described in detail, making reference to the drawings which represent embodiments.

Figure 1:
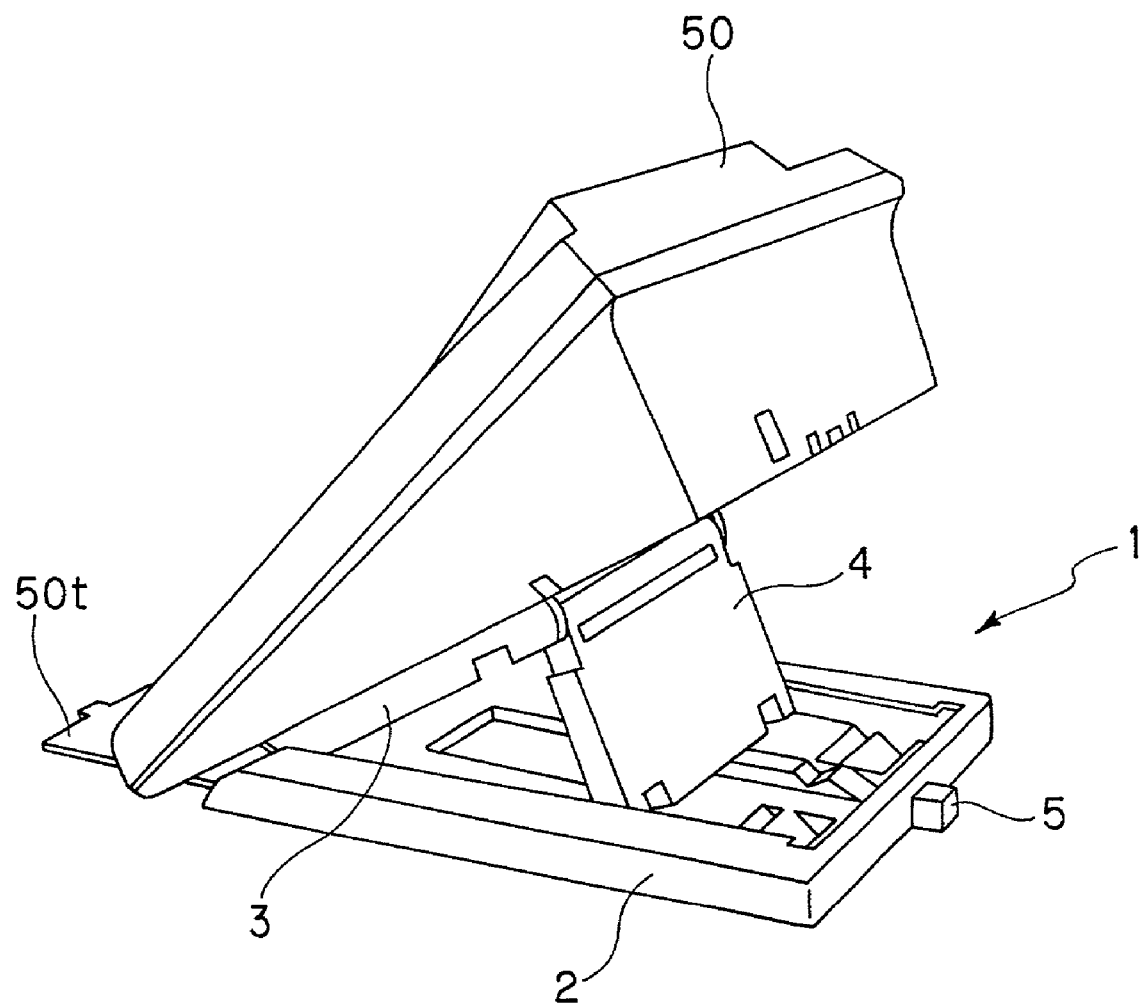
FIG. 1 is a perspective view of a first embodiment of an electronic equipment mounting angle varying apparatus according to the present invention.

Referring to FIG. 1, a first embodiment of a mounting angle varying apparatus 1 for a telephone set 50 that is electronic equipment, to which the present invention is applied, comprises a tilt base (base unit) 2 forming a mounting surface, a tilt cover (mounting unit) 3 attached to the lower surface of the telephone set 50, a tilt arm (arm unit) 4 attached to the tilt cover 3 in a turnable fashion and latched to the tilt base 2, and a tilt button (operating unit) 5 that is pressed when the mounting angle of the telephone set 50 is altered are comprised.

Also, a telephone number card affixing tray 50t that is attached to the lower surface of the telephone set 50 when the mounting angle varying apparatus 1 is not installed in the telephone set 50 is attached to the lower surface of the tilt base 2 of the mounting angle varying apparatus 1 when the mounting angle varying apparatus 1 is installed in the telephone set 50.

The angle varying apparatus 1 is attached such that it engages guide rails 50r (cf. FIG. 21) that are tray engagement ribs on the lower surface of the telephone set 50 to which a telephone number card affixing tray 50t, and the detached telephone number card affixing tray 50t is attached to the lower surface of the tilt base 2 of the angle varying apparatus 1.

Thus the attachment and detachment of the angle varying apparatus 1 to and from the telephone set 50 is extremely easy, and can be freely selected. The tilt base 2 is a molded resin product molded using upper and lower dies, exhibiting the shape of a flat rectangular parallelepiped, as shown in FIG. 2.

Along the edge that is one short side of the tilt base 2 is formed a cover shaft bearing (base support shaft bearing portion) 2u into which is engaged the cover turning shaft (base support shaft) 3j (described below) of the tilt cover 3.

Figure 2:
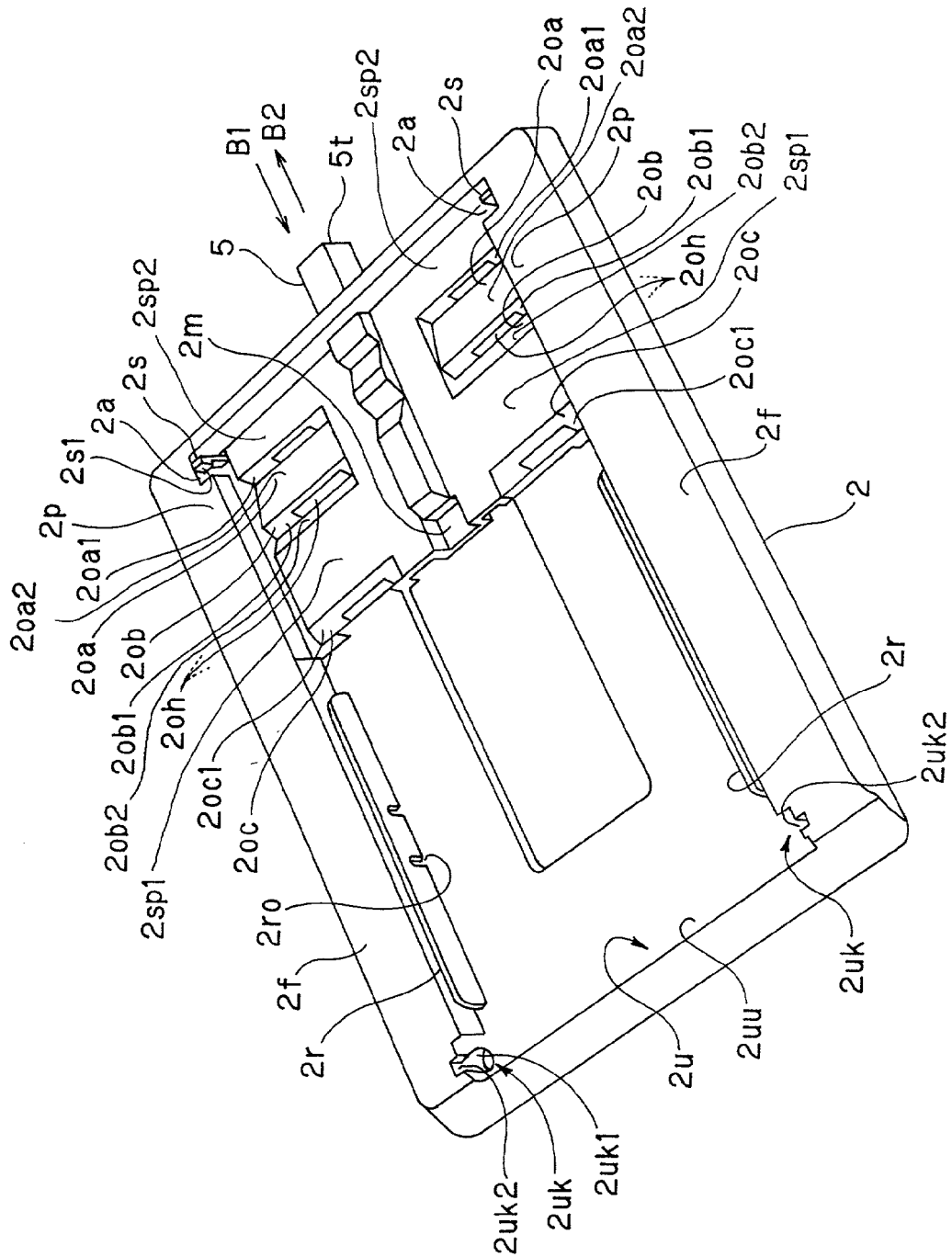
FIG. 2 is a perspective view of a tilt base, to which a tilt button is attached, in the first embodiment of the electronic equipment mounting angle varying apparatus according to the present invention.

At either end of the cover shaft bearing 2u is formed a cover axis engagement hole (fitting shaft bearing portion) 2uk that passes through in the vertical direction, as shown in FIG. 2 and FIG. 14(a).

In the center of each cover axis engagement hole 2uk is formed a cover cylinder hole portion 2uk1. The cover cylinder hole portion (second shaft bearing portion) 2uk1 is a semi-cylindrical hole oriented downward having a diameter 11, and a cover cylinder surface (described farther below) of a cylindrical portion 3jk1 of a cover shaft latching unit 3j slides so that it can turn freely.

Downward from each of the cover cylinder hole portions 2uk1 is formed a punched hole (die extraction space) 2uk3 that is a rectangular parallelepiped hole which passes through vertically downward. The punched hole 2uk3 has a vertical dimension that is equal to or greater than the diameter 11 of the cover cylinder hole portion 2uk1, and a width that is equal to or greater than the cover cylinder hole portion 2uk1.

Upward from each of the cover cylinder hole portions 2uk1 is formed a cover fitting hole (first attachment hole) 2uk2 having a parallel surface (fitting surface of first attachment hole) 2uk21, the cover fitting hole being a rectangular parallelepiped hole which passes through vertically upward. The cover fitting hole 2uk2 has a vertical dimension 12 (<11) that is less than the diameter 11 of the cover cylinder hole portion 2uk1.

From the cover axis engagement hole 2uk at one end of the cover shaft bearing 2u to the cover axis engagement hole 2uk at the other end thereof, as shown in FIG. 2 and FIG. 14(c), is formed a cover axis receiving concavity (first shaft bearing portion) 2uu that has a circular arc shaped cross-section and is open (die extraction space of first shaft bearing portion) toward the top. The cover axis receiving concavity 2uu has a diameter that is slightly larger than the diameter of the cover turning shaft so that the cover turning shaft can slide so as to turn freely therein.

As described above, the cover axis engagement holes 2*uk* in the cover shaft bearing 2*u* are formed so as to pass through in the vertical direction, and the punched holes 2*uk*3 downward from the cover cylinder hole portions 2*uk*1 are formed larger than the cover cylinder hole portions 2*uk*1, wherefore it is possible to perform molding using a trimming die assembly.

Similarly, the cover axis receiving concavity 2*uu* in the cover shaft bearing 2*u* is formed so that it is open toward the top, wherefore it is possible to mold it using a trimming die assembly.

Thus the cover shaft bearing 2*u* is of a configuration that can be molded using a trimming die assembly.

In the vicinity of each of the long side edges of the tilt base 2, thin sheet-form cover securing ribs 2*r* are formed, respectively, and at predetermined positions in these cover securing ribs 2*r*, cover securing holes 2*ro* for latching cover securing convexities (described farther below) are formed which pass through downward.

In the tilt base 2, on the opposite side from the cover shaft bearing 2*u*, as diagrammed in FIG. 2 and FIG. 15(*c*), triangular column shaped arm securing concavities 2*oa*, 2*ob*, and 2*oc* having triangular cross-sections are formed integrally, in a direction parallel to the axis center of the cover shaft receiving concavity 2*uu*, from the middle portion in the long dimension of the tilt base 2 toward the short side edge thereof.

Each of the pair of arm securing concavities 2*oa* has an arm concavity sloping surface 2*oa*1 having a slope in the outer direction of the tilt base 2 relative to the vertical direction, and an arm concavity sloping surface (latching guide surface portion) 2*oa*2 having a slope in the center part direction of the tilt base 2 relative to the vertical direction formed therein to present a triangular columnar concavity shape, provided so as to extend in a direction parallel to the axis center of the cover shaft receiving concavity 2*uu*.

Also, each of the pair of arm securing concavities 2*ob* has an arm concavity sloping surface 2*ob*1 having a slope in the outer direction of the tilt base 2 relative to the vertical direction, and an arm concavity sloping surface (latching guide surface portion) 2*ob*2 having a slope in the center part direction of the tilt base 2 relative to the vertical direction formed therein to present a triangular columnar concavity shape, provided so as to extend in a direction parallel to the axis center of the cover shaft receiving concavity 2*uu*.

Also, each of the pair of arm securing concavities 2*oc* has an arm concavity sloping surface 2*oc*1 having a slope in the outer direction of the tilt base 2 relative to the vertical direction formed therein to present a triangular columnar concavity shape, made to be in a direction parallel to the axis center of the cover shaft receiving concavity 2*uu*.

Also, crossing from the upper end edge of the arm concavity sloping surfaces 2*oc*1, to the upper end edge of the arm concavity sloping surfaces 2*ob*1, respectively, are formed, respectively, a pair of arm sliding surfaces (latching guide surface portions) 2*sp*1 that are horizontal surfaces.

Also, from the upper end edge of the respective arm concavity sloping surfaces 2*oa*1 to the short edge of the tilt base 2 are formed, respectively, a pair of arm sliding surfaces (latching guide surface portions) 2*sp*2 that are horizontal surfaces.

In the arm securing concave sloping surface 2*oa*1 of the arm securing concavity 2*oa*, the arm securing concave sloping surface 2*ob*1 of the arm securing concavity 2*ob*, and the arm securing concave sloping surface 2*oc*1 of the arm securing concavity 2*oc*, respectively, are formed arm engagement holes (arm latched portions) 2*oh*, which exhibit a rectangular shape having the long sides in a direction parallel to the axis center of the cover shaft receiving concavity 2*uu*, for the purpose of the bending ribs (arm latching portions, described further below) 4*r* that are latching portions of the tilt arm 4 and the positioning ribs (rib latching portions, described further below) 4*s* latching.

Moreover, as described in FIG. 17(*b*), the arm securing concave sloping surface 2*oa*1 of the arm securing concavity 2*oa*, the arm securing concave sloping surface 2*ob*1 of the arm securing concavity 2*ob*, and the arm securing concave sloping surface 2*oc*1 of the arm securing concavity 2*oc*, respectively, are formed so that the rib side end surface 4*p* (described farther below) of the tilt arm 4 abuts in parallel when the bending ribs 4*r* (described further below) and the positioning ribs 4*s* that are latching portions of the tilt arm 4 have latched in the arm engagement holes 2*oh*.

Here, the rib side end surface 4*p*, as diagrammed in FIG. 6, is formed at right angles to the direction of the plane of the tilt arm 4.

Let it be noticed that, the respective arm sliding surfaces 2*sp*1 and the arm concavity sloping surface 2*ob*2 are such that, when the telephone set 50 is changed from the angle indicated in FIG. 28(*d*) to the angle indicated in FIG. 28(*c*), the bending ribs 4*r* and positioning ribs 4*s* of the tilt arm 4 in the angle varying apparatus 1 slide.

At that time, the tilt arm 4, as is clear from FIGS. 28(*c*) and 28(*d*), is configured so that it abuts with the inner surface of the tilt arm 4 forming an acute angle with the arm sliding surfaces 2*sp*1 and the arm concavity sloping surface 2*ob*2.

Also, the respective arm concavity sloping surfaces 2*oa*2 are such that, when the telephone set 50 is changed from the angle indicated in FIG. 28(*c*) to the angle indicated in FIG. 28(*b*), the bending ribs 4*r* and positioning ribs 4*s* of the tilt arm 4 in the angle varying apparatus 1 slide.

At that time, the tilt arm 4, as is clear from FIGS. 28(*b*) and 28(*c*), is configured so that it abuts with the inner surface of the tilt arm 4 forming an acute angle with the arm concavity sloping surfaces 2*oa*2.

Also, the respective arm sliding surfaces 2*sp*2 are such that, when the telephone set 50 is changed from the angle indicated in FIG. 28(*b*) to the angle indicated in FIG. 28(*a*), the bending ribs 4*r* and positioning ribs 4*s* of the tilt arm 4 in the angle varying apparatus 1 slide.

At that time, as is clear from FIGS. 28(*a*) and 28(*b*), the tilt arm 4 is configured so that it abuts with the inner surface of the tilt arm 4 forming an acute angle with the arm sliding surfaces 2*sp*2.

Between the pair of the arm securing concavity 2*oa*, 2*ob* and 2*oc* is formed a button sliding channel 2*m* in which the tilt button 5 engages and slides.

In the area in the vicinity of the short side edge angular part on the other side of the cover shaft bearing 2*u*, furthermore, as shown in FIG. 2 and FIG. 15(*a*), arm securing holes 2*a*, into which fit arm engaging projections 4*t* (arm pull-out preventing portions, described farther below) of the tilt arm 4, respectively, are formed, passing through in the vertical direction, and arm securing ribs 2*s*, at the tops of which are formed arm securing projections 2*s*1 for holding the arm engaging projections 4*t* of the tilt arm 4 inside the tilt base 2, are erected inside the arm securing holes 2*a*.

The portions of the upper surface panel of the tilt base 2 adjacent to the arm securing holes 2*a* form arm holding guide panels (falling-out preventing portions) 2*p*. The arm holding guide panels 2*p* are configured so that, when the mounting angle varying apparatus 1 is in use, the arm engagement projections of the tilt arm 4 move below the arm holding guide panels 2p.

In the outside parts of the arm holding guide panels 2p, moreover, equipment support portions 2f are formed for stably installing the mounting angle varying apparatus 1.

Accordingly, when the mounting angle varying apparatus 1 is in use, the arm engaging projections 4t of the tilt arm 4 are held inside the tilt base 2 by the lower surfaces of the arm holding guide panels 2p or by the arm securing projections 2s1 of the arm securing ribs 2s, wherefore the tilt arm 4 is prevented from separating from the tilt base 2.

Figure 3:
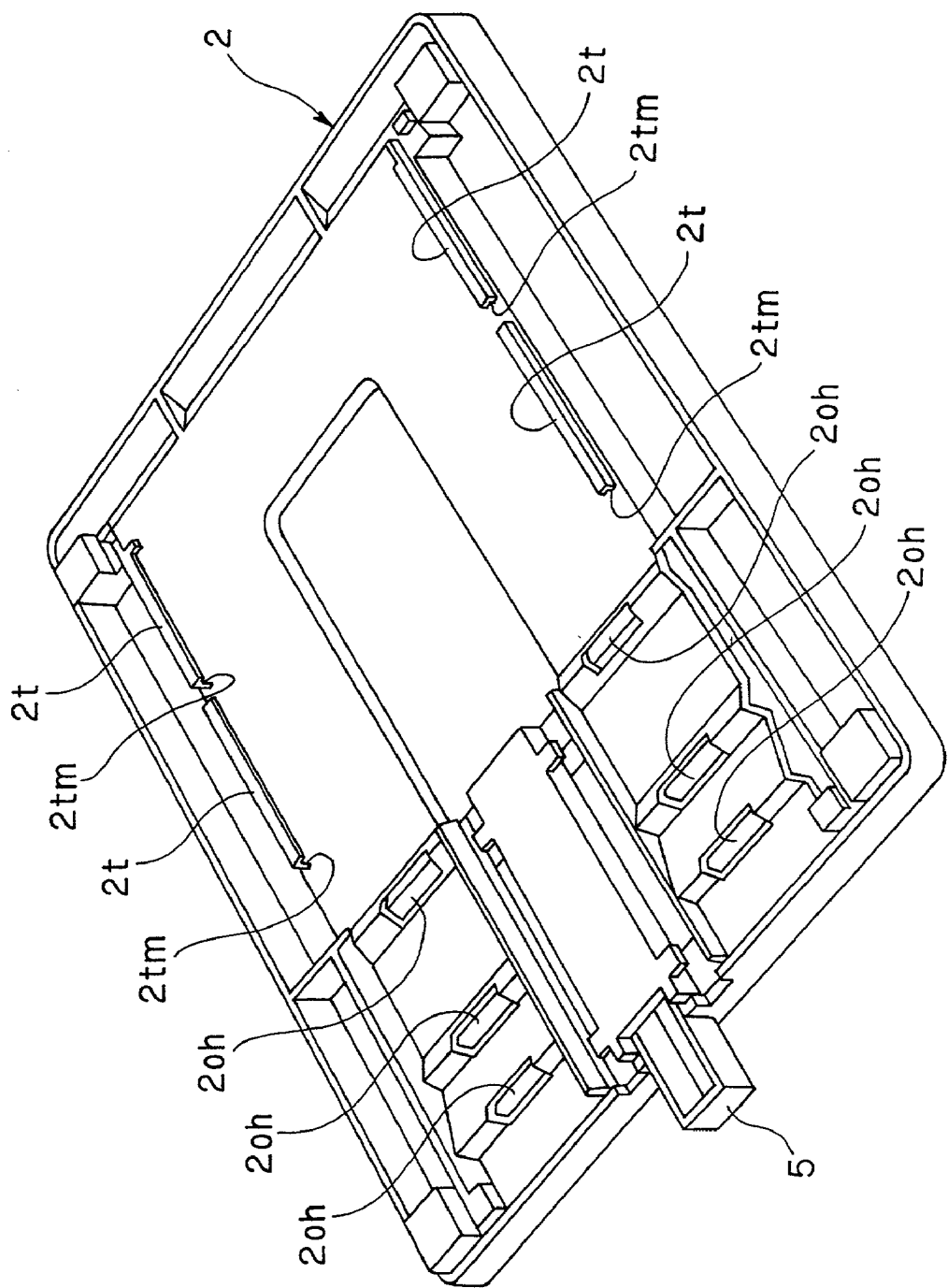
FIG. 3 is a perspective view, as seen from the back side, of the tilt base, to which a tilt button is attached, in the first embodiment of the electronic equipment mounting angle varying apparatus according to the present invention.

Furthermore, on the back surface of the tilt base 2, as shown in FIG. 3, a pair of base guide rails 2t and 2t is erected for attaching the telephone number card affixing tray 50t.

Each base guide rail 2t is configured so that it is divided into two parts in the longitudinal direction, molded so as to have an L-shaped cross-section of substantially the same shape as the guide rails on the lower surface of the telephone set 50 so that the telephone number card affixing tray 50t can engage and slide along the inner channels 2tm thereof.

Here, the telephone number card affixing tray 50t is configured so that the sides thereof are made to engage the inner channels 2tm of the pair of base guide rails 2t, and so that it is attached to the mounting angle varying apparatus 1 by sliding toward the back thereof.

Figure 4A:
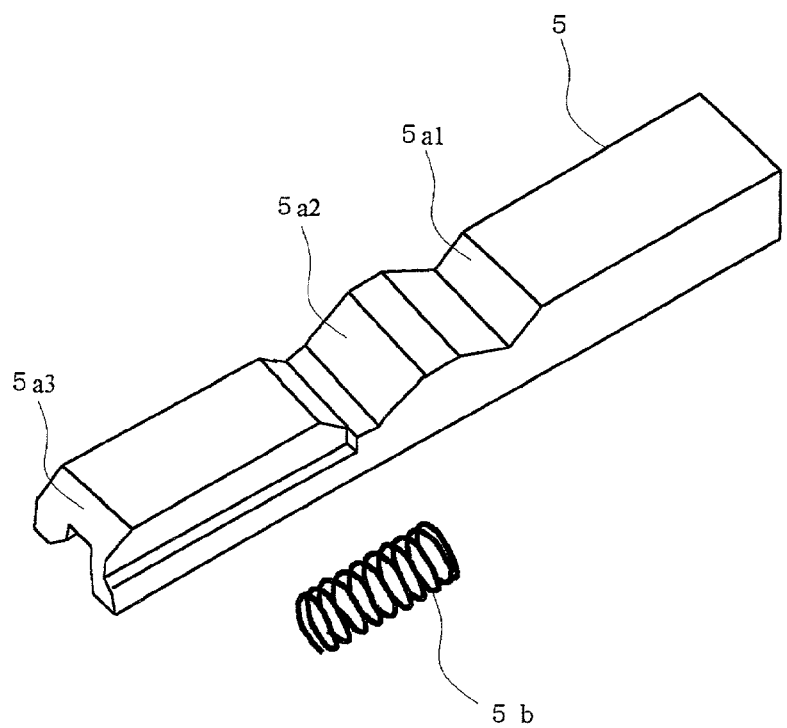
FIGS. 4(*a*) and 4(*b*) are exploded views of a tilt button representing the first embodiment of the electronic equipment mounting angle varying apparatus according to the present invention, and a perspective view of that tilt button from the back side, respectively.

The tilt button 5 is a molded resin product molded using upper and lower dies, exhibiting a long rectangular parallelepiped shape, as shown in FIG. 4, in the upper surface whereof are molded three sloping guide surfaces (operating guide portions) 5a1, 5a2, and 5a3 that are sloping surfaces for guiding arm guide ribs 4a (described farther below).

Figure 4B:
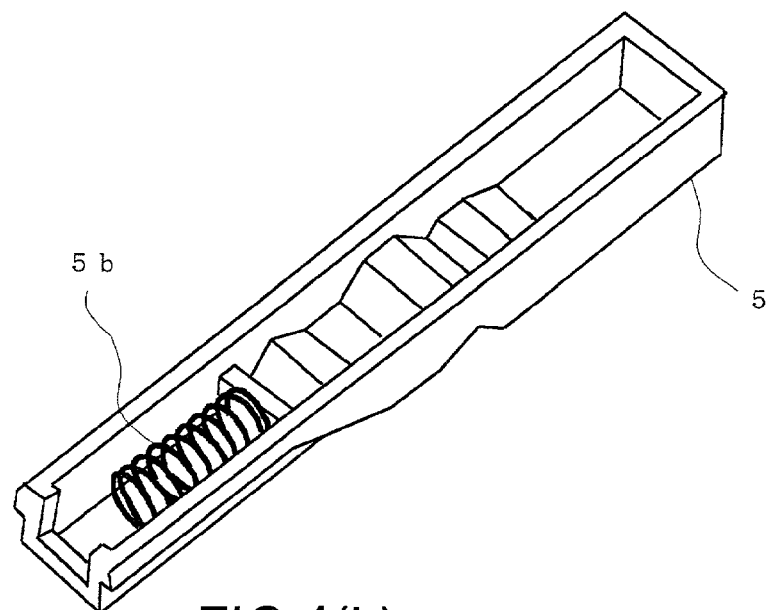
Figure 17A:
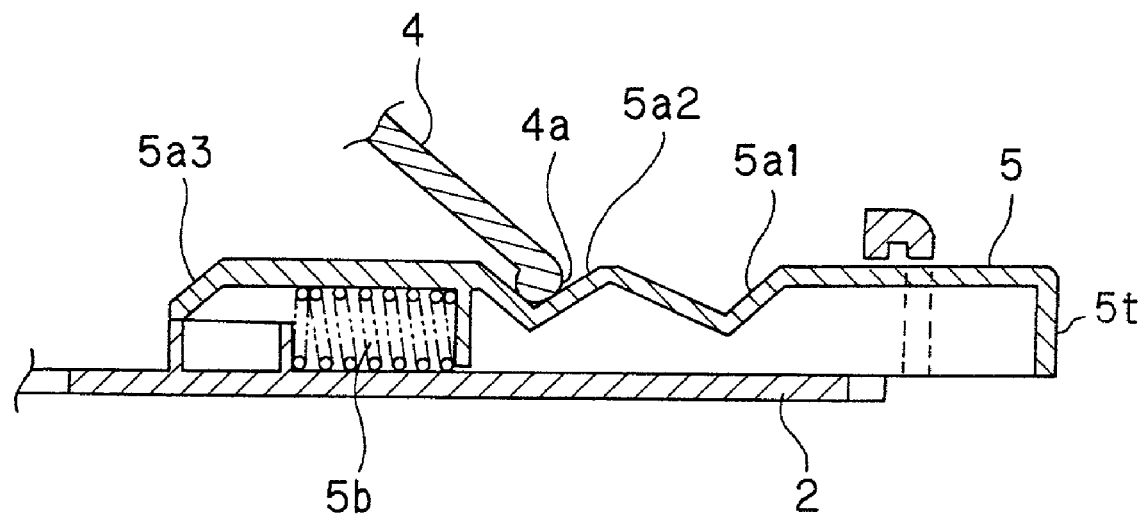
FIGS. 17(*a*) and 17(*b*) are sections of the first embodiment of the electronic equipment mounting angle varying apparatus according to the present invention, at the XVII(a)—XVII(a) and XVII(b)—XVII(b) lines, respectively, as shown in FIG. 16.
Figure 20A:
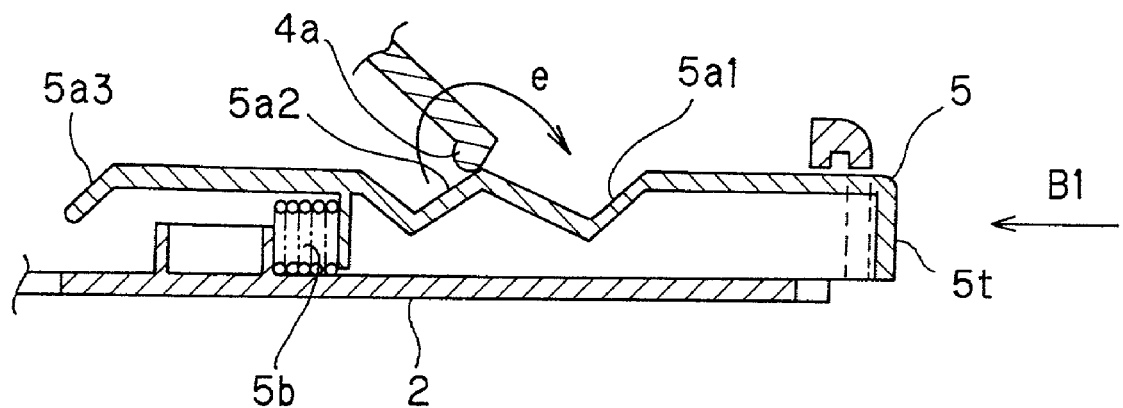
FIGS. 20(*a*) and 20(*b*) are sections of the first embodiment of the electronic equipment mounting angle varying apparatus according to the present invention, at the XX(a)—XX(a) and XX(b)—XX(b) lines, respectively, as shown in FIG. 18.

On the inside of the tilt button 5, as shown in FIGS. 4(b), 17(a) and 20(a), the configuration is made to accommodate a compression spring (return means) 5b having an action to return the tilt button 5.

By having the compression spring 5b accommodated inside the tilt button 5, as shown in FIG. 2, the tilt button 5 is always under the effect of an elastic force to the direction of the arrow B2 with respect to the tilt base 2, and is thereby urged to return to the return position (normal position). Therefore, the tilt button 5 is always positioned in the return position unless pressing force is applied toward the direction of the arrow B1.

More specifically, the tilt button 5 moves in the direction toward the inside of the tilt base 2 (operating position) when a user presses the outer end (operating portion) 5t of the tilt button 5 in the direction of the arrow B1, and, when the user stops pressing the tilt button 5, the tilt button 5 moves in the B2 direction due to the elastic force of the compression spring 5b, returning to the return position of the tilt button 5 indicated in FIG. 2.

Figure 5:
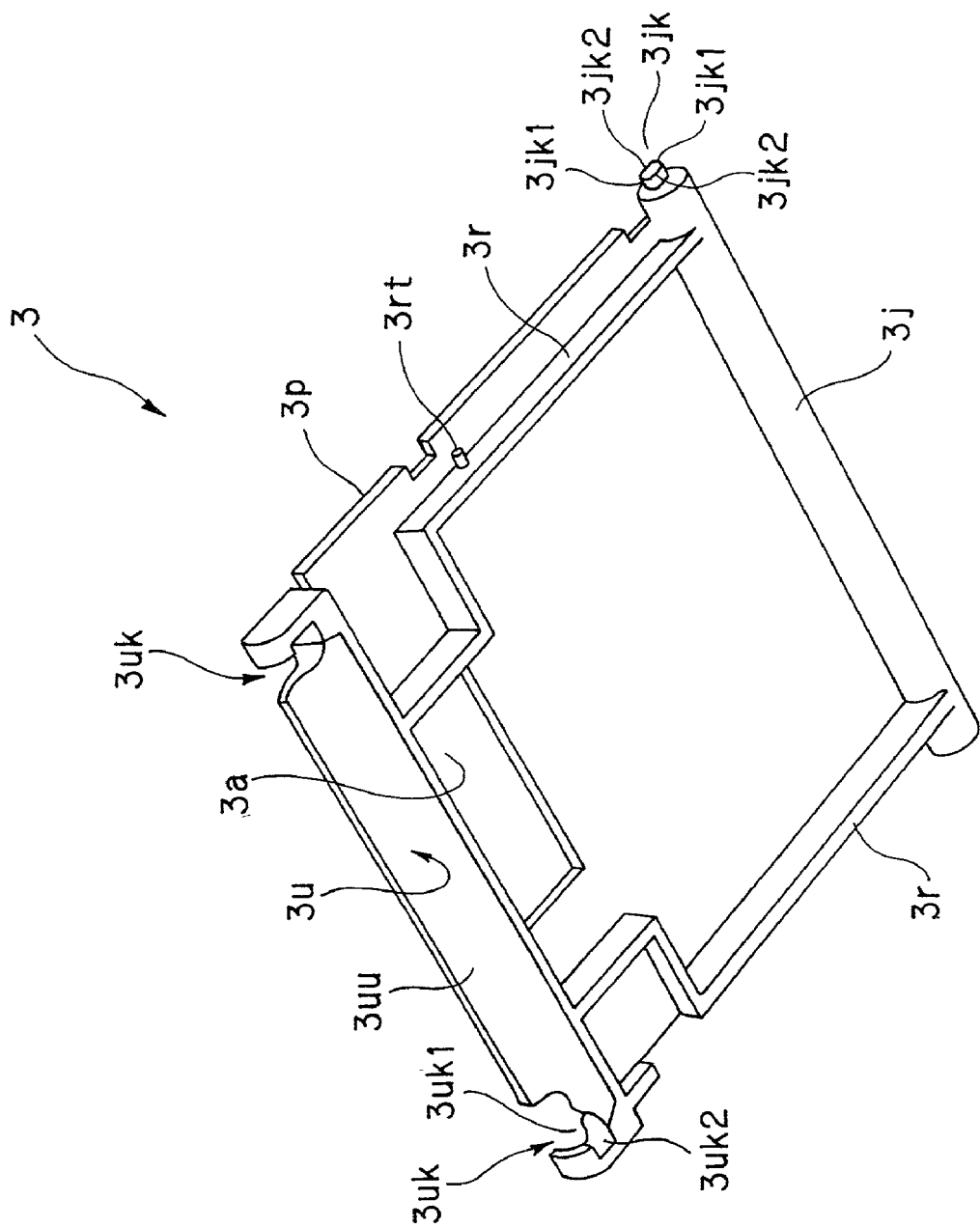
FIG. 5 is a perspective view, as seen from the bottom side, of a tilt cover representing the first embodiment of the electronic equipment mounting angle varying apparatus according to the present invention.

The tilt cover 3 noted earlier is a molded resin product molded using an upper and lower die, and presenting a flat rectangular parallelepiped shape as shown in FIG. 5.

In the upper surface of the tilt cover 3 is formed a thin panel-form telephone set attachment panel 3p, having approximately the same thickness and size as the telephone number card affixing tray 50t, for engaging the guide rails in the lower surface of the telephone set 50, as shown in FIG. 5.

In the middle of the outer surfaces of cover ribs 3r formed in the two lower sides portions of the telephone set attachment panel 3p are formed cover securing projections 3rt which present a short circular columnar shape or hemispherical shape, respectively erected so as to be oriented toward the outside.

The cover securing projections 3rt latch the cover securing holes 2ro in the cover securing ribs 2r, when the mounting angle for the telephone set 50 is 0 degrees, and anchor the tilt cover 3 to the tilt base 2.

At one end of the tilt cover 3 is formed a cover turning shaft (base support shaft portion; main shaft portion) 3j having a cylindrical surface (first cylindrical surface) a predetermined diameter. At either end of the cover turning shaft 3j, respectively, cover shaft engagement portions (base support shaft portion; fitting shaft portion) 3jk are projected, concentrically with the cover turning shaft 3j, mutually exhibiting the same shape.

The cover shaft engagement portions 3jk, as shown in FIG. 5 and FIG. 14(a), are each formed so as to comprise cylindrical portions (second cylindrical surface) 3jk1 having a cylindrical face of a diameter 13 that is partially cut away by parallel flat portions (fitting surface for fitting shaft portion) 3jk2 which are separated from each other by the dimension 14, and a cylindrical portions 3jk1 having a diameter 13.

Here, the cover axis engagement portions 3jk are configured so as to fit inside the cover axis engagement holes 2uk, with the flat portions 3jk2 and 3jk2 inserted in parallel into the cover fitting holes 2uk2 of the cover axis engagement holes 2uk.

Accordingly, the configuration is such that, when the cover shaft engagement portions 3jk are removed from inside the cover axis engagement holes 2uk, the flat portions 3jk2 of the cover shaft engagement portions 3jk are inserted in parallel into the cover fitting holes 2uk2 and removed from the cover axis engagement holes 2uk.

In this manner, the cover shaft engagement portions 3jk fitted inside the cover axis engagement holes 2uk slide and turn inside the cover cylinder hole portions 2uk1 of the cover axis engagement holes 2uk by the cylindrical portions 3jk1.

Accordingly, while the dimension 14 between the flat portions 3jk2 and 3jk2 is set shorter (14<12) than the vertical dimension 12 of the cover fitting hole 2uk2, the diameter 13 of the cylindrical portions 3jk1 is set shorter (13<11) than the diameter 11 of the cover cylinder hole portion 2uk1.

Furthermore, when the mounting angle varying apparatus 1 is in use, when the flat portions 3jk2 and 3jk2 of the cover shaft engagement portions 3jk of the tilt cover 3 become parallel with the cover fitting holes 2uk2 of the cover axis engagement holes 2uk, the cover shaft engagement portions 3jk will be removed from the cover axis engagement holes 2uk, wherefore, when the mounting angle varying apparatus 1 is in use, the angle of the flat portions 3jk2 and 3jk2 of the cover shaft engagement portions 3jk relative to the tilt cover 3 is set so that the flat portions 3jk2 and 3jk2 of the cover shaft engagement portions 3jk will not become parallel with the cover fitting holes 2uk2 of the cover axis engagement holes 2uk.

As described in the foregoing, from the fact that the cover turning shaft 3j and the cover shaft engagement portions 3jk are concentric, as shown in FIG. 14(c), the cover turning shaft 3j of the tilt cover 3 is received by the cover axis receiving concavity 2uu of the tilt base 2 on one side, and, together therewith, as shown in FIG. 14(a), the cylindrical portions 3jk1 of the cover shaft engagement portions 3jk at both ends of the cover turning shaft 3j are received by the cover cylinder hole portions 2uk1 in the cover axis engagement holes 2uk of the tilt base 2 on the other side, whereby the tilt cover 3 is pivoted relative to the tilt base 2 about the cover turning shaft 3j that is shaft-supported by the cover axis receiving concavity 2uu of the tilt base 2.

At the other end of the tilt cover 3 is formed an arm bearing portion (3u into which is engaged an arm turning shaft 4j (described farther below) of the tilt arm 4.

Figure 15A:
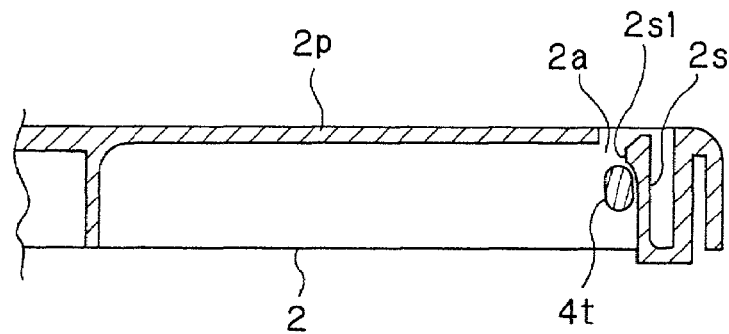
FIGS. 15(*a*), 15(*b*), 15(*c*), and 15(*d*), are sections of the first embodiment of the electronic equipment mounting angle varying apparatus according to the present invention, at the XV(a)—XV(a), XV(b)—XV(b), XV(c)—XV(c) and XV(d)—XV(d) lines, respectively, as shown in FIG. 13.
Figure 15B:
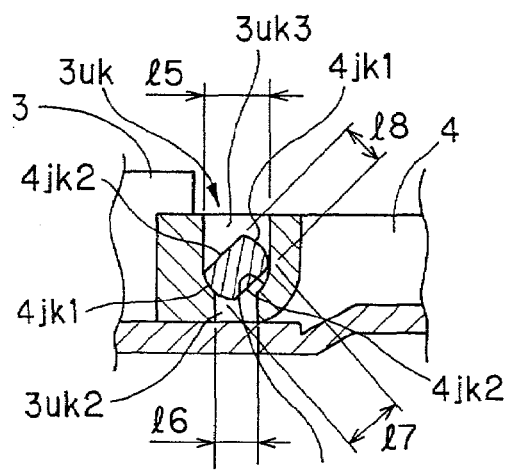
Figure 15C:
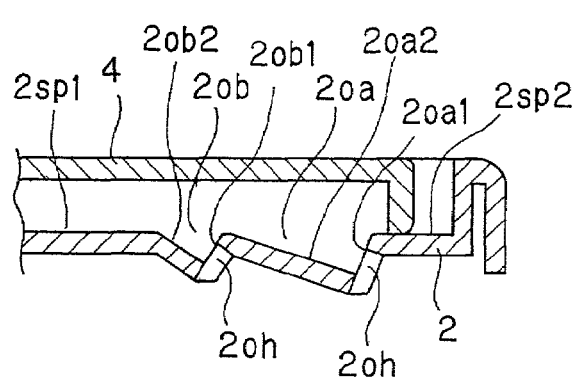

At both ends of the arm bearing portion (mounting support shaft bearing portion) 3u, as shown in FIG. 5 and FIG. 15(b), are formed arm shaft engagement holes 3uk, respectively, and the arm shaft engagement holes 3uk are formed so as to pass through in the vertical direction.

The arm shaft engagement holes (mounting fitting shaft bearing portion) 3uk have cylindrical hole portions 3uk1 formed in the centers thereof. The cylindrical hole portions (fourth bearing portion) 3uk1 are semi-cylindrical holes oriented upward having a diameter 15, wherein the cylindrical portions 4jk1 (described farther below) of the arm shaft engagement portion slide so as to turn freely.

Upward from each of the cylindrical hole portions 3uk1, a punched hole (die extraction space of mounting fitting shaft bearing portion) 3uk3 that is a rectangular parallelepiped hole is formed so as to pass through vertically. The punched holes 3uk3 have a vertical dimension that is greater than the diameter 15 of the cylindrical hole portions 3uk1 and a width greater than the width of the cylindrical hole portions 3uk1.

Downward from the cylindrical hole portions 3uk1, arm fitting holes (second attachment hole) 3uk2 that are rectangular parallelepiped holes are formed so as to pass through vertically downward. These arm fitting holes 3uk2 have parallel faces (fitting surface of second attachment hole) separating each other with a distance equal to a vertical dimension 16 (<15) that is less than the diameter 15 of the cylindrical hole portions 3uk1.

Figure 15D:
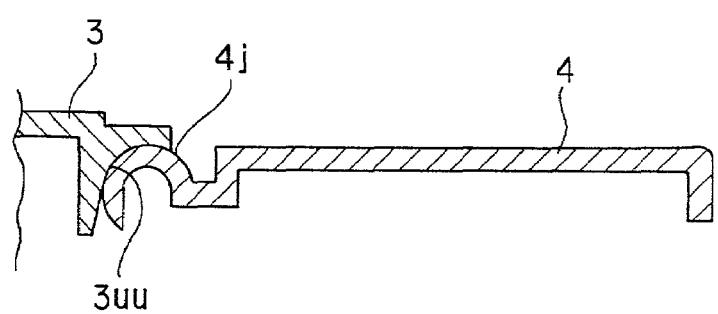

From the arm shaft engagement hole 3uk at one end in the arm bearing portion 3u to the arm shaft engagement hole 3uk at the other end, as shown in FIG. 5 and FIG. 15(d), an arm bearing concavity (third bearing portion) 3uu having a circular arc shaped cross-section is formed so as to open (die extraction space) downward. The arm bearing concavity 3uu is such that an arm turning shaft 4j slides so as to turn freely, and has a diameter that is slightly larger than the diameter of the arm turning shaft 4j.

As described in the foregoing, the arm shaft engagement holes 3uk in the arm bearing portion 3u are formed so as to pass through in the vertical direction. The punched holes 3uk3 upward from the cylindrical hole portions 3uk1 are formed larger than the cylindrical hole portions 3uk1, wherefore these can be molded using a trimming die assembly.

Similarly, the arm bearing concavity 3uu in the arm bearing portion 3u is formed so that it is open toward the bottom, wherefore it can be molded using a trimming die assembly.

In this manner, the arm bearing portion 3u has a configuration that can be molded using a trimming die assembly.

Also, a cord insertion hole 3a for the insertion of a connecting cord for the telephone set 50 is formed in the upper surface of the tilt cover 3.

Figures 6A, 6B:
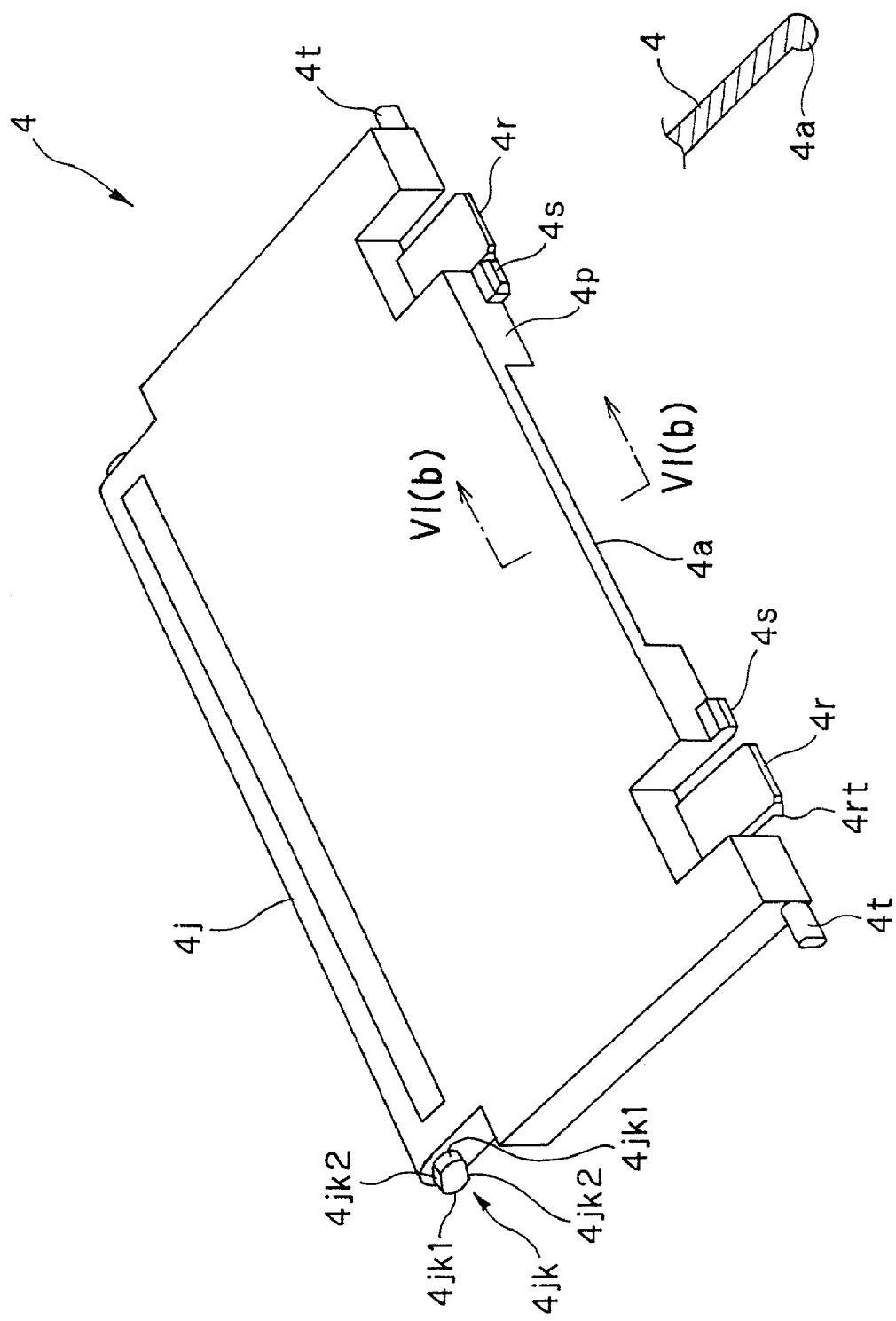
FIGS. 6(*a*) and 6(*b*) are perspective views, from the bottom, of a tilt arm representing the first embodiment of the electronic equipment mounting angle varying apparatus according to the present invention, and a section at the VI(b)—VI(b) line therein, respectively.
Figure 7:
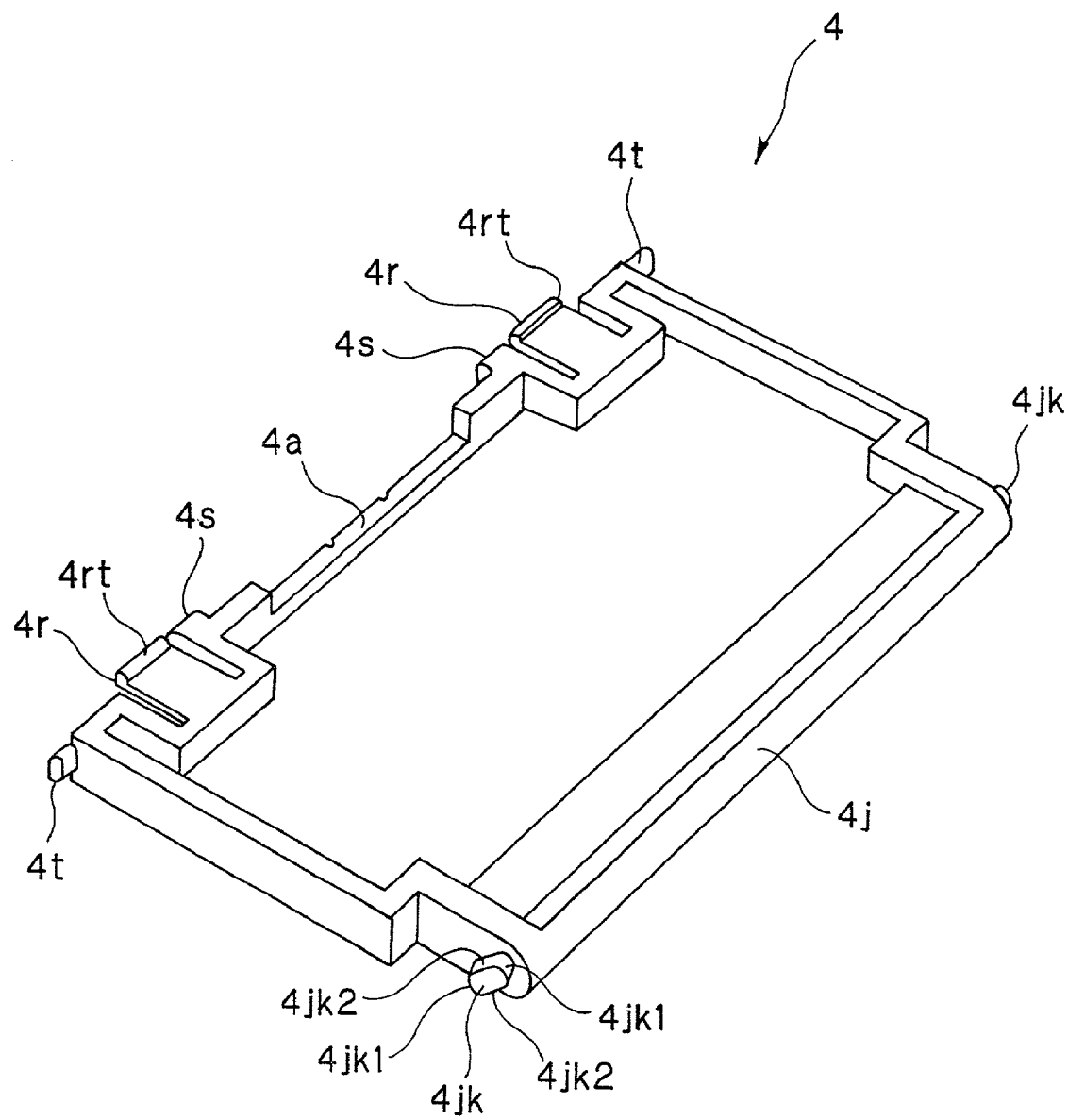
FIG. 7 is a perspective view, as seen from the bottom, of a tilt arm representing the first embodiment of the electronic equipment mounting angle varying apparatus according to the present invention.

The tilt arm 4 described earlier is a molded resin product that is molded using an upper and lower die, presenting a flat rectangular parallelepiped shape, as shown in FIG. 6 and FIG. 7.

At one end of the tilt arm 4, an arm turning shaft (mounting support shaft portion; mounting main shaft portion) 4j having a cylindrical surface (third cylindrical surface) of a predetermined diameter is formed, and at either end of the arm turning shaft 4j, respectively, are projected arm shaft engagement portions (mounting support shaft portion; mounting fitting shaft portion) 4jk which are concentric with the arm turning shaft 4j and mutually exhibit the same shape.

The arm shaft engagement portions 4jk, as shown in FIGS. 6, 7, and 15(b), are formed so as to comprise parallel flat portions (fitting surface of mounting fitting shaft portion) 4jk2 separated by the dimension 18 and cylindrical portions 4jk1 having a diameter 17.

Here, the arm shaft engagement portions 4jk are configured so that they fit into the arm shaft engagement holes 3uk with the flat portions 4jk2 inserted in a parallel manner in the arm fitting holes 3uk2 of the arm shaft engagement holes 3uk in the tilt cover 3.

Accordingly, the configuration is such that, when the arm shaft engagement portions 4jk are removed from inside the arm shaft engagement holes 3uk, the flat portions 4jk2 of the arm shaft engagement portions 4jk are inserted in parallel into the arm fitting holes 3uk2 and removed from the cover axis engagement holes 2uk.

In this manner, the arm shaft engagement portions 4jk fitted inside the arm shaft engagement holes 3uk slide and turn inside the cylindrical hole portions 3uk1 of the arm shaft engagement holes 3uk by the cylindrical portions 4jk1.

Accordingly, while the dimension 18 between the flat portions 4jk2 is set shorter (18<16) than the vertical dimension 16 of the arm fitting holes 3uk2, the diameter 17 of the cylindrical portions 4jk1 is set shorter (17<15) than the diameter 15 of the cylindrical hole portions 3uk1.

Furthermore, when the mounting angle varying apparatus 1 is in use, when the flat portions of the arm shaft engagement portions 4jk of the tilt arm 4 become parallel with the arm fitting holes 3uk2 of the arm shaft engagement holes 3uk, the arm shaft engagement portions 4jk will be removed from the arm shaft engagement holes 3uk, wherefore, when the mounting angle varying apparatus 1 is in use, the angle of the flat portions 4jk2 of the arm shaft engagement portions 4jk relative to the tilt arm 4 is set so that the flat portions 4jk2 of the arm shaft engagement portions 4jk will not become parallel with the arm fitting holes 3uk2 of the arm shaft engagement holes 3uk.

As described in the foregoing, from the fact that the arm turning shaft 4j and the arm shaft engagement portions 4jk are concentric, as shown in FIG. 15(d), the arm turning shaft 4j of the tilt arm 4 is received by the arm bearing concavity 3uu of the tilt cover 3 on one side, and, together therewith, as shown in FIG. 15(b), the cylindrical portions 4jk1 of the arm shaft engagement portions 4jk at both ends of the arm turning shaft 4j are received by the cylindrical hole portions 3uk1 in the arm shaft engagement holes 3uk of the tilt cover 3 on the other side, whereby the tilt arm 4 is pivoted relative to the tilt cover 3 about the arm turning shaft 4j that is shaft-supported by the arm bearing concavity 3uu of the tilt cover 3.

In the two side surfaces at the other end of the tilt arm 4, arm engaging projections 4t having an elliptical cross-section are projected so as to be oriented toward the outside.

In the lower part of the edge at the other end of the tilt arm 4, bending ribs (arm latching portion; elastic latching portion) 4r are projected so as to be oriented as a pair toward the outside, at the tips whereof are formed bending pawls (convex portion) 4rt that project downward.

Adjacent to the bending ribs 4r, on the inside thereof, is projected a pair of positioning ribs (arm latching portion; positioning latching portion) 4s that present a flat rectangular parallelepiped shape, oriented toward the outside, respectively, the upper and lower corners of the tip part whereof are chamfered.

In the center of the lower part at the other end of the tilt arm 4, an arm guide rib (arm guide portion) 4a having the cross-sectional shape as shown in FIG. 6(b) is formed, across a predetermined length.

In the configuration described above, moreover, for the shaft bearing structure between the tilt base 2 and tilt cover 3, the cover shaft bearing 2u which is a shaft bearing portion was formed in the tilt base 2, and a cover turning shaft 3j that is a shaft portion and the cover shaft engagement portions 3jk were formed in the tilt cover 3. Conversely, however, a shaft portion may be formed in the tilt base 2 and a shaft bearing portion formed in the tilt cover 3.

For the shaft bearing structure between the tilt cover 3 and the tilt arm 4, moreover, the arm bearing portion 3u which is a shaft bearing portion was formed in the tilt cover 3, and the arm turning shaft 4j which is a shaft portion and the arm shaft engagement portions 4jk were formed in the tilt arm 4. Conversely, however, a shaft portion may be formed in the tilt cover 3 and a shaft bearing portion formed in the tilt arm 4.

A description is given next of the way in which the mounting angle varying apparatus 1 configured using the parts described above is assembled.

Figure 8:
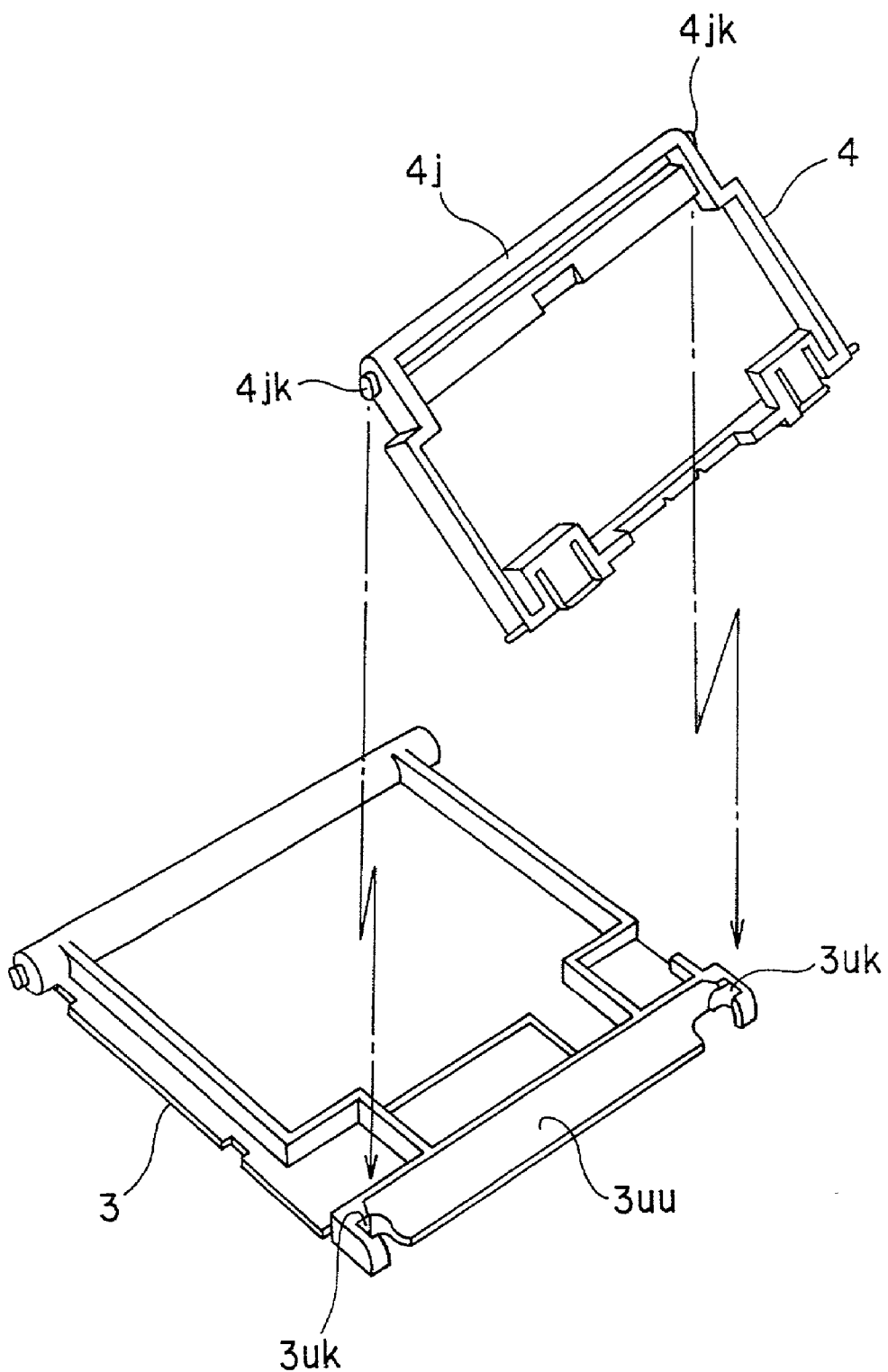
FIG. 8 is a perspective view showing how a tilt cover and tilt arm in the first embodiment of the electronic equipment mounting angle varying apparatus according to the present invention are assembled.
Figure 9:
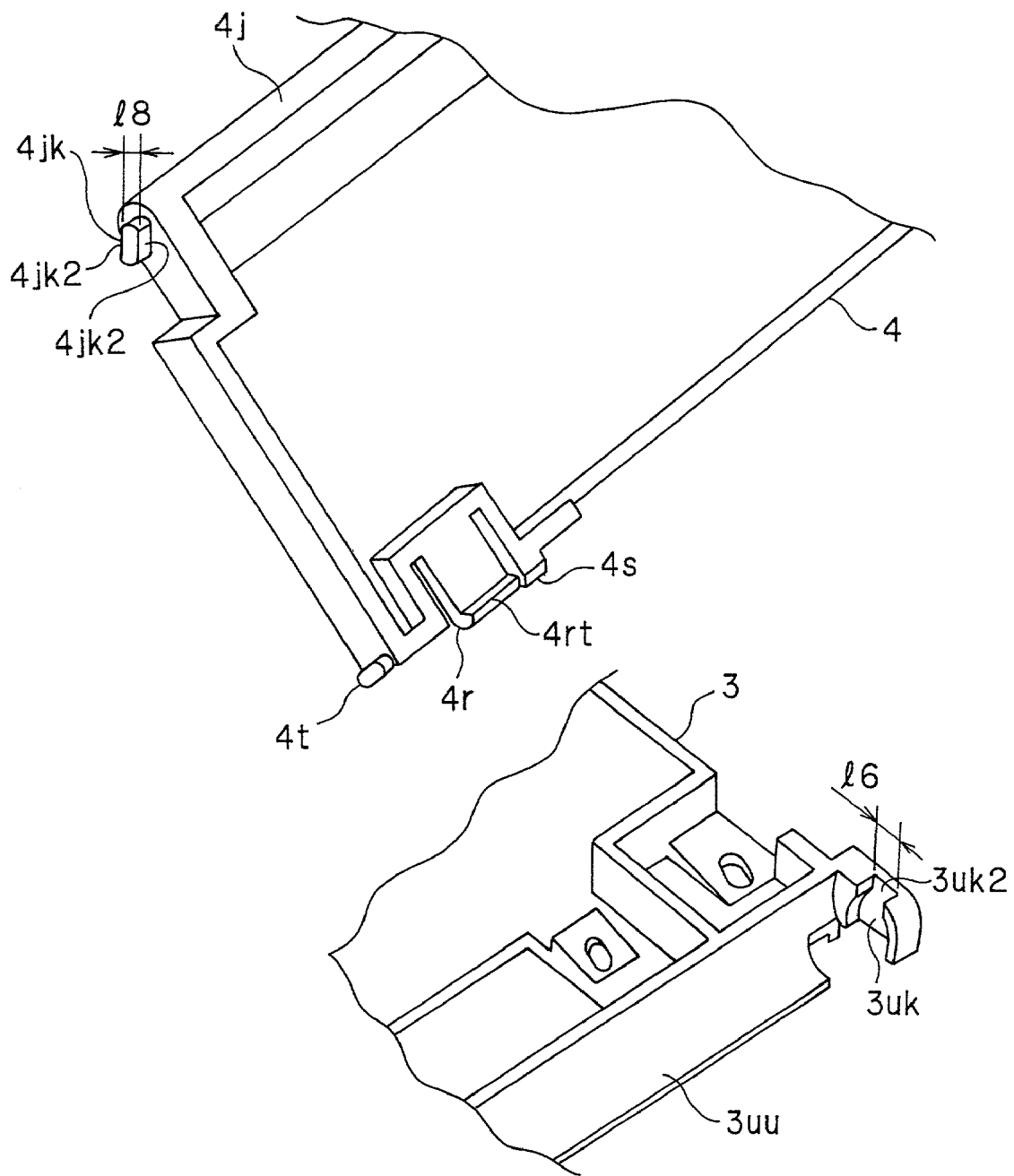
FIG. 9 is an enlarged view of main parts, showing how the tilt cover and tilt arm in the first embodiment of the electronic equipment mounting angle varying apparatus according to the present invention shown in FIG. 8 are assembled.

First, as shown in FIG. 8 and FIG. 9, the flat portions 4jk2 of the arm shaft engagement portions 4jk in the tilt arm 4 are joined in parallel to the arm fitting holes 3uk2 of the arm bearing portion 3u of the tilt cover 3, and the arm turning shaft 4j of the tilt arm 4 is attached so that it can turn freely in the arm bearing concavity 3uu of the tilt cover 3 by inserting the arm shaft engagement portions 4jk at the two ends of the arm turning shaft 4j into the arm shaft engagement holes 3uk at the two ends of the arm bearing portion 3u, thereby pivotally joining the tilt arm 4 and the tilt cover 3 (see FIGS. 15(b) and 15(d)).

In this manner, the tilt arm 4 and tilt cover 3 are bearing-supported so that they freely swing about the tilt cover support shaft axis (mounting member support shaft axis) that is the center axis of the arm turning shaft 4j.

Moreover, as described earlier, the dimension 18 between the flat portions 4jk2 of the arm shaft engagement portions 4jk of the tilt arm 4 and the vertical dimension 16 of the arm fitting holes 3uk2 of the arm shaft engagement holes 3uk of the tilt cover 3 satisfy the relationship 18<16, wherefore the arm shaft engagement portions 4jk of the tilt arm 4 fit smoothly into the arm shaft engagement holes 3uk of the tilt cover 3.

Here, the arm shaft engagement portions 4jk of the tilt arm 4 and the arm fitting holes 3uk2 of the arm bearing portion 3u of the tilt cover 3 are molded so that the arm shaft engagement portions 4jk in the tilt arm 4 fit into the arm fitting holes 3uk2 of the arm bearing portion 3u of the tilt cover 3, or so that the relative position between the detached tilt arm 4 and tilt cover 3 is a position that cannot be attained while the mounting angle varying apparatus 1 is in use.

Accordingly, the configuration is made so that, while the mounting angle varying apparatus 1 is in use, the tilt arm 4 and the tilt cover 3 cannot become detached.

Figure 10:
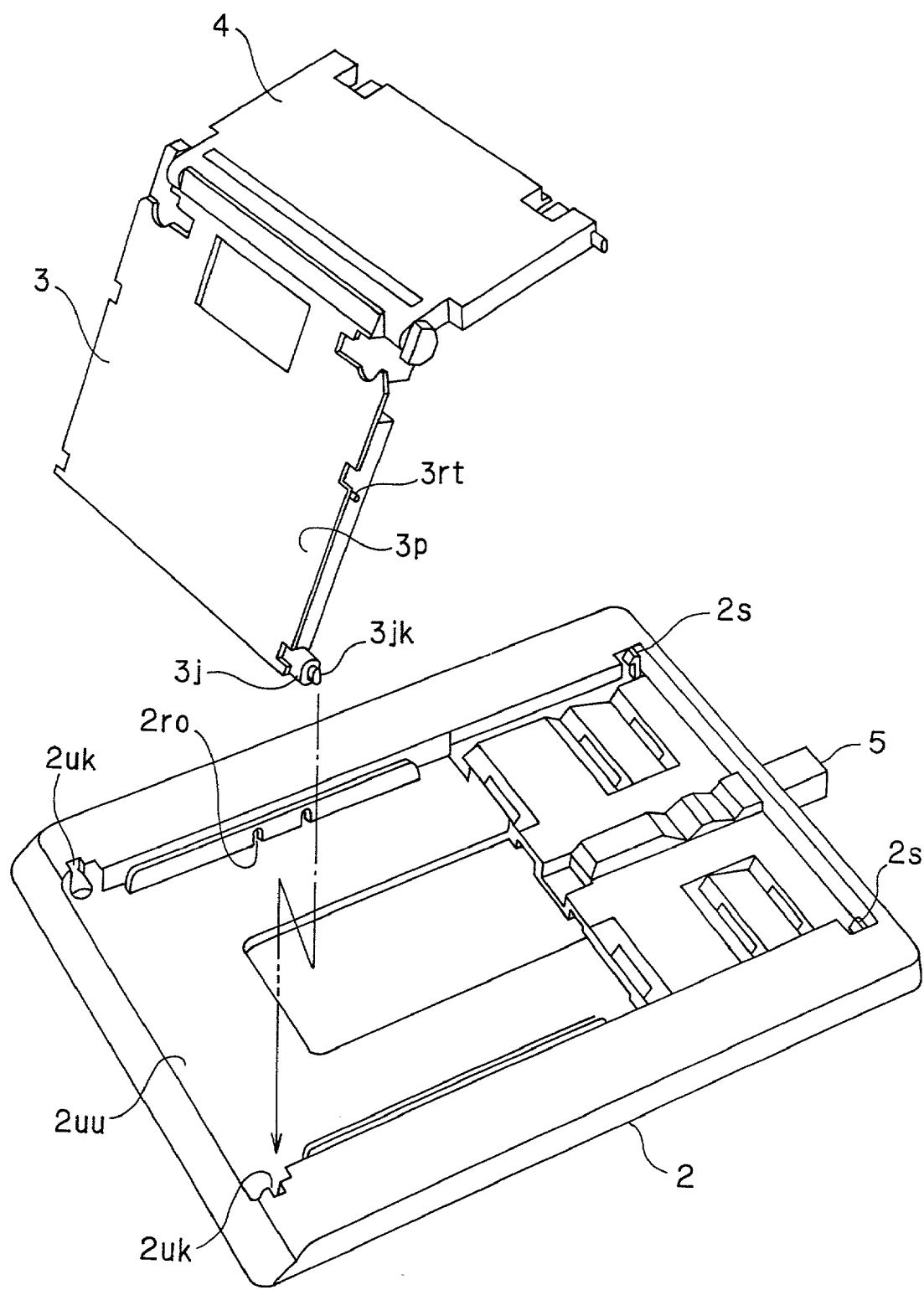
FIG. 10 is a perspective view showing how the tilt cover and tilt arm are assembled to the tilt in the first embodiment of the electronic equipment mounting angle varying apparatus according to the present invention.
Figure 11:
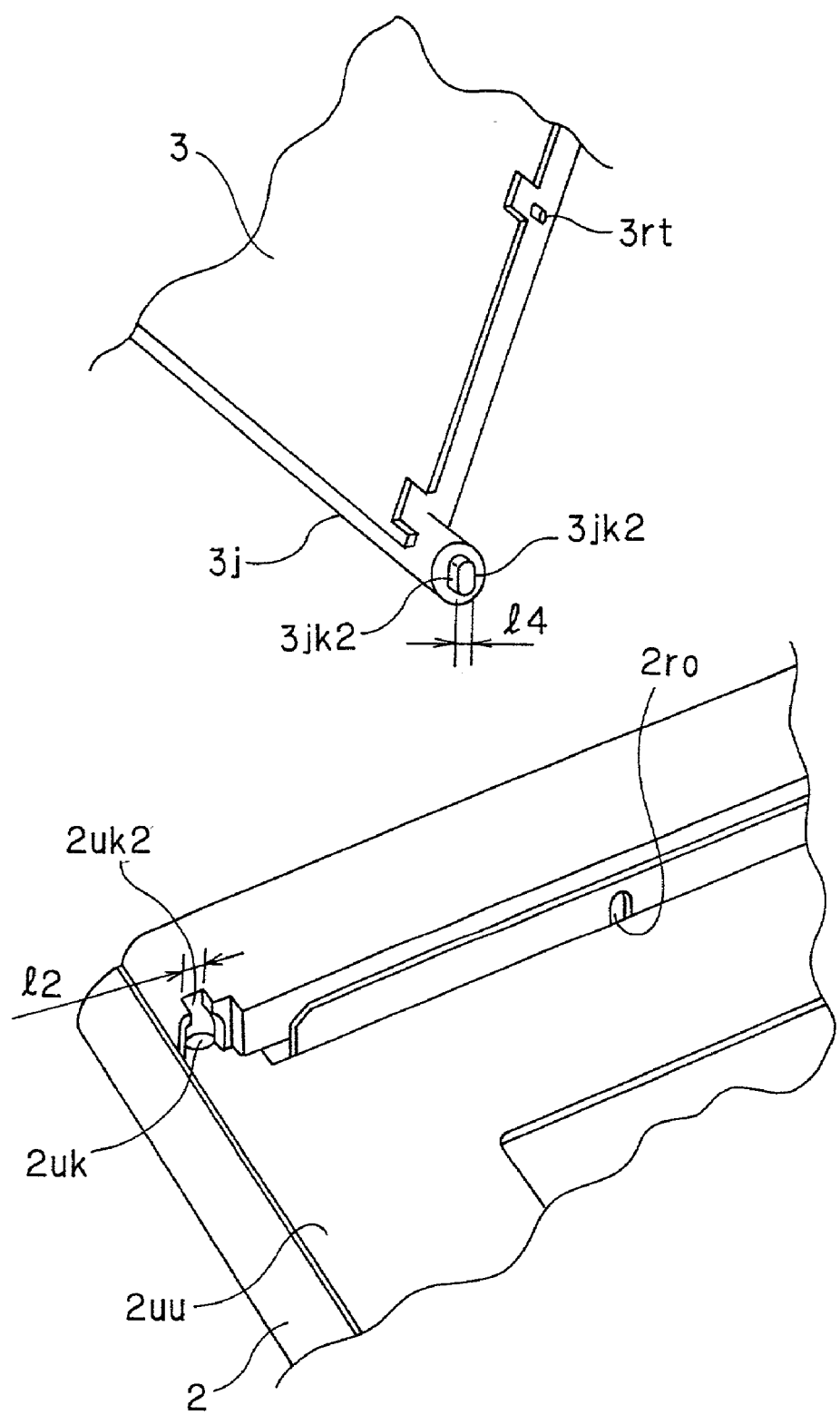
FIG. 11 is an enlarged view of main parts, showing how the tilt cover and tilt arm are assembled to the tilt base in the first embodiment of the electronic equipment mounting angle varying apparatus according to the present invention shown in FIG. 10.

Next, as shown in FIG. 10 and FIG. 11, the tilt arm 4 and tilt cover 3 assembly is attached to the tilt base 2 wherein the tilt button 5 has been installed.

More specifically, the flat portions 3jk2 of the cover shaft engagement portions 3jk in the tilt cover 3 are run in parallel into the cover fitting holes 2uk2 of the cover shaft bearing 2u of the tilt base 2, and the cover shaft engagement portions 3jk at the two ends of the cover turning shaft 3j are inserted into the cover axis engagement holes 2uk at the two ends of the cover shaft bearing 2u so as to attach the cover turning shaft 3j of the tilt cover 3 so that it turns freely in the cover axis receiving concavity 2uu of the tilt base 2, thereby pivotally joining the tilt arm 4 and tilt cover 3 assembly to the tilt base 2.

In this manner, the tilt cover 3 and tilt base 2 are shaft-supported so that they swing freely about the tilt base support shaft axis (base support shaft axis) that is the center axis of the cover turning shaft 3j.

Moreover, as described earlier, the dimension 14 between the flat portions 3jk2 of the cover shaft engagement portions 3jk of the tilt cover 3 and the width dimension 12 of the cover fitting holes 2uk2 of the cover axis engagement holes 2uk of the tilt base 2 satisfy the relationship 14<12, wherefore the cover shaft engagement portions 3jk of the tilt cover 3 fit smoothly into the cover axis engagement holes 2uk of the tilt base 2.

Here, the cover shaft engagement portions 3jk in the tilt cover 3 fit into the cover fitting holes 2uk2 of the cover shaft bearing 2u in the tilt base 2, or, alternatively, the cover shaft engagement portions 3jk of the tilt cover 3 and the cover fitting holes 2uk2 in the cover shaft bearing 2u of the tilt base 2 are formed so that the relative position between the removed tilt cover 3 and tilt base 2 is a position that cannot be obtained while using the angle varying apparatus 1.

Accordingly, the configuration is made so that it is not possible for the tilt cover 3 and tilt base 2 to come apart while the angle varying apparatus 1 is in use.

Then, when the tilt cover 3 is turned and closed against the tilt base 2, as shown in FIG. 14(b), the cover securing projections 3rt in the cover ribs 3r at both sides in the tilt cover 3 are latched into the cover securing holes 2ro in the cover securing ribs 2r of the tilt base 2.

Furthermore, as shown in FIG. 12(a), the tilt arm 4 is turned in the direction of the arrow C, about the arm turning shaft 4j shaft-supported in the arm bearing concavity 3uu, relative to the tilt cover 3 that is fit into the tilt base 2, and the arm engaging projections 4t of the tilt arm 4 are inserted into the arm securing holes 2a.

Figure 13:
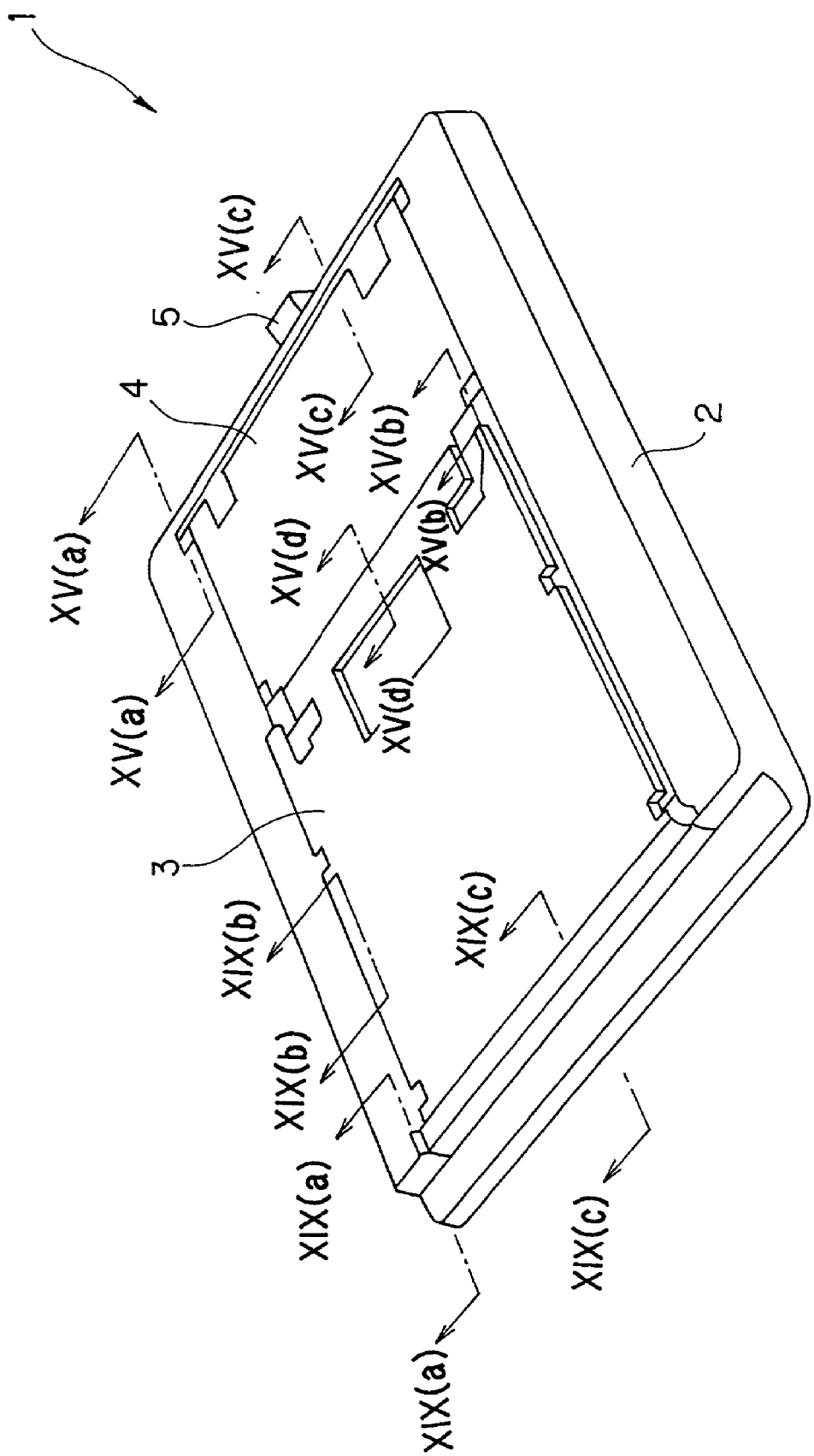
FIG. 13 is a perspective view representing the condition of the tilt cover and tilt arm being fitted to the tilt base in the first embodiment of the electronic equipment mounting angle varying apparatus according to the present invention.

When that is done, the arm securing projections 2s1 in the arm securing ribs 2s are pressed in the direction of the arrow d by the arm engaging projections 4t in the tilt arm 4, the arm securing ribs 2s are elastically deformed, the arm engaging projections 4t in the tilt arm 4 are fit tightly below the arm securing projections 2s1 of the arm securing ribs 2s, as shown in FIG. 12(b), and engaged therewith as shown in FIG. 13 and FIG. 15(a).

The condition wherein the tilt cover 3 and tilt arm 4 have been integrally fit into the tilt base 2, that is, the mounting angle varying apparatus 1 when the mounting angle of the telephone set 50 indicated in FIG. 1 is 0 degrees (see FIG. 28(a)), is shown in FIG. 13.

In the example described in the foregoing, moreover, the configuration is made so that the cover fitting holes 2uk2 in the cover shaft engagement hole 2uk of the tilt base 2 have the fitting surfaces 2uk21 and 2uk21, and so that the cover shaft engagement portions 3jk of the tilt cover 3 comprise cylindrical portions 3jk1 and 3jk1 that are cut out by the parallel flat portions 3jk2 and 3jk2. However, there is no absolute necessity for the cover fitting holes 2uk2 and cover shaft engagement portions 3jk to have fitting surfaces, and other curved surface shapes or the like may be had so long as such conditions as the cover fitting holes 2uk2 being capable of die extraction in the upward direction are satisfied, and it is possible for the cover shaft engagement portions 3jk of the tilt cover 3 to fit into the cover shaft engagement hole 2uk of the tilt base 2.

Similarly, in the example described in the foregoing, the configuration is made so that the arm fitting holes 3uk2 of the arm shaft engagement holes 3uk in the tilt cover 3 have fitting surfaces, and so that the arm shaft engagement portions 4jk of the tilt arm 4 comprise cylindrical portions 4jk1 and 4jk1 that are cut out by the parallel flat portions 4jk2 and 4jk2, but there is no absolute necessity for the arm fitting holes 3uk2 and arm shaft engagement portions 4jk to have fitting surfaces, and other curved surface shapes or the like may be had so long as such conditions as the arm fitting holes 3uk2 being capable of die extraction in the upward direction are satisfied, and it is possible for the arm shaft engagement portions 4jk of the tilt arm 4 to fit into the arm shaft engagement holes 3uk of the tilt cover 3.

Next, the operation of the angle varying apparatus 1 is described.

Figure 16:
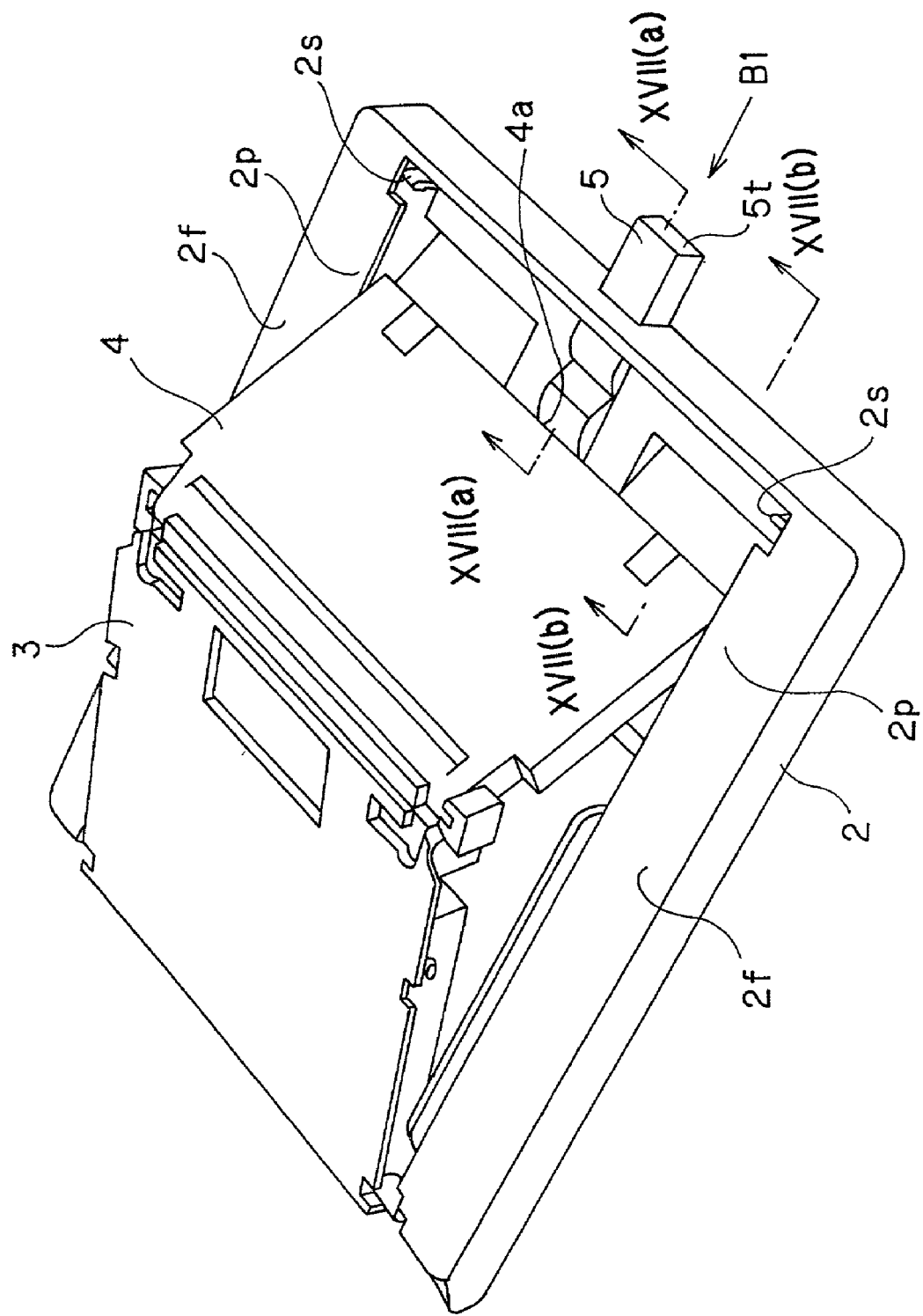
FIG. 16 is a perspective view showing the condition of the first embodiment of the electronic equipment mounting angle varying apparatus according to the present invention set at a mounting angle.

In FIG. 16 is diagrammed the angle varying apparatus 1, wherewith the telephone set 50 can be mounted in the four different angles diagrammed in FIG. 28, in a condition wherein it is set at the third angle of inclination (cf. FIG. 28(c)).

A description is given next of the operation of the mounting angle varying apparatus 1.

FIG. 16 represents the mounting angle varying apparatus 1, capable of mounting the telephone set 50 in four different angles, set at the third angle of inclination (see FIG. 28(c)).

Figure 17B:
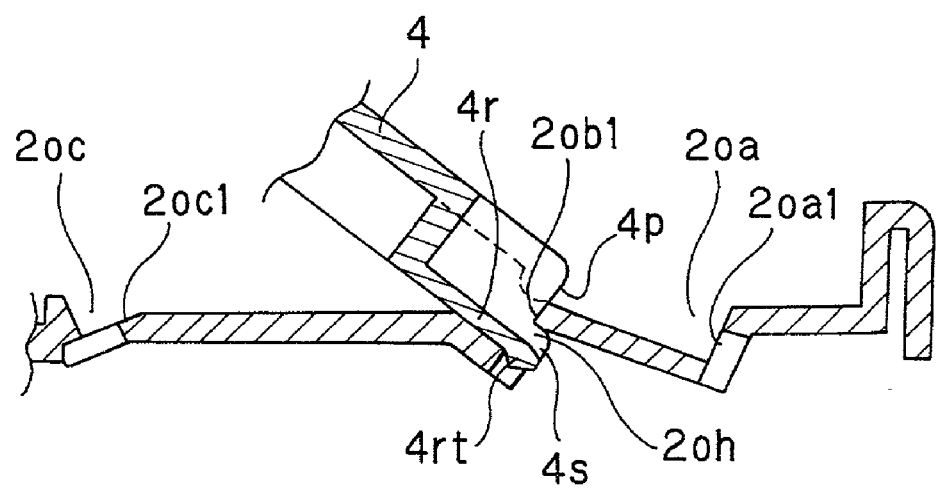
Figure 19B:
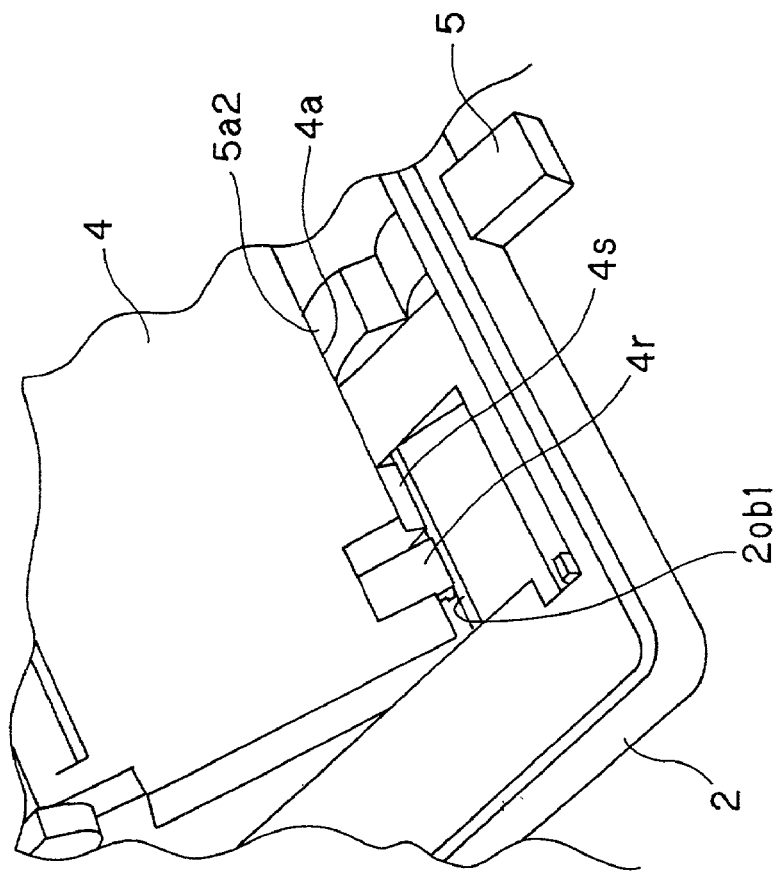
FIGS. 19(*a*) and 19(*b*) are an enlarged view of main parts in the first embodiment of the electronic equipment mounting angle varying apparatus according to the present invention as shown in FIG. 16, and an enlarged view of main parts in the first embodiment of the electronic equipment mounting angle varying apparatus according to the present invention as shown in FIG. 18, respectively.
Figure 19A:
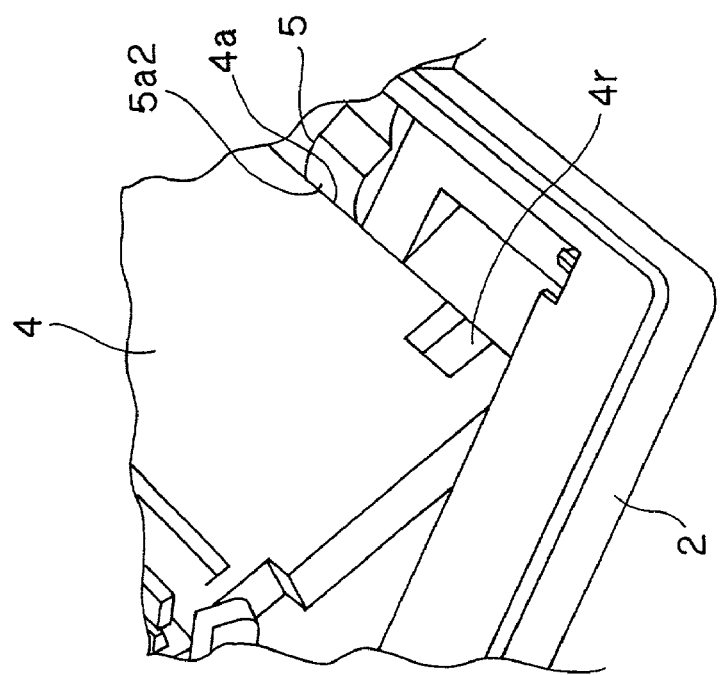

At such time, the arm guide rib 4a of the tilt arm 4, as shown in FIG. 17(a), is abutted against the sloping guide surface 5a2 of the tilt button 5 and, as shown in FIG. 17(b), the bending ribs 4r and positioning ribs 4s of the tilt arm 4 are fitted into the arm engagement holes 2oh in the arm securing concave sloping surfaces 2ob1 of the tilt base 2, and the bending pawls 4rt of the bending ribs 4r engage so that latching is effected (see FIG. 19(a)).

Here, the rib side end surfaces 4p of the tilt arm 4 are configured so that they abut the arm concave sloping surfaces 2ob1 in parallel.

Similarly, the configuration is made so that, when the bending ribs 4r and the positioning ribs 4s of the tilt arm 4 are latched in the arm engagement holes 2oh of the arm securing concave sloping surfaces 2oa1 of the tilt base 2, or in the arm engagement holes 2oh of the arm securing concave sloping surfaces 2oc1, abutting against the arm securing concave sloping surfaces 2oa1 and the arm securing concave sloping surfaces 2oc1, respectively, is effected in parallel.

The rib side end surface 4p, as indicated in FIG. 6, is formed perpendicular to the direction of the plane of the tilt arm 4, wherefore the tilt arm 4 will abut the arm concavity sloping surfaces 2oa1 of the arm securing concavities 2oa via the rib side end surface 4p, or the tilt arm 4 will abut the arm concavity sloping surfaces 2ob1 of the arm securing concavities 2ob via the rib side end surface 4p, or the tilt arm 4 will abut the arm concavity sloping surfaces 2oc1 of the arm securing concavities 2oc via the rib side end surface 4p.

Therefore, the force applied to the telephone set 50 will be transmitted at right angles to the arm concavity sloping surfaces 2oa1 of the arm securing concavities 2oa of the tilt base 2 through the rib side end surface 4p of the tilt arm 4 when the telephone set 50 is at the angle indicated in FIG. 28(b), will be transmitted at right angles to the arm concavity sloping surfaces 2ob1 of the arm securing concavities 2ob of the tilt base 2 through the rib side end surface 4p of the tilt arm 4 when the telephone set 50 is at the angle indicated in FIG. 28(c), and will be transmitted at right angles to the arm concavity sloping surfaces 2oc1 of the arm securing concavities 2oc of the tilt base 2 through the rib side end surface 4p of the tilt arm 4 when the telephone set 50 is at the angle indicated in FIG. 28(d).

Accordingly, the force applied from the tilt arm 4 to the tilt base 2 is transmitted at right angles to the arm concavity sloping surfaces 2oa1, 2ob1, and 2oc1, wherefore the stress is transmitted without strain in a balanced, dispersed manner to the arm concavity sloping surfaces 2oa1, 2ob1, and 2oc1, and no concentrated load will be applied locally.

For that reason, the force applied to the telephone set 50 is transmitted without strain, in a dispersed manner, to the tilt base 2, which is of adequate strength, through the arm concavity sloping surfaces 2oa1, 2ob1, and 2oc1, wherefore, even when an excessive force is applied to the telephone set 50, the angle varying apparatus 1 will not be damaged, nor will wobbling occur, and sufficient stability is realized.

Accordingly, the force applied from the tilt arm 4 to the tilt base 2 is transmitted at right angles to the arm securing concave sloping surfaces 2oa1, 2ob1, and 2oc1, wherefore the mounting angle varying apparatus 1 is prevented from wobbling, and the tilt base 2 has sufficient strength.

To change the mounting angle of the mounting angle varying apparatus 1, the user presses the outer end 5t of the tilt button 5 in the direction of the arrow B1, as indicated in FIG. 16.

The pressed tilt button 5, as shown in FIG. 20(a), slides into the tilt base 2, the arm guide rib 4a of the tilt arm 4 is guided as indicated by the arrow e by the sloping guide surface 5a2 of the tilt button 5, and the tilt arm 4 moves as indicated by the arrow e.

Figure 20B:
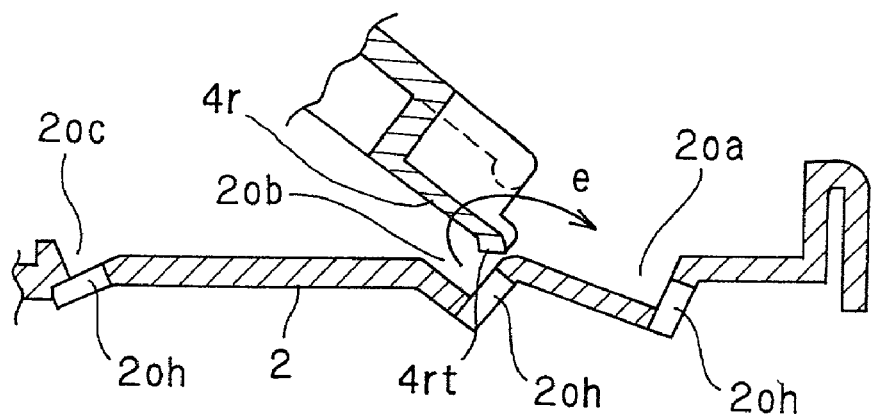

At that time, as diagrammed in FIG. 20(b), the bending ribs 4r are slightly elastically deformed and in conjunction therewith the bending pawls 4rt move upward, and the engagement with the arm engagement holes 2oh of the arm securing concavities 2ob in the tilt base 2 is released, whereupon the positioning ribs 4s and bending ribs 4r of the tilt arm 4 move as indicated by the arrow e (cf. FIG. 19(b)).

Following thereupon, to set the angle varying apparatus 1 in a newly desired angle, the user stops pressing the tilt button 5, whereupon the tilt button 5 moves due to the elastic force of the compression spring 5b, and is returned to the normal position.

When, thereafter, in order to set the telephone set 50 in the mounting angle indicated in FIG. 28(b), that is, in order to latch the positioning ribs 4s and bending ribs 4r of the tilt arm 4 in the arm engagement holes 2oh of the arm securing concavities 2oa, the user pushes downward on the telephone set 50 mounted in the tilt cover 3, the force applied to the telephone set 50 will be transmitted through the tilt cover 3 to the tilt arm 4, and the positioning ribs 4s and bending ribs 4r of the tilt arm 4 will abut with an acute angle against the arm concavity sloping surfaces 2oa2, as diagrammed in FIG. 21(b), and therefore will be guided so as to slide downward on the arm concavity sloping surfaces 2oa2, while the arm guide rib 4a of the tilt arm 4 will move, as diagrammed in FIG. 21(a), above the tilt button 5 as indicated by the f1.

Furthermore, when the user pushes the telephone set 50 mounted on the tilt cover 3 downward, the positioning ribs 4s and bending ribs 4r of the tilt arm 4 are guided so as to slide further downward on the arm concavity sloping surfaces 2oa2, and, as diagrammed in FIG. 22(b), the bending ribs 4r will be elastically deformed upward, and fit into the arm engagement holes 2oh in the arm securing concavities 2oa, the bending pawls 4rt will engage the arm engagement holes 2oh, whereby the positioning ribs 4s and the bending ribs 4r will latch in the arm engagement holes 2oh, and the telephone set 50 will be set in the mounting angle diagrammed in FIG. 28(b).

At that time, the arm guide rib 4a of the tilt arm 4 will be positioned at the lowermost part of the sloping guide surface 5a1 of the tilt button 5 as diagrammed in FIG. 22(a).

When, on the other hand, the telephone set 50 is to be set not in the mounting angle indicated in FIG. 28(b) but rather in the mounting angle indicated in FIG. 28(d), that is, when the positioning ribs 4s and bending ribs 4r of the tilt arm 4 are to be latched in the arm engagement holes 2oh of the arm securing concavities 2oc, the user lightly grasps the tilt arm 4, and lightly pushes the positioning ribs 4s and bending ribs 4r of the tilt arm 4 into the arm securing concavities 2oc, whereby the positioning ribs 4s and bending ribs 4r of the tilt arm 4 will be guided by the arm concavity sloping surfaces 2oc1, the bending ribs 4r will be elastically deformed and fit into the arm engagement holes 2oh of the arm securing concavities 2oc, and the bending pawls 4rt will engage the arm engagement holes 2oh, whereby the positioning ribs 4s and the bending ribs 4r will be latched in the arm engagement holes 2oh, and the telephone set 50 will be set in the mounting angle indicated in FIG. 28(d).

The telephone set 50 may also be mounted in a mounting angle other than that described above by the same method as described above.

When changing the setting of the telephone set 50 to a smaller mounting angle, for example, that is, when changing the mounting angle of the telephone set 50 from the mounting angle indicated in FIG. 28(d) to the mounting angle indicated in FIG. 28(c), by pressing the tilt button 5, the positioning ribs 4s and bending ribs 4r of the tilt arm 4 are released from the latching with the arm engagement holes 2oh of the arm securing concavities 2oc and guided outside of the arm securing concavities 2oc.

Next, by pushing the telephone set 50 mounted to the tilt cover 3 downward, the positioning ribs 4s and bending ribs 4r of the tilt arm 4 are guided so as to slide outward over the arm sliding surfaces 2sp1 and then over the arm concavity sloping surfaces 2ob2, the bending ribs 4r are elastically deformed upward and made to fit into the arm engagement holes 2oh in the arm securing concavities 2ob, and the bending pawls 4rt engage the arm engagement holes 2oh, whereby the positioning ribs 4s and bending ribs 4r are latched in the arm engagement holes 2oh, and the telephone set 50 is set in the mounting angle indicated in FIG. 28(c).

Alternatively, when changing the mounting angle of the telephone set 50 from the mounting angle indicated in FIG. 28(b) to the mounting angle indicated in FIG. 28(a), by pressing the tilt button 5, the positioning ribs 4s and bending ribs 4r of the tilt arm 4 are released from being latched with the arm engagement holes 2oh of the arm securing concavities 2oa and guided outside the arm securing concavities 2oa.

Next, by pushing the telephone set 50 mounted to the tilt cover 3 downward, the positioning ribs 4s and bending ribs 4r of the tilt arm 4 are guided so as to slide outward over the arm sliding surfaces 2sp2. Then the tilt arm 4 is put in a horizontal attitude, and the cover securing projections 3rt at the two sides of the tilt cover 3 are latched in the cover securing holes 2ro of the cover securing ribs 2r of the tilt base 2 (cf. FIG. 14(b)), and, thereby, the telephone set 50 is set in the mounting angle indicated in FIG. 28(a).

When, on the other hand, the mounting angle of the telephone set 50 is to be changed from the mounting angle indicated in FIG. 28(b) and set in the larger mounting angle indicated in FIG. 28(c), first, by pressing the tilt button 5, the positioning ribs 4s and bending ribs 4r of the tilt arm 4 are released from being latched with the arm engagement holes 2oh in the arm securing concavities 2oa, and guided outside the arm securing concavities 2oa.

Next, by lightly grasping the tilt arm 4 and lightly pushing the positioning ribs 4s and bending ribs 4r of the tilt arm 4 into the arm securing concavities 2ob, the positioning ribs 4s and bending ribs 4r are guided to the arm concavity sloping surfaces 2ob1 and 2ob2 of the arm securing concavities 2ob, the bending ribs 4r are elastically deformed upward and made to fit into the arm engagement holes 2oh of the arm securing concavities 2ob, and the bending pawls 4rt engage the arm engagement holes 2oh, whereby the positioning ribs 4s and bending ribs 4r are latched in the arm engagement holes 2oh, and the telephone set 50 is set in the mounting angle indicated in FIG. 28(c).

Alternatively, when the mounting angle of the telephone set 50 is to be changed from the mounting angle indicated in FIG. 28(a) and set in the larger mounting angle indicated in FIG. 28(b), first, when the user lifts the telephone set 50 mounted on the tilt cover 3 upward from the tilt base 2, the latching of the cover securing projections 3rt formed at the two sides of the tilt cover 3 in the cover securing holes 2ro in the tilt base 2 (cf. FIG. 14(b)) is released.

Next, by lightly grasping the tilt arm 4 and lightly pushing the positioning ribs 4s and bending ribs 4r of the tilt arm 4 into the arm securing concavities 2oa, the positioning ribs 4s and bending ribs 4r are guided to the arm concavity sloping surfaces 2oa1 and 2oa2 of the arm securing concavities 2oa, the bending ribs 4r are elastically deformed upward and made to fit into the arm engagement holes 2oh of the arm securing concavities 2oa, and the bending pawls 4rt engage, whereby the positioning ribs 4s and bending ribs 4r are latched in the arm engagement holes 2oh, and the telephone set 50 is set in the mounting angle indicated in FIG. 28(b).

Needless to say, furthermore, in setting the telephone set 50 in any of the mounting angles indicated in FIG. 28(b), 28(c), or 28(d), the method of lightly grasping the tilt arm 4, and lightly pushing the positioning ribs 4s and bending ribs 4r of the tilt arm 4 into the desired arm securing concavities, whereby the positioning ribs 4s and bending ribs 4r are fit into the desired arm securing concavities, and latched in the arm engagement holes 2oh of the desired arm securing concavities, may be adopted.

Figure 18:
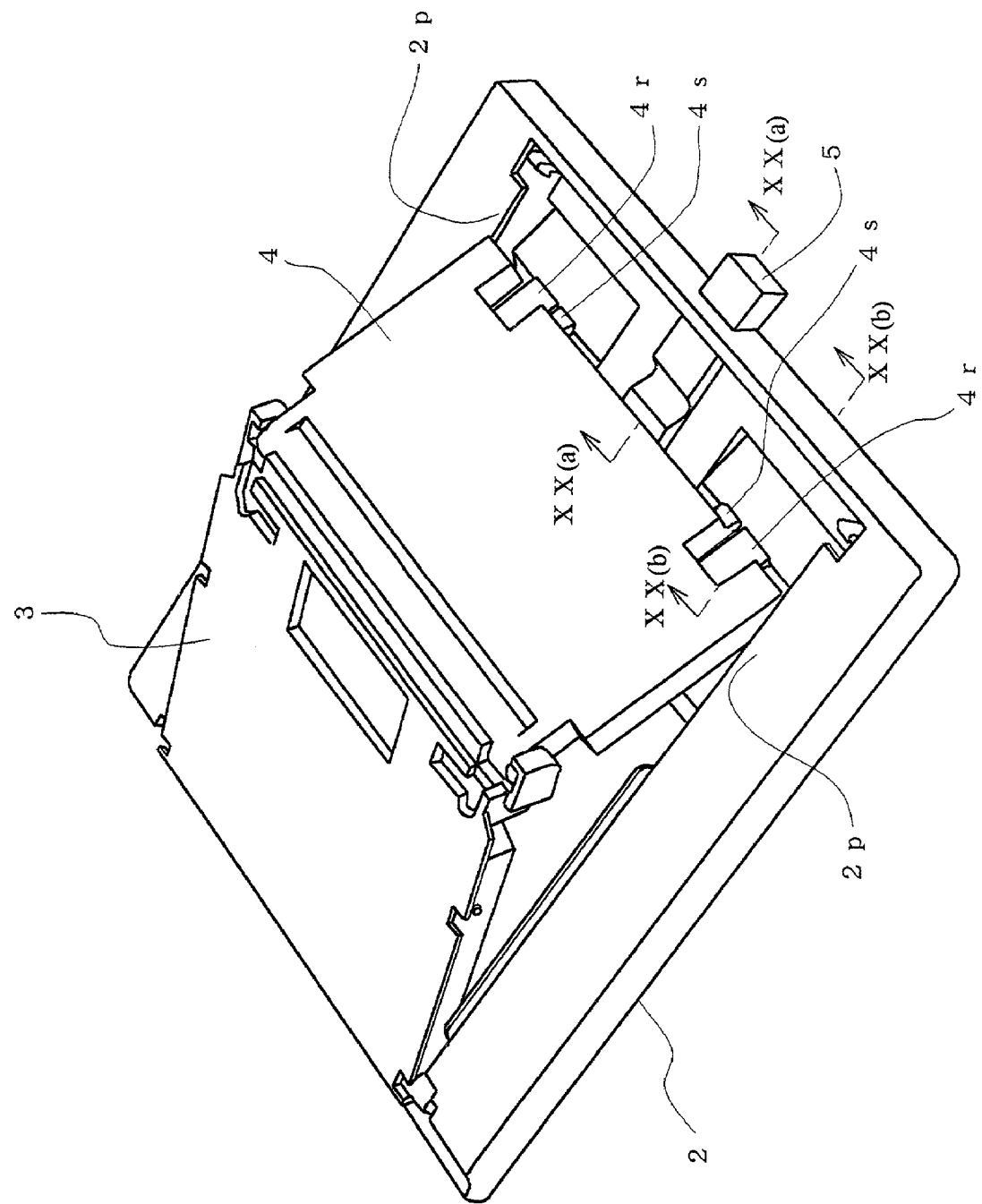
FIG. 18 is a perspective view showing the condition of the first embodiment of the electronic equipment mounting angle varying apparatus according to the present invention, as shown in FIG. 16, with the mounting angle being changed.

Here, as described earlier, when the angle varying apparatus 1 is in use, the arm engaging projections 4t of the tilt arm 4 are held by the lower surfaces of the arm holding guide panels 2p, the tilt arm 4 is prevented from separating from the tilt base 2, and the angle varying apparatus 1 is used in the form diagrammed in FIG. 16 and FIG. 18.

Next is described the method of attaching the telephone set 50 to the mounting angle varying apparatus 1.

Figure 23:
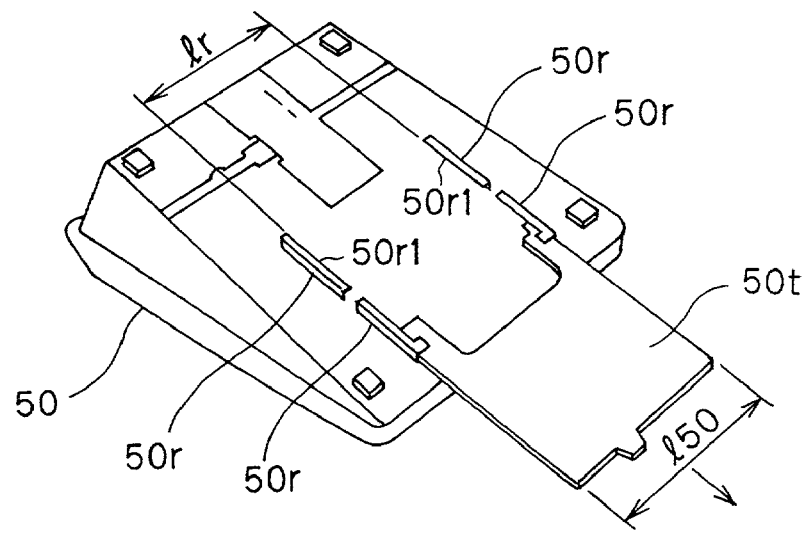
FIG. 23 is a perspective view showing the process of attaching the first embodiment of the electronic equipment mounting angle varying apparatus according to the present invention.

First, as shown in FIG. 23, the telephone number card affixing tray 50t is slidden to the outside from the guide rails 50r in the lower surface of the telephone set 50 and removed.

Figure 24:
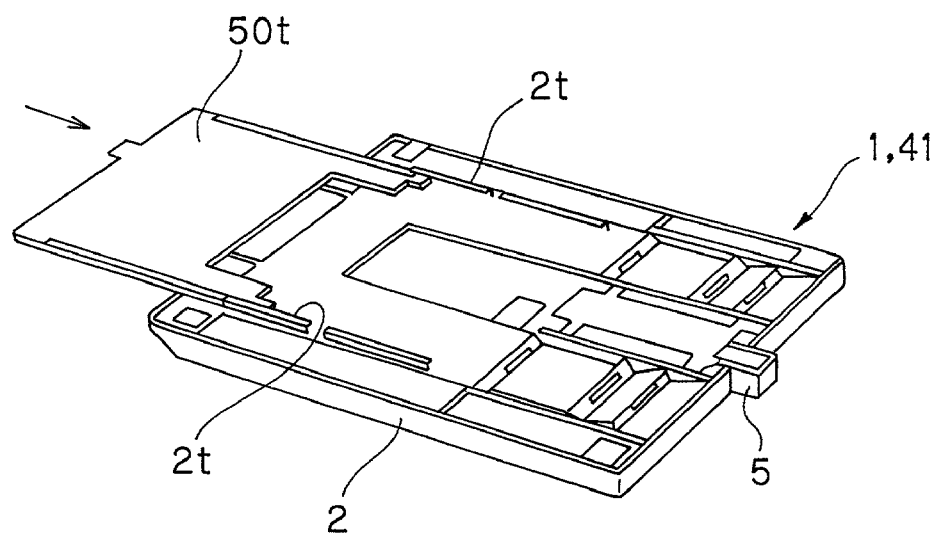
FIG. 24 is a perspective view showing the process of attaching the first embodiment of the electronic equipment mounting angle varying apparatus according to the present invention.
Figure 25:
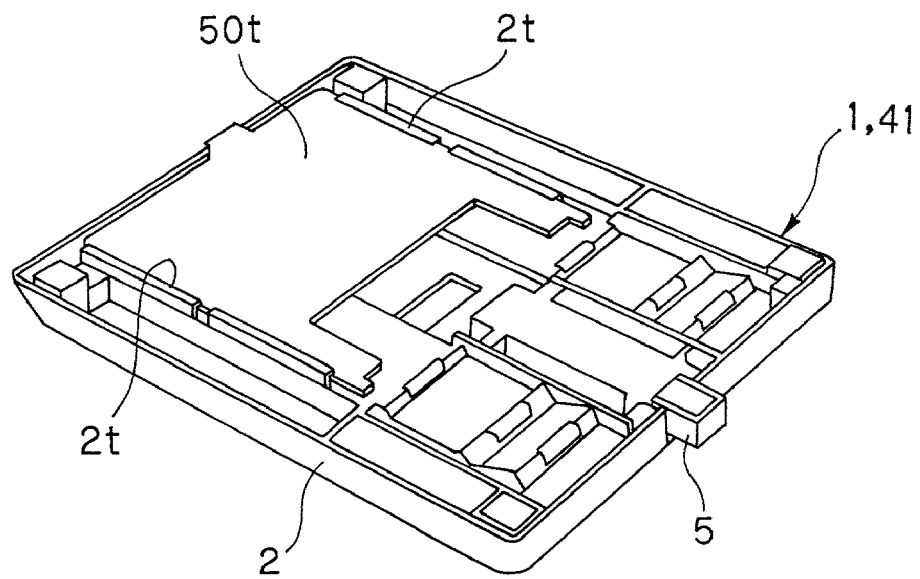
FIG. 25 is a perspective view showing the process of attaching the first embodiment of the electronic equipment mounting angle varying apparatus according to the present invention.
Figure 26:
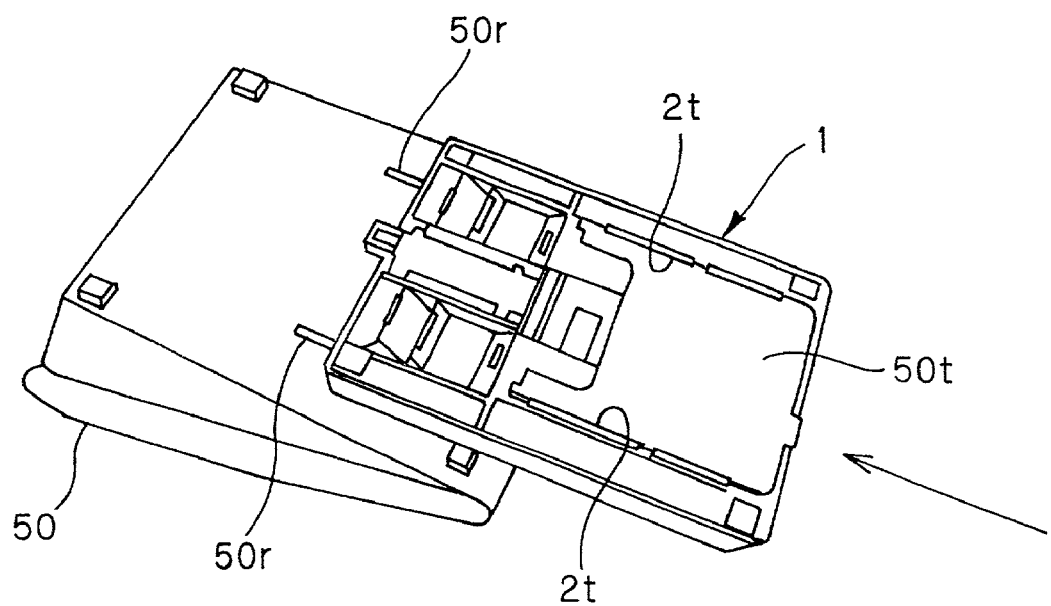
FIG. 26 is a perspective view showing the process of attaching the first embodiment of the electronic equipment mounting angle varying apparatus according to the present invention.

Next, as shown in FIG. 24, an edge of the telephone number card affixing tray 50t is inserted into the pair of base guide rails 2t formed in the tilt base 2, slidden toward the back, and fit in place (see FIG. 25).

Figure 27:
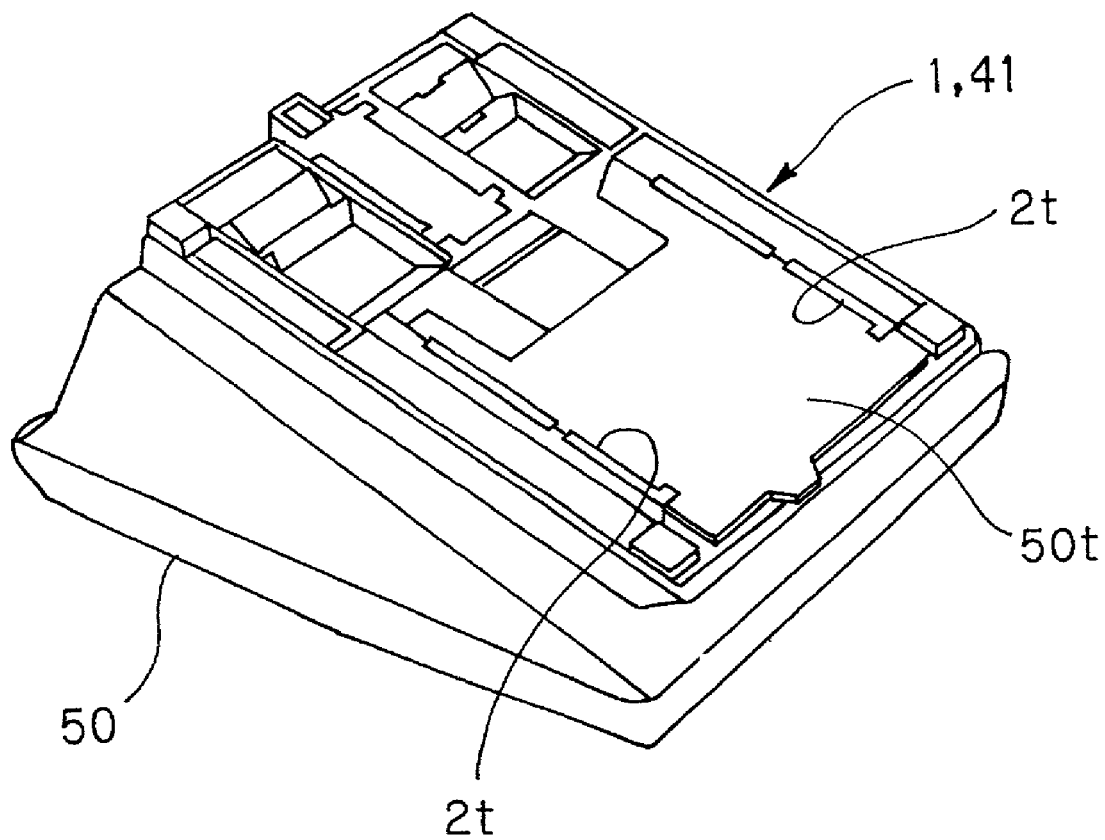
FIG. 27 is a perspective view showing the process of attaching the first embodiment of the electronic equipment mounting angle varying apparatus according to the present invention.

Then, as shown in FIG. 28, the telephone set attachment panel 3p of the tilt cover 3 of the mounting angle varying apparatus 1 is inserted into the pair of guide rails 50r in the telephone set 50, and slidden toward the back to fit it in place, whereupon, as shown in FIG. 27, the mounting angle varying apparatus 1 is attached to the telephone set 50.

The telephone set 50 attached to the mounting angle varying apparatus 1 is shown in FIG. 28(a).

Now, the angle varying apparatus 1 is configured so that the telephone set 50 can be mounted in the four angles diagrammed in FIG. 28.

In order to change the telephone set 50 from the horizontal mounting angle indicated in FIG. 28(*a*) to the mounting angle indicated in FIG. 28(*b*), the user first lifts the telephone set 50 indicated in FIG. 28(*a*) upward so that it separates from the angle varying apparatus 1. Then a hand is placed lightly against the tilt arm 4, and the positioning ribs 4*s* and bending ribs 4*r* of the tilt arm 4 are lightly pushed inside the arm securing concavities 2*oa* for setting the telephone set 50 at the angle indicated in FIG. 28(*b*).

When that is done, the positioning ribs 4*s* and bending ribs 4*r* of the tilt arm 4 will be guided by the arm concavity sloping surfaces 2*oa*1 and 2*oa*2 of the arm securing concavities 2*oa* in the tilt base 2, the bending ribs 4*r* will be elastically deformed and thereby made to fit in the arm engagement holes 2*oh*, the bending pawls 4*rt* are engaged, and the positioning ribs 4*s* and bending ribs 4*r* will be latched in the arm engagement holes 2*oh*.

In this manner, the telephone set 50 is moved from the horizontal condition indicated in FIG. 28(*a*) to the angle indicated in FIG. 28(*b*).

In order to change the telephone set 50 to the mounting angles indicated in FIG. 28(*c*) or 28(*d*), moreover, as diagrammed in FIG. 20, by pushing the tilt button 5 in the direction of the arrow B1, the latching of the positioning ribs 4*s* and bending ribs 4*r* of the tilt arm 4 with the arm engagement holes 2*oh* in the tilt base 2 is released.

Next, the pushing on the tilt button 5 is stopped, the tilt arm 4 is lightly grasped, and the positioning ribs 4*s* and bending ribs 4*r* of the tilt arm 4 are lightly pushed into the arm securing concavities 2*ob* of the tilt base 2 (corresponding to FIG. 28(*c*)) or into the arm securing concavities 2*oc* thereof (corresponding to FIG. 28(*d*)) corresponding to the desired angle, whereby the positioning ribs 4*s* and bending ribs 4*r* are made to fit into the arm engagement holes 2*oh*, the bending pawls 4*rt* are engaged and latched therein, and the tilt arm 4 is secured to the tilt base 2.

When this is done, the telephone set 50 is set in the mounting angle indicated in FIG. 28(*c*) or 28(*d*).

In order to change the telephone set 50 from the mounting angle indicated in FIG. 28(*d*) to the mounting angle indicated in FIG. 28(*c*), on the other hand, as diagrammed in FIG. 20, by pushing the tilt button 5 in the direction of the arrow B1, the engagement of the positioning ribs 4*s* and bending ribs 4*r* of the tilt arm 4 with the arm engagement holes 2*oh* in the tilt base 2 is released.

Next, the pushing on the tilt button 5 is stopped, and, by pushing the telephone set 50 downward, the positioning ribs 4*s* and bending ribs 4*r* of the tilt arm 4 are guided so as to slide outward over the arm sliding surfaces 2*sp*1 and the arm concavity sloping surfaces 2*ob*2, the bending ribs 4*r* are elastically deformed and fit into the arm engagement holes 2*oh* of the arm securing concavities 2*ob*, and the bending pawls 4*rt* are engaged therein, the positioning ribs 4*s* and bending ribs 4*r* are latched in the arm engagement holes 2*oh*, and the telephone set 50 is set in the mounting angle indicated in FIG. 28(*c*).

When changing the telephone set 50 from the mounting angle indicated in FIG. 28(*c*) to the mounting angle indicated in FIG. 28(*b*), moreover, by implementing an operation like the operation described above of changing from the mounting angle indicated in FIG. 28(*d*) to the mounting angle indicated in FIG. 28(*c*), the positioning ribs 4*s* and bending ribs 4*r* of the tilt arm 4 latch in the arm engagement holes 2*oh* of the arm securing concavities 2*oc*, and thereby the telephone set 50 is set in the mounting angle indicated in FIG. 28(*b*).

In order to change the telephone set 50 from the mounting angle indicated in FIG. 28(*b*) to the mounting angle indicated in FIG. 28(*a*), moreover, as diagrammed in FIG. 20, by pushing the tilt button 5 in the direction of the arrow B1, the engagement of the positioning ribs 4*s* and bending ribs 4*r* of the tilt arm 4 with the arm engagement holes 2*oh* in the tilt base 2 is released.

Next, the pushing on the tilt button 5 is stopped, and, by pushing the telephone set 50 downward, the positioning ribs 4*s* and bending ribs 4*r* of the tilt arm 4 are guided so as to slide outward over the arm sliding surfaces 2*sp*2, and the cover securing projections 3*rt* of the cover ribs 3*r* at both sides of the tilt cover 3 latch in the cover securing holes 2*ro* of the cover securing ribs 2*r* of the tilt base 2 (cf. FIG. 14(*b*)), and thereby the telephone set 50 is set in the mounting angle indicated in FIG. 28(*a*).

By the operations described in the foregoing, the telephone set 50 can be mounted with the desired mounting angle as diagrammed in FIG. 28(*a*) to 28(*d*).

As described in the foregoing, moreover, when setting the telephone set 50 in any of the mounting angles indicated in FIG. 28(*b*), 28(*c*), or 28(*d*), needless to say the method of grasping the tilt arm 4 lightly, and lightly pressing the positioning ribs 4*s* and bending ribs 4*r* of the tilt arm 4 into the desired arm securing concavities, thereby fitting the positioning ribs 4*s* and bending ribs 4*r* into the desired arm securing cavities, and effecting latching in the arm engagement holes 2*oh* of the desired arm securing concavities, may be adopted.

Based on the mounting angle varying apparatus 1 having the configuration described in the foregoing, by providing the telephone set 50 with the mounting angle varying apparatus 1, it is possible to set the mounting angle of the telephone set 50 in multiple steps over a large range, and the operability of the telephone set 50 is enhanced.

Also, the telephone number card affixing tray 50*t* attached to the guide rails 50*r* in the lower surface of the telephone set 50 is removed and the mounting angle varying apparatus 1 is attached to those guide rails 50*r*, wherefore the attachment and detachment of the mounting angle varying apparatus 1 to and from the telephone set 50 is extremely easy.

Also, the telephone number card affixing tray 50*t* that is removed from the telephone set 50 is attached to the base guide rails 2*t* in the lower surface of the mounting angle varying apparatus 1, wherefore the telephone number card affixing tray 50*t* can be used as before.

Thus, because the mounting angle varying apparatus 1 is configured as a separate unit from the telephone set 50, the mounting angle varying apparatus 1 can be used as an option, and users who have no need for the mounting angle varying apparatus 1 can be prevented from incurring an extra cost burden.

The configuration of the angle varying apparatus 1 is simple, moreover, comprising basically the tilt base 2, tilt cover 3, and tilt arm 4, and the manufacturing cost thereof is low.

Furthermore, the shaft bearing structures are such that both the shaft portions and shaft bearing portions can be fabricated by a trimming die assembly, and the die cost is low, and, because these can be assembled by fitting the shaft portions and shaft bearing portions together, the assembling characteristics are good.

For these reasons, the tilt base 2, tilt cover 3, tilt arm 4, and tilt button 5 can be fabricated by trimming die assemblies, and the die equipment costs are low.

Also, the members configuring the angle varying apparatus 1 can be assembled merely by fitting them together, the assembling characteristics are good, and the manufacturing costs for the angle varying apparatus 1 are low.

Also, because the tilt button 5 is provided for changing the mounting angle of the angle varying apparatus 1, when changing the mounting angle of the angle varying apparatus 1, that can be accomplished by pushing the tilt button 5, whereupon the latching of the positioning ribs 4s and bending ribs 4r of the tilt arm 4 with the tilt base 2 is released, and those ribs are guided to the outside of the arm securing concavities 2o (2oa, 2ob, 2oc), and then lightly placing a hand on the tilt arm 4 and lightly pressing it to the arm securing concavities 2o of the tilt base 2 corresponding to the desired mounting angle. There is no need to perform an operation while visually monitoring the latching of the tilt arm 4 in the tilt base 2, nor does it take time to manipulate the tilt arm 4, and operability is good.

Also, when changing the mounting angle of the angle varying apparatus 1 from the mounting angle indicated in FIG. 28(d) to the smaller mounting angle indicated in FIG. 28(c), because the arm sliding surfaces 2sp1 and arm concavity sloping surfaces 2ob2 of the tilt base 2 are provided against which the positioning ribs 4s and bending ribs 4r of the tilt arm 4 abut and slide with an acute angle, it is possible to change from the mounting angle indicated in FIG. 28(d) to the mounting angle indicated in FIG. 28(c) by first pushing the tilt button 5, and then pushing the telephone set 50 attached to the angle varying apparatus 1 downward.

Similarly, when changing the mounting angle of the angle varying apparatus 1 from the mounting angle indicated in FIG. 28(c) to the smaller mounting angle indicated in FIG. 28(b), because the arm concavity sloping surfaces 2oa2 of the tilt base 2 are provided, against which the positioning ribs 4s and bending ribs 4r of the tilt arm 4 abut and slide at an acute angle, and, when changing the mounting angle of the angle varying apparatus 1 from the mounting angle indicated in FIG. 28(b) to the smaller mounting angle indicated in FIG. 28(a), because the arm sliding surfaces 2sp2 of the tilt base 2 are provided against which the positioning ribs 4s and bending ribs 4r of the tilt arm 4 abut and slide at an acute angle, merely by first pushing the tilt button 5, and then pushing the telephone set 50 downward, it is possible to change to the mounting angle indicated in FIG. 28(b) or to the mounting angle indicated in FIG. 28(a), respectively.

Accordingly, the angle varying apparatus 1 is very easy to handle when changing its mounting angle.

Furthermore, because the latching of the tilt arm 4 to the tilt base 2 is configured so that the positioning ribs 4s and bending ribs 4r of the tilt arm 4 fit into the arm engagement holes 2oh of the tilt base 2 by the elastic deformation of the bending ribs 4r, and so that the positioning ribs 4s and bending ribs 4r latch by the engagement of the bending pawls 4rt, the operating reliability is high. Also, the latching of the tilt arm 4 to the tilt base 2 is accompanied by a sharp click, so that the operation can be done with a sure feel, whereby the product is given a high-quality feel.

Furthermore, when the angle varying apparatus 1 is in use, the arm engaging projections 4t of the tilt arm 4 are held below the lower surface of the arm holding guide panels 2p of the tilt base 2 or below the arm securing projections 2s1 of the arm securing ribs 2s, wherefore the configuring parts will not become separated, even when the mounting angle of the angle varying apparatus 1 is being changed, the configuration is made integral, and parts can be prevented from being lost or damaged.

Also, the shaft bearing portions of the angle varying apparatus 1 have respectively long-shaped shaft bearing surfaces, wherefore the stresses from the shaft portions act on a long, broad surface area and thus become dispersed overloads. Thus the sustaining of excessive concentrated loading, as in configurations that support shaft portions with two shaft bearing points, for example, is prevented, and the mechanical strength of the shaft bearing portions is high.

When the tilt arm 4 is latched to the tilt base 2, moreover, the rib side end surface 4p of the tilt arm 4 abuts the tilt base 2 perpendicularly, wherefore the force applied from the tilt arm 4 to the tilt base 2 is transmitted perpendicularly to the tilt base 2, after being dispersed, whereupon the sustaining of concentrated loads locally is prevented, and strength is high against the forces applied to the angle varying apparatus 1.

Also, the angle varying apparatus 1 is prevented from wobbling, and the mechanical stability of the apparatus is high.

A description is given next of a second embodiment that comprises a tilt base (base unit) 2' and tilt button (operating unit) 5' wherewith it is possible to perform the attachment of the tilt button to the tilt base and the detachment of the tilt button from the tilt base simply.

The second embodiment is of exactly the same configuration as the first embodiment except for the configuration related to the assembly of the tilt base 2 and the tilt button 5 of the first embodiment, and the first embodiment is applied in the same manner.

The tilt button 5' has substantially the same configuration as the tilt button 5 of the first embodiment, as noted above; configuration that is the same is indicated by the symbols of the first embodiment, and no further description thereof is given here.

Figure 29A:
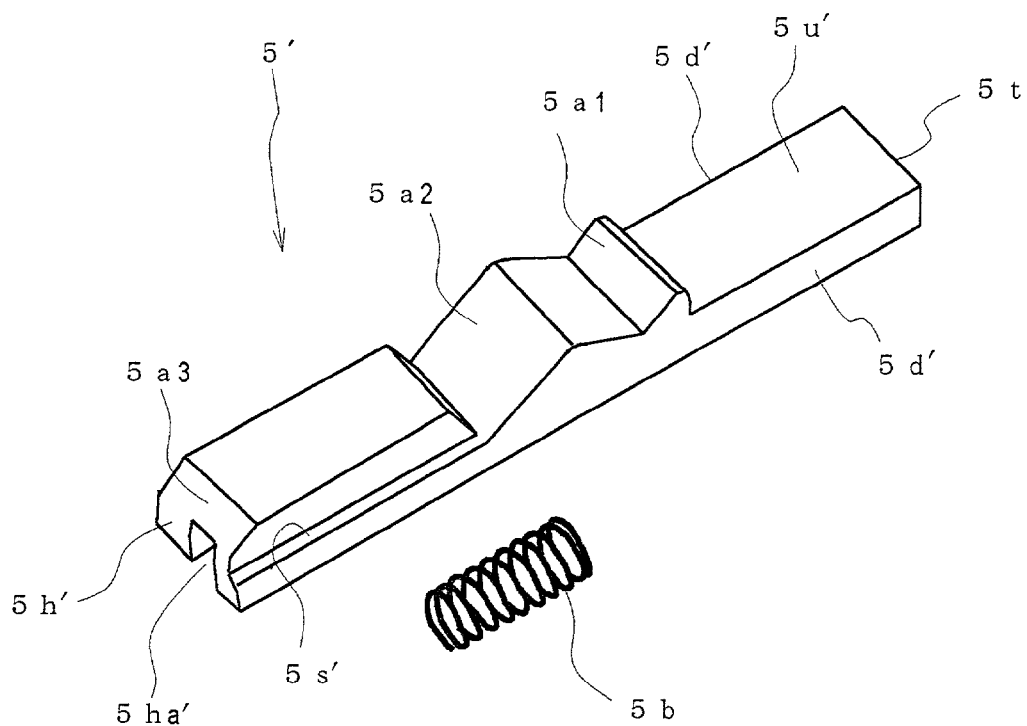
FIGS. 29(*a*) and 29(*b*) are a perspective view, seen from the top, of a tilt button in a second embodiment of the electronic equipment mounting angle varying apparatus according to the present invention, and a perspective view, seen from the bottom, of that tilt button.

As shown in FIG. 29, in a front wall panel 5h' that forms the end of the tilt button 5' in the longitudinal direction on the side of the sloping guide surface 5a3 is formed an abutting rib insertion hole 5ha' for the insertion of a spring abutting rib 2m6' (described farther below) erected on the tilt base 2'.

The abutting rib insertion hole 5ha', because the spring abutting rib 2m6' is inserted therein, in the front wall panel 5h', is formed as a hole having a rectangular cross-section that is slightly larger than that of the spring abutting rib 2m6, open on the tilt button 5' lower surface side.

On both sides between the sloping guide surface 5a3 and the sloping guide surface 5a2 are severally formed button sliding guide steps (sliding guided parts) 5s' and 5s' that have a predetermined height, configured so as to be supported, so as to slide freely, and be guided, from the upward direction on the tilt base 2' when the tilt button 5' is operated so as to move.

At the other end of the tilt button 5' is formed an attachment portion 5u' for engaging and attaching the tilt button 5' to the tilt base 2'.

Figure 29B:
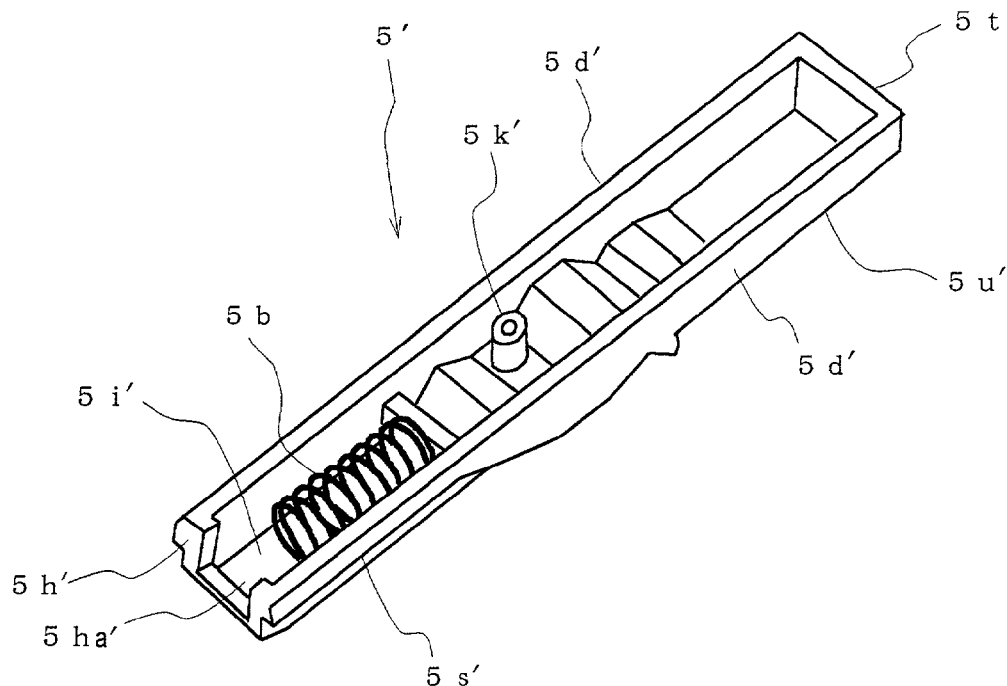

As shown in FIG. 29(b), on the back side of the tilt button 5', a spring housing 5i' for accommodating the compression spring 5b is formed so as to have a capacity which will accommodate the compression spring 5b.

In the center portion on the back side of the tilt button 5', a disassembling projection 5k' presenting a cylindrical shape and having a height that protrudes from the lower surface of the tilt button 5' is erected.

Figure 30:
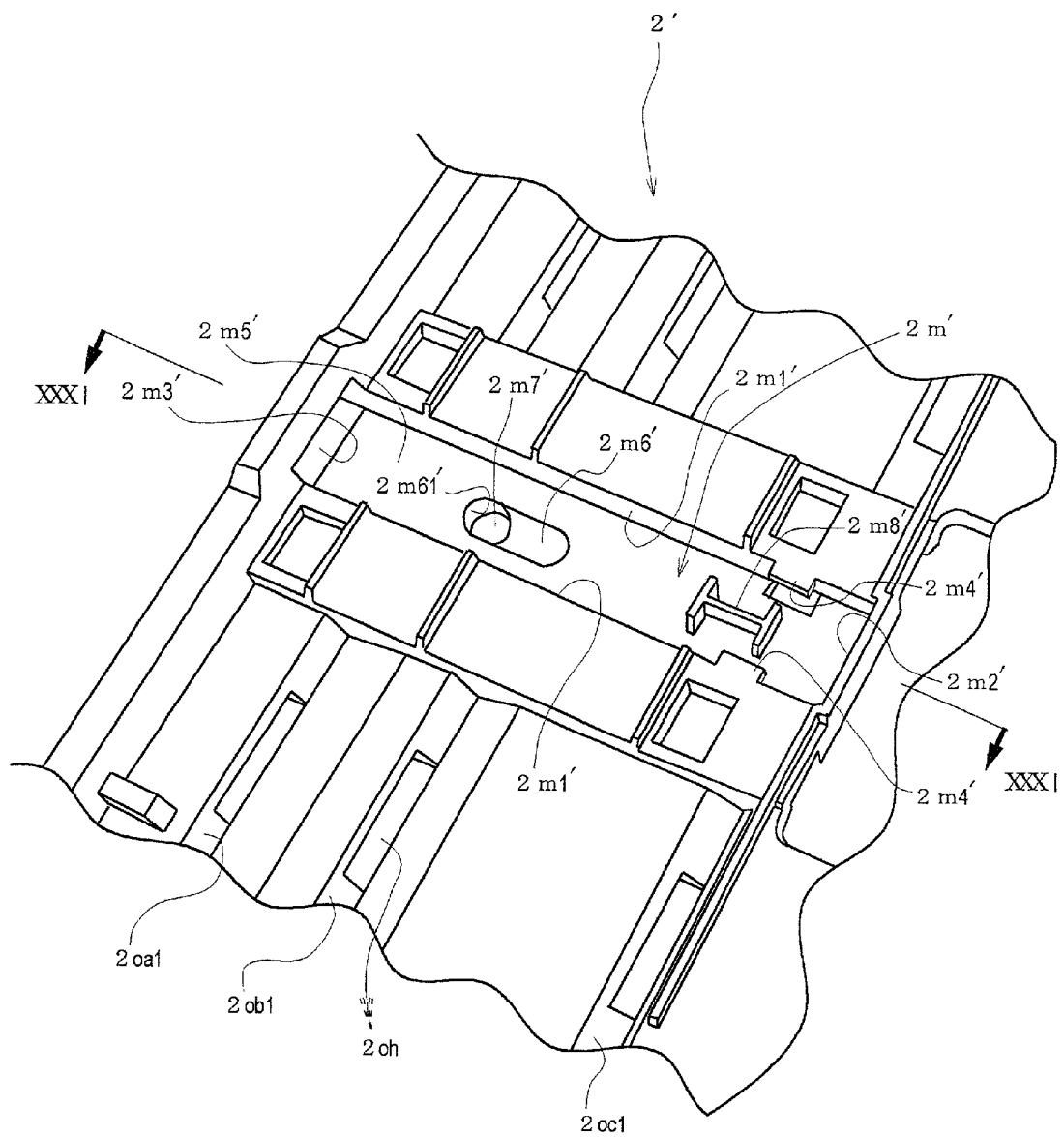
FIG. 30 is a perspective view showing the area in the vicinity of a button sliding channel in a tilt base in the second embodiment of the electronic equipment mounting angle varying apparatus according to the present invention.

As shown in FIG. 30, in the tilt base 2', the configuration other than that in the vicinity of the button sliding channel 2m' that corresponds to the button sliding channel 2m of the tilt base 2 in the first embodiment is completely the same as in the tilt base 2 of the first embodiment, wherefore the same symbols are affixed thereto and no further description thereof is given here.

At the end on the inside of the tilt base 2' in the longitudinal direction in the button sliding channel 2m', a button abutting wall 2m2' is erected which, continuing from button guide walls 2m1' that form side walls, forms a back wall.

When the telephone set 50 is being used, and the outer end (operating portion) 5t of the tilt button 5' is pressed deeply inside by a user, the button abutting wall 2m2' takes on the role of a stopper in the moving operation of the tilt button 5' when it is abutted against by the front wall panel 5h' at the leading end of the tilt button 5'.

Here, the distance between the button guide walls 2m1' and 2m1' in the button sliding channel 2m' is of a dimension that is slightly larger than the width dimension of the tilt button 5', whereupon, in the moving operation of the tilt button 5', the side surfaces 5d' and 5d' thereof are guided by the button guide walls 2m1' and 2m1'.

Meanwhile, in the end on the outside of the tilt base 2' in the longitudinal direction in the button sliding channel 2m', a button insertion hole (operating unit insertion hole portion) 2m3' is formed so as to pass through to the outside.

The button insertion hole 2m3' is a hole through which the tilt button 5' is inserted, formed so as to have a rectangular cross-section of slightly larger area than that of the lateral cross-section of the attachment portion 5u' of the tilt button 5'.

Also, on each of the upper edges of the inner sides of the tilt base 2' of the button guide walls 2m1' and 2m1' that form the side surfaces of the button sliding channel 2m', respectively, a flat rectangular plate-form button upward guide rib (operating unit upward guide portion) 2m4' is erected, which are mutually opposed, oriented toward the inner side of the button sliding channel 2m', and having a predetermined length.

The button upward guide ribs 2m4' and 2m4' are formed so as to have an interval that is slightly larger than the height of the button sliding guide steps 5s' of the tilt button 5' in terms of the distance from a button sliding channel bottom panel 2m5' that forms the bottom surface of the button sliding channel 2m', and, together with the button sliding channel bottom panel 2m5', sandwich and hold the tilt button 5' that performs a reciprocal motion in the horizontal direction, so that it slides freely, from the top and bottom.

Also, on the button sliding channel bottom panel 2m5' on the inner side of the tilt base 2' in the button sliding channel 2m', a spring abutting rib 2m8' of great strength exhibiting an approximately H-shaped form is erected.

Moreover, in the vicinity of the center in the longitudinal direction of the button sliding channel bottom panel 2m5', a projection accommodating concavity 2m6' is formed as a concavity having a long elliptical horizontal cross-section.

The projection accommodating concavity 2m6' is formed so as to have a depth greater than the length by which the disassembling projection 5k' of the tilt button 5' protrudes past the lower surface of the tilt button 5'.

The projection accommodating concavity 2m6' is formed so that, when the tilt button 5' is attached to the tilt base 2', the disassembling projection 5k' of the tilt button 5' is accommodated in the interior thereof, when the tilt button 5' is being operated so as to move, the disassembling projection 5k' exhibits a reciprocal motion in the long direction in the interior thereof.

An accommodating concavity curved surface 2m61' that forms a wall surface on the outer side of the tilt base 2' in the longitudinal direction of the projection accommodating concavity 2m6', when, during assembly, the tilt button 5' has been urged in the outer direction by the compression spring 5b, plays the role of a stopper, against which the disassembling projection 5k' of the tilt button 5' abuts, thus preventing the tilt button 5' from coming out.

Inside the projection accommodating concavity 2m6', moreover, a disassembling projection pressing hole (disassembling hole portion) 2m7' is formed, passing through in the vertical direction.

The disassembling projection pressing hole 2m7' is a hole for performing the operation of removing the tilt button 5' that has been attached to the tilt base 2', and is formed having a diameter larger than that of the disassembling projection 5k' of the tilt button 5'.

Next, a description is given of the procedures for attaching the tilt button 5' to the tilt base 2' configured as described above.

Figure 31A:
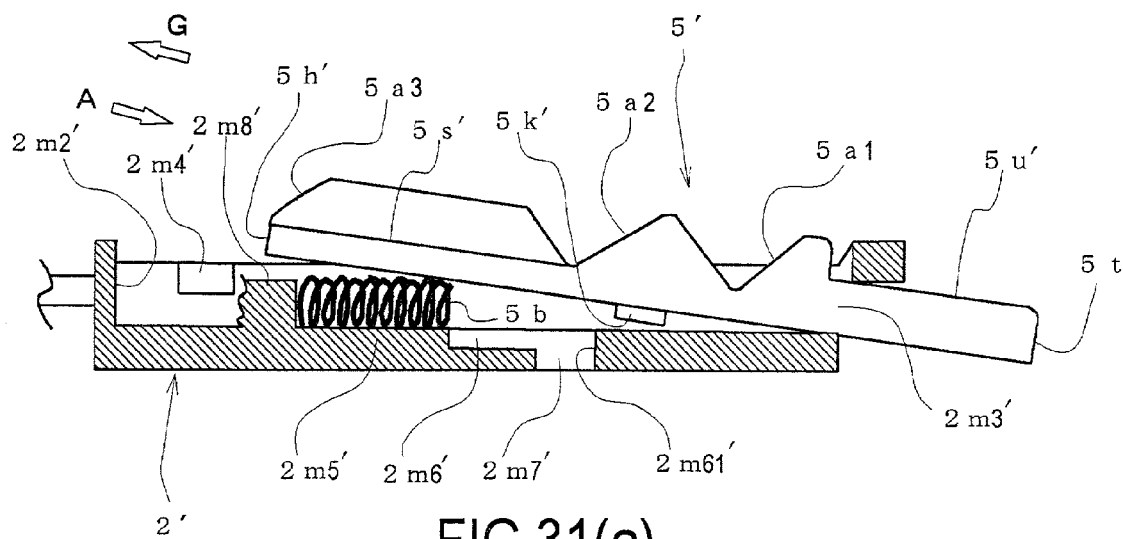
FIGS. 31(*a*), 31(*b*) and 31(*c*) are partially cutaway sections taken along the XXIX—XXIX line in FIG. 28, showing how the attachment of the tilt button to the tilt base transitions.

First, as shown in FIG. 31(a), the compression spring 5b is mounted on the button sliding channel bottom panel 2m5' of the button sliding channel 2m' so that it abuts the spring abutting rib 2m8'.

Next, the leading end of the tilt button 5' is inclined upward, relative to the tilt base 2', the attachment portion 5u' of the tilt button 5' is inserted into the button insertion hole 2m3' of the tilt base 2', and the tilt button 5' is inserted to the rear position of the button upward guide ribs 2m4' and 2m4' of the tilt base 2'.

Figure 31B:
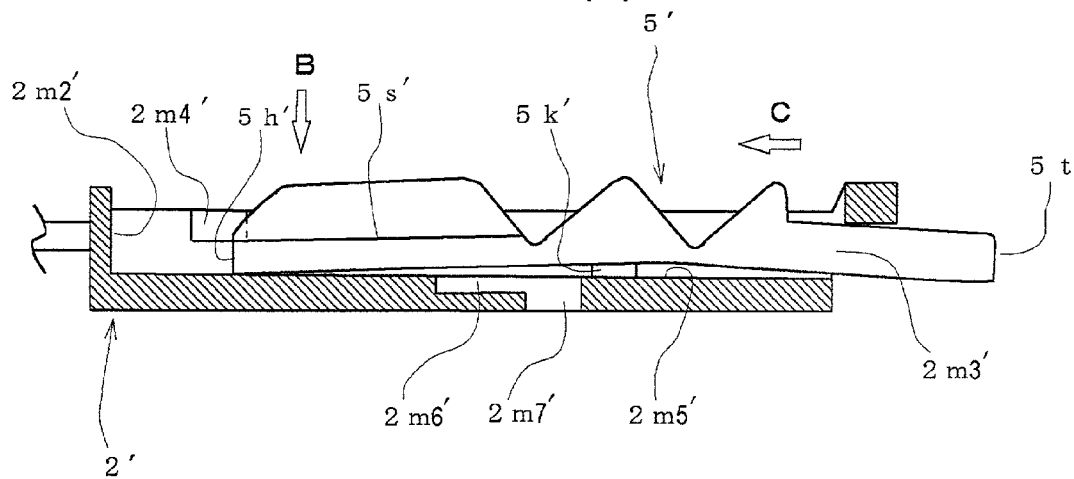

Next, as shown in FIG. 31(b), the leading end of the tilt button 5' is pressed in the direction of the arrow B, elastically deforming and bending it, the button sliding guide steps 5s' and 5s' of the tilt button 5' are positioned below the button upward guide ribs 2m4' and 2m4' of the tilt base 2', and, following that, the tilt button 5' is pressed in the direction of the arrow C.

Figure 31C:
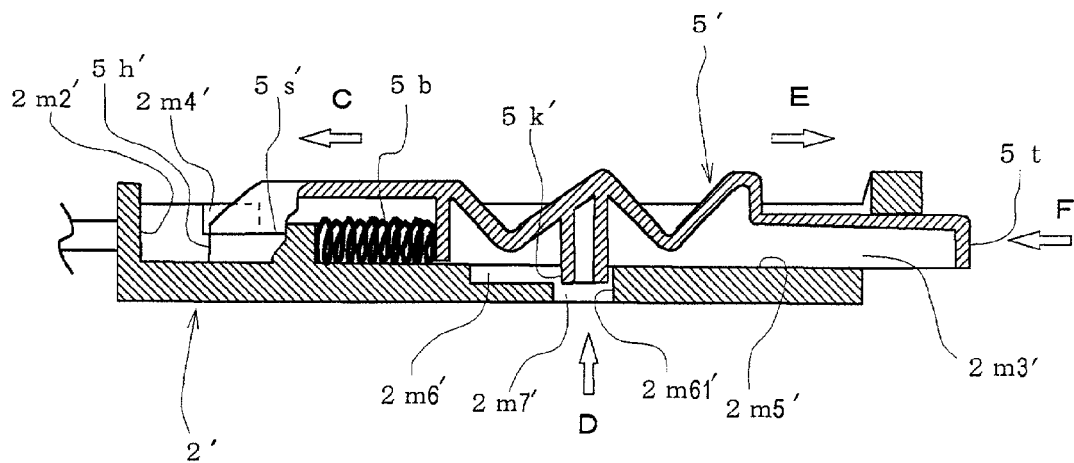

Then, as shown in FIG. 31(c), the button sliding guide steps 5s' and 5s' of the tilt button 5' are inserted toward the bottom of the button upward guide ribs 2m4' and 2m4', and the tilt button 5' is pressed in the direction of the arrow C until the disassembling projection 5k' of the tilt button 5' is accommodated inside the projection accommodating concavity 2m6' of the button sliding channel 2m.

Figure 32:
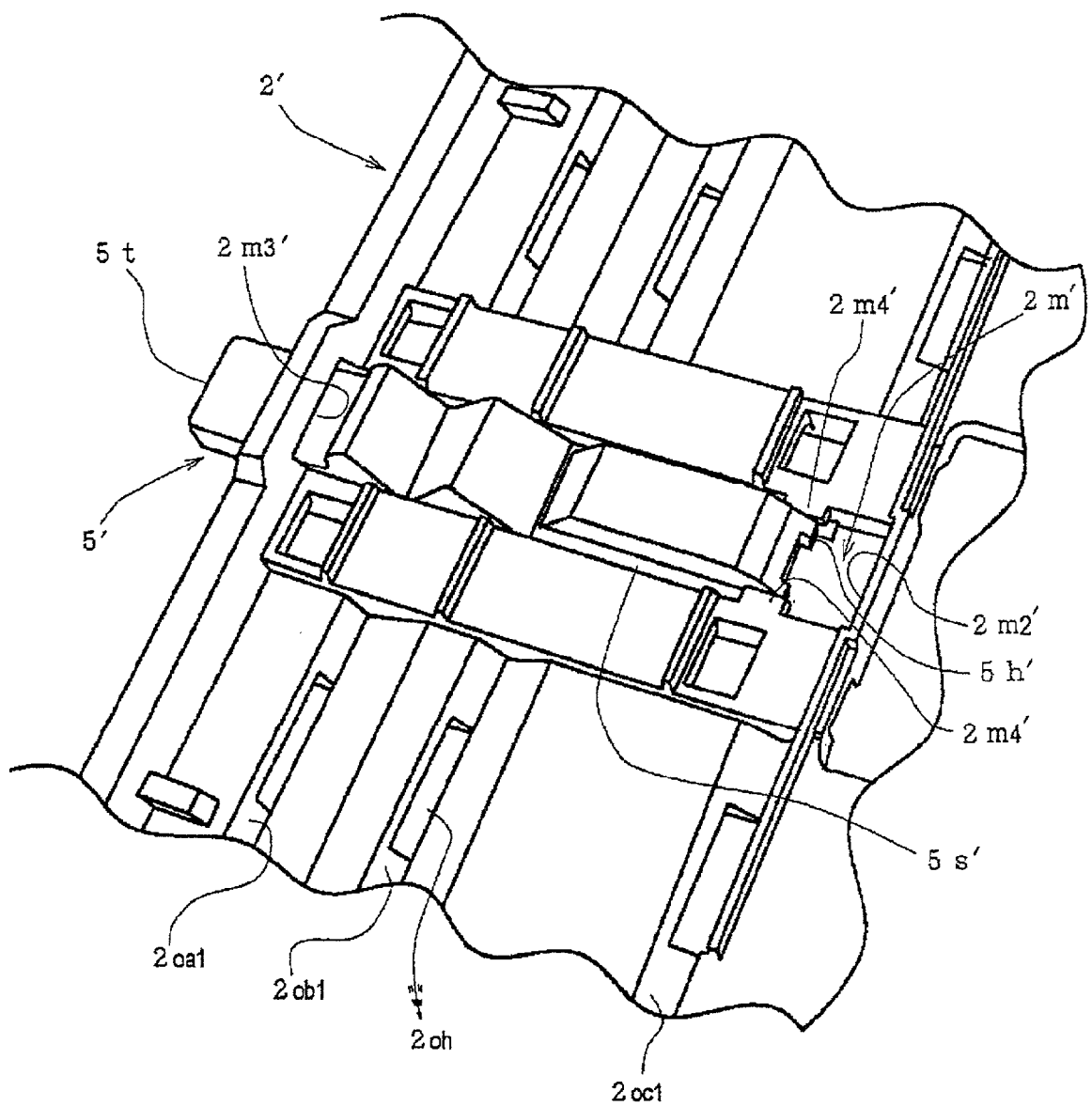
FIG. 32 is a perspective view showing the condition of the second embodiment of the electronic equipment mounting angle varying apparatus according to the present invention with the tilt button attached to the tilt base.

When the disassembling projection 5k' of the tilt button 5' is accommodated inside the projection accommodating concavity 2m6', the attachment of the tilt button 5' to the tilt base 2' is complete, as shown in FIG. 32.

Conversely, the procedures for detaching the tilt button 5' that is attached to the tilt base 2' involves firstly, as shown in FIG. 31(c), inserting a pin or the like into the disassembling projection pressing hole 2m7' and using that to push the disassembling projection 5k' of the tilt button 5' in the direction of the arrow D, pushing it up until the disassembling projection 5k' is positioned above the upper surface of the button sliding channel bottom panel 2m5'.

Next, the tilt button 5' is grasped and pushed in the direction of the arrow E, and, as shown in FIG. 31(b), pushing farther with the disassembling projection 5k' riding on the button sliding channel bottom panel 2m5'.

Then, when the button sliding guide steps 5s' and 5s' of the tilt button 5' are removed away toward the bottom of the button upward guide ribs 2m4' and 2m4', as shown in FIG. 31(a), the leading end of the tilt button 5' is lifted up, and the tilt button 5' is pulled out in the direction of the arrow G and removed from the tilt base 2'.

A description is given next of the operation of the tilt button 5' attached to the tilt base 2'.

The tilt button 5', as shown in FIG. 31(c), when the outer end 5t thereof is pressed in the direction of the arrow F by a user, moves in the direction of the arrow C against the urging force of the compression spring 5b.

The front wall panel 5h' of the tilt button 5' then comes up against the button abutting wall 2m2' of the tilt base 2' whereupon the movement of the tilt button 5' due to the pressing force on it stops.

When the user stops pressing against the tilt button 5', the tilt button 5' moves in the direction of the arrow E due to the urging force of the compression spring 5b, and the movement of the tilt button 5' is stopped by the disassembling projection 5k' of the tilt button 5' coming up against the accommodating concavity curved surface 2m61' inside the projection accommodating concavity 2m6' (see FIG. 31(c)).

Based on the configuration described above, the tilt button 5' is engaged inside the button sliding channel 2m' because the button sliding guide steps 5s' and 5s' at one end thereof are guided from above by the button upward guide ribs 2m4' and 2m4' of the tilt base 2', and because the outer circumferential surface at the other end is guided by the button insertion hole 2m3', and the reciprocal movement thereof is conducted smoothly.

The attachment of the tilt button 5' to the tilt base 2' is accomplished, moreover, by inserting the attachment portion 5u' of the tilt button 5' into the button insertion hole 2m3' of the tilt base 2', elastically deforming the tilt button 5', and inserting the button sliding guide steps 5s' and 5s' toward the bottom of the button upward guide ribs 2m4' and 2m4' of the tilt base 2'.

Conversely, when detaching the tilt button 5' from the tilt base 2', a pin or the like is inserted into the disassembling projection pressing hole 2m7' and, using that, the disassembling projection 5k' of the tilt button 5' is pressed upward, whereupon the tilt button 5' is easily removed by elastically deforming and moving it, wherefore the attachment and detachment of the tilt button 5' to and from the tilt base 2' is performed easily and smoothly, and the assembly characteristics are good, so the disassembling operation is easy.

Accordingly, even when the tilt button 5' is damaged, the disassembling operation and assembly operation are easy and the apparatus exhibits outstanding maintainability.

As described in the foregoing, moreover, when attaching the tilt button 5' to the tilt base 2', no parts such as screws are used whatsoever, wherefore there are no rising costs for new parts, and, thanks also to the good assembling characteristics, manufacturing costs are low.

The button upward guide ribs 2m4' and 2m4' are made in a flat rectangular panel form, but the shape thereof can be selected suitably, with the corners chamfered, rounded, or made semicircular or the like.

The disassembling projection pressing hole 2m7' was made a circular hole having a radius larger than that of the disassembling projection 5k' of the tilt button 5', but, needless to say, the shape of the hole can be selected suitably, and made an elliptical hole or rectangular hole or the like larger than the disassembling projection 5k'.

A description is given next of a mounting angle varying apparatus that is a third embodiment, for altering the mounting angle when an add-on module (auxiliary equipment) 51 has been installed to the telephone set 50 in order to add extension lines or the like, as shown in FIG. 31.

Figure 34:
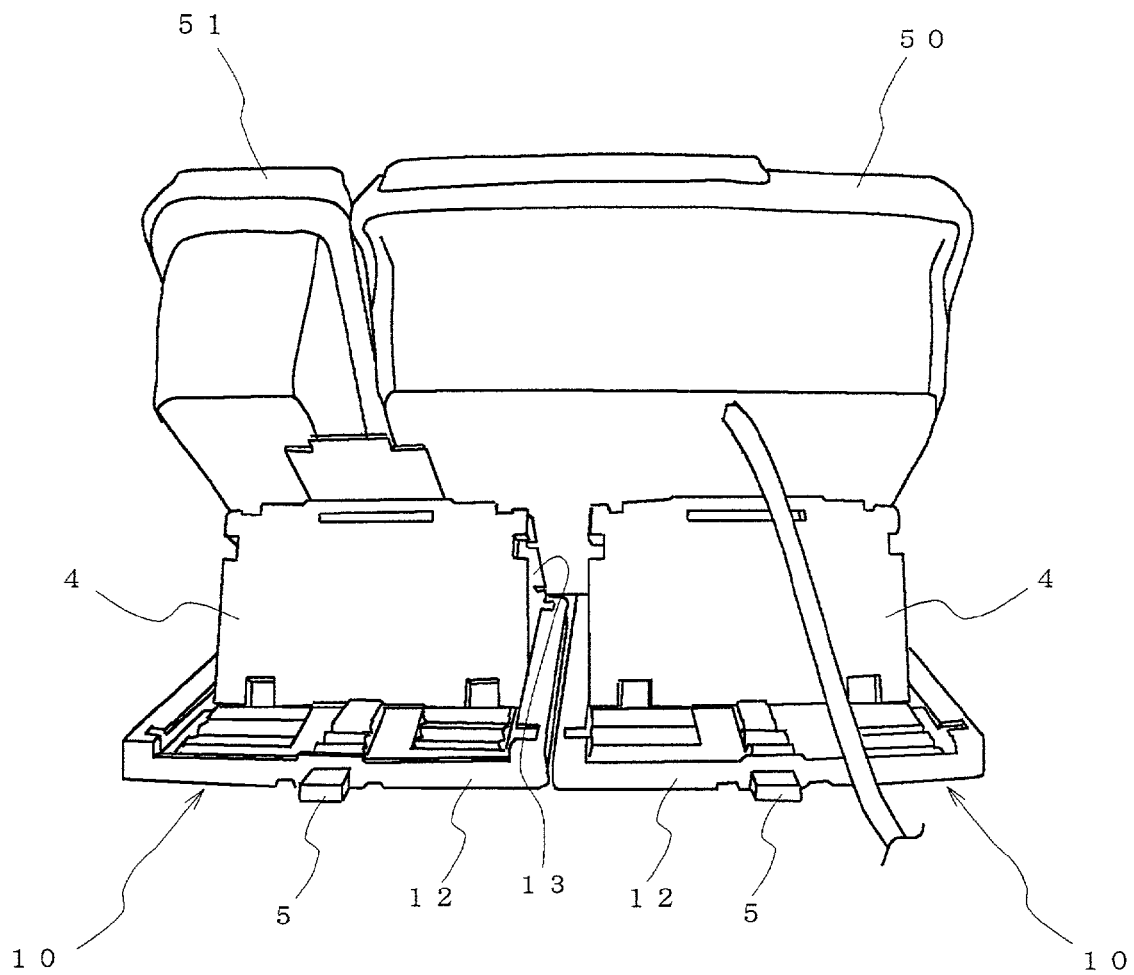
FIG. 34 is a perspective view, from the back, showing the condition of a mounting angle varying apparatus installed in a telephone set having an add-on module installed, representing a third embodiment of the electronic equipment mounting angle varying apparatus according to the present invention.

As shown in FIG. 34, in order to change the mounting angle of the telephone set 50 to which the add-on module 51 has been added, two mounting angle varying apparatuses 10 are used.

Figure 33:
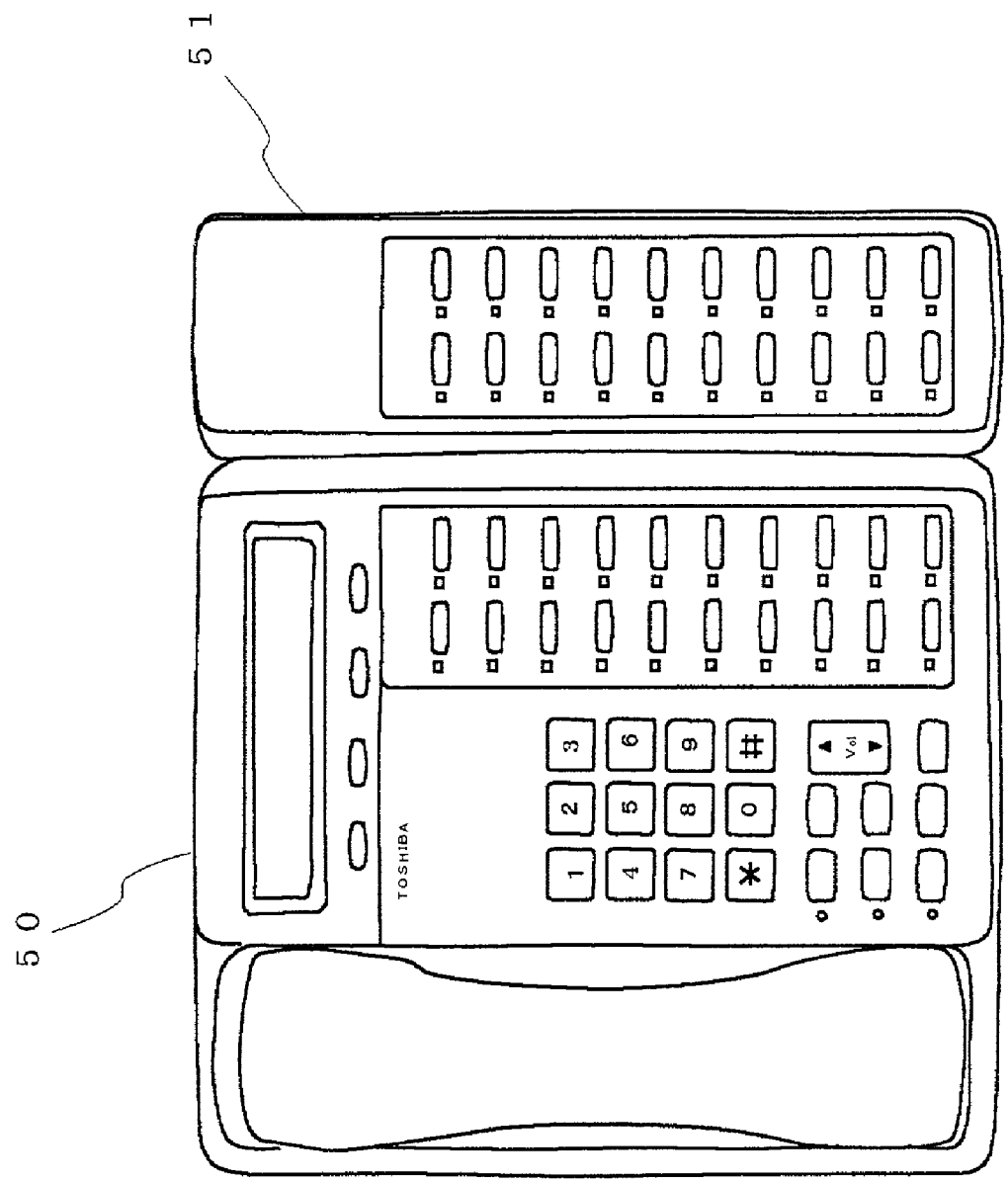
FIG. 33 is a plan showing an add-on module installed in a telephone set.

The mounting angle varying apparatus 10, as shown in FIG. 33, has, in the upper surface of the telephone set attachment panel 3p of the tilt cover 3 in the mounting angle varying apparatus 1 described earlier, a predetermined number of attachment hubs 13b disposed with apparatus attachment holes 13ba made therein, passing vertically through the telephone set attachment panel 3p.

A tilt base 12, as shown in FIG. 34, has the same configuration as the tilt base 2 (standard base unit) (see FIG. 34(a)) in the mounting angle varying apparatus 1 within the range indicated by G, but is configured so that the width H is merely shortened to the width H' (see FIG. 34(b)).

In other words, the equipment support portions 12f of the tilt base 12 are configured so as to be narrower than the equipment support portions 2f in the tilt base 2.

The configuration of the mounting angle varying apparatus 10 in all other respects is exactly the same as the configuration of the mounting angle varying apparatus 1, wherefore the same symbols are applied and no further description thereof is given here.

Figure 35:
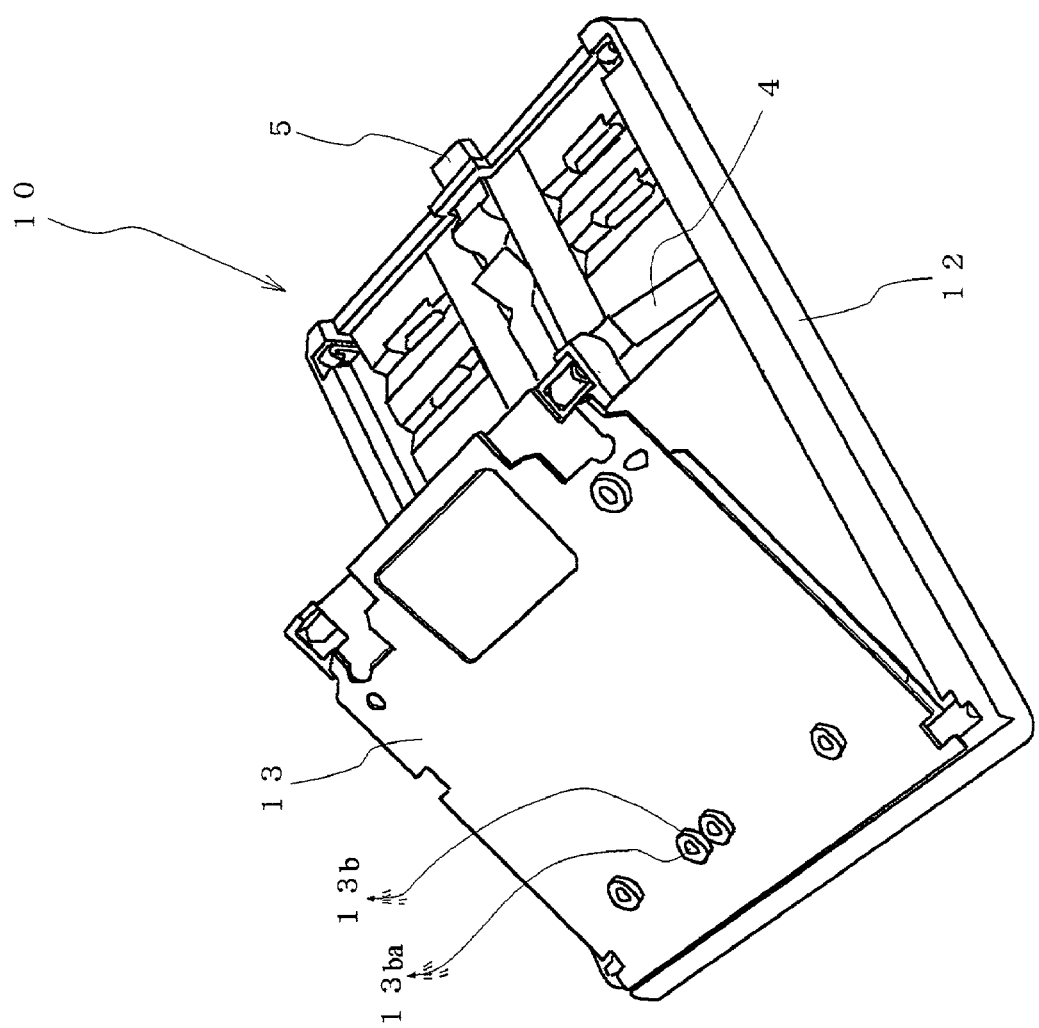
FIG. 35 is a perspective view of the third embodiment of the electronic equipment mounting angle varying apparatus according to the present invention.

The tilt base 12 is a molded resin product molded using an upper and a lower die. As shown in FIG. 35(a), an insert die 2K for the base die having the width H of the tilt base 2 for molding the tilt base 2 is replaced by an insert die 12K for the base die having the width H' of the tilt base 12 for molding the tilt base 12, and the configuration otherwise is molded with the application of dies (standard dies for molding standard base units) that are exactly the same as those used for the tilt base 2.

The tilt cover 13 is a molded resin product molded using an upper and lower die. As shown in FIG. 35(b), an insert die 3K for a cover die for molding the tilt cover 3 in the mounting angle varying apparatus 1 is replaced by an insert die 13K for an attachment hub molding die for molding the tilt cover 13 having a 13K1 unit for molding the predetermined number of attachment hubs 13b, and the configuration otherwise is molded with the application of dies (standard dies for molding mounting units) that are exactly the same as those used for the tilt cover 3.

Figure 36A:
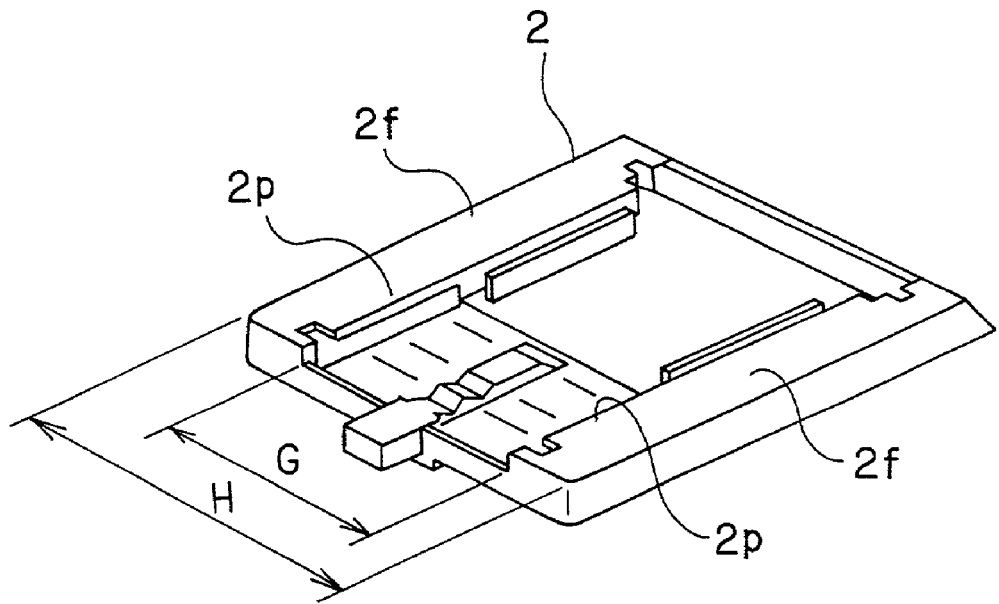
FIGS. 36(*a*) and 36(*b*) are perspective views of a tilt base for describing the third embodiment of the electronic equipment mounting angle varying apparatus according to the present invention.
Figure 36B:
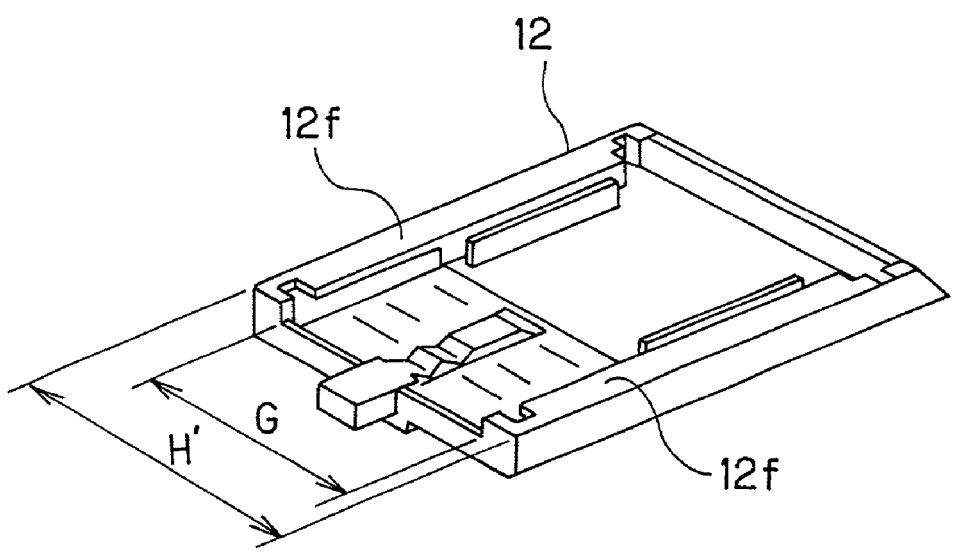
Figure 37A:
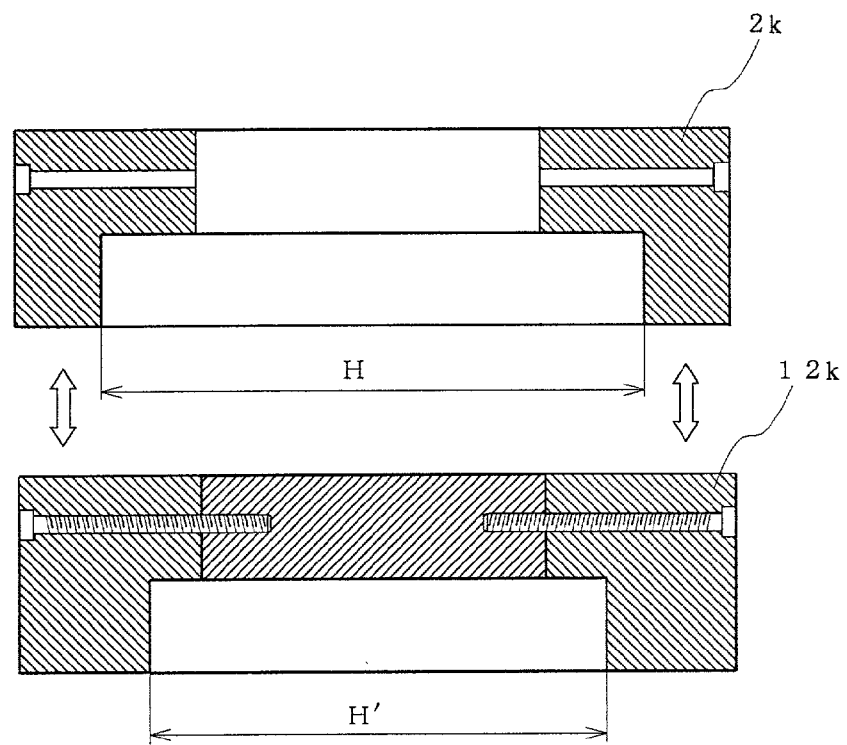
FIGS. 37(*a*) and 37(*b*) are a section representing the process of molding a tilt base representing the third embodiment of the electronic equipment mounting angle varying apparatus according to the present invention, and a section representing the process of molding tilt cover attachment hubs.
Figure 37B:
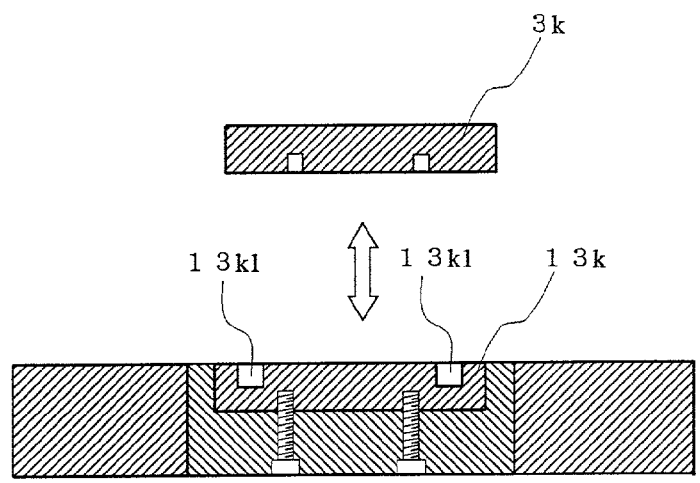
Figure 38:
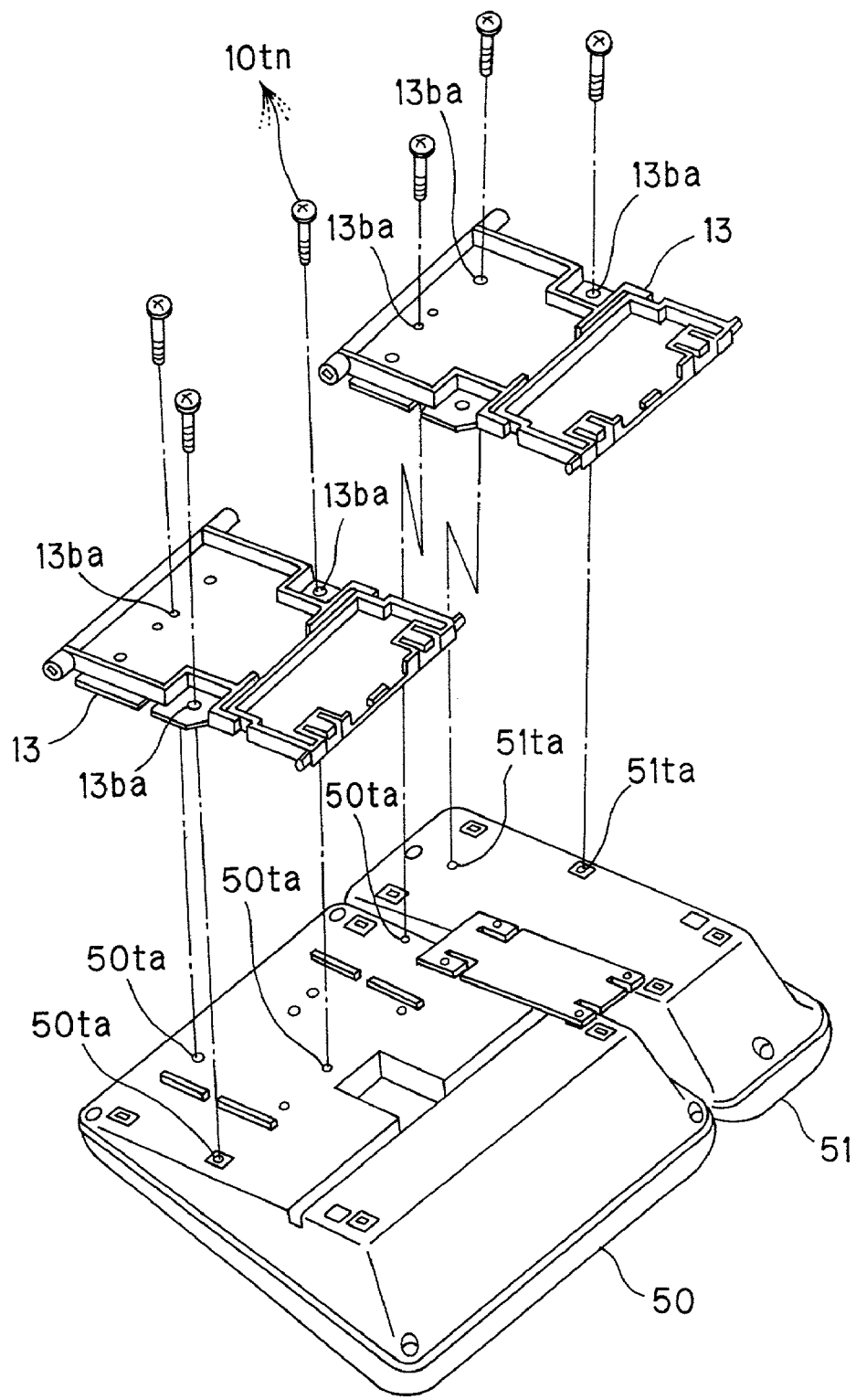
FIG. 38 is a perspective view representing the process of attaching the third embodiment of the electronic equipment mounting angle varying apparatus according to the present invention.

Now, as shown in FIG. 36, in the lower surface of the lower case of the telephone set 50, a predetermined number of attachment holes 50ta for attaching the mounting angle varying apparatus 10 is made, and, similarly, in the lower surface of the add-on module 51, a predetermined number of attachment holes 51ta for attaching the mounting angle varying apparatus 10 to the add-on module 51 is made.

In order to attach the mounting angle varying apparatuses 10 to the telephone set 50 and the add-on module 51, firstly, the apparatus attachment holes 13ba of the tilt covers 13 and 13 are aligned with the corresponding attachment holes 50ta in the lower case of the telephone set 50 and with the corresponding attachment holes 51ta in the lower case of the add-on module 51, and the tilt covers 13 and 13 are attached to the telephone set 50 and the add-on module 51 by screwing in attachment screws 10tn.

Next, by the method described earlier, by respectively attaching the tilt arms 4 and the tilt bases 12 having the tilt buttons 5 installed therein in the tilt covers 13 and 13, the mounting angle varying apparatuses 10 and 10 are installed in the telephone set 50 and the add-on module 51, as shown in FIG. 32.

The operation of setting the telephone set 50 with the add-on module 51 installed to an angle using the mounting angle varying apparatuses 10 and 10 is done by applying the operation for the mounting angle varying apparatus 1 described earlier to the mounting angle varying apparatuses 10 and 10.

In the embodiment described in the foregoing, the case where a single add-on module 51 is installed in the telephone set 50 is given as an example, but, for a case where two or more add-on modules 51 are installed in the telephone set 50, it is only necessary to install mounting angle varying apparatuses 10 at the end or the like on either side, respectively.

It should be noted that the position to install the mounting angle varying apparatus is not necessarily limited to the ends on both sides.

Based on the mounting angle varying apparatus 10 having the configuration described above, a mounting angle varying apparatus 10 is attached to the end or the like on each side of the telephone set 50 wherein the add-on modules 51 are installed, wherefore the telephone set 50 with the add-on modules 51 installed exhibits good balance and high stability.

Also, the attachment hubs 13b are formed integrally on the upper surface of the mounting angle varying apparatus 10, wherefore the projections and cords and the like on the bottom surface of the telephone set 50 can be avoided, there is no need for spacers made of rubber or the like, and equipment costs are prevented from escalating.

The mounting angle varying apparatuses 10 can be manufactured using the trimming die assembly for the mounting angle varying apparatus 1 by replacing the insert die therein, so manufacturing costs are low.

In the embodiments described in the foregoing, attachment hubs are formed on the upper surface of the mounting angle varying apparatus 10, however, needless to say, it is possible to configure the mounting angle varying apparatus 10 without forming attachment hubs.

By suitably setting the width of the mounting angle varying apparatus 1, it is also possible to make a configuration wherewith a mounting angle varying apparatus 1 is installed to the end on either side, respectively, of the telephone set 50 wherein an add-on module 51 is installed.

In that case, it is possible to employ a single type of mounting angle varying apparatus both to a telephone set by itself and to a telephone set having an add-on module installed, whereupon mounting angle varying apparatuses can be obtained at extremely low manufacturing cost.

Next, an angle varying apparatus 41 in a fourth embodiment that is a modified example of the first embodiment is described.

Here, the fourth embodiment is one wherein a partial modification has been made to the configuration of the tilt cover 3 alone in the first embodiment, wherefore configurations that are the same as in the first embodiment are assigned the same reference symbol, and no further description thereof is given.

Figure 39:
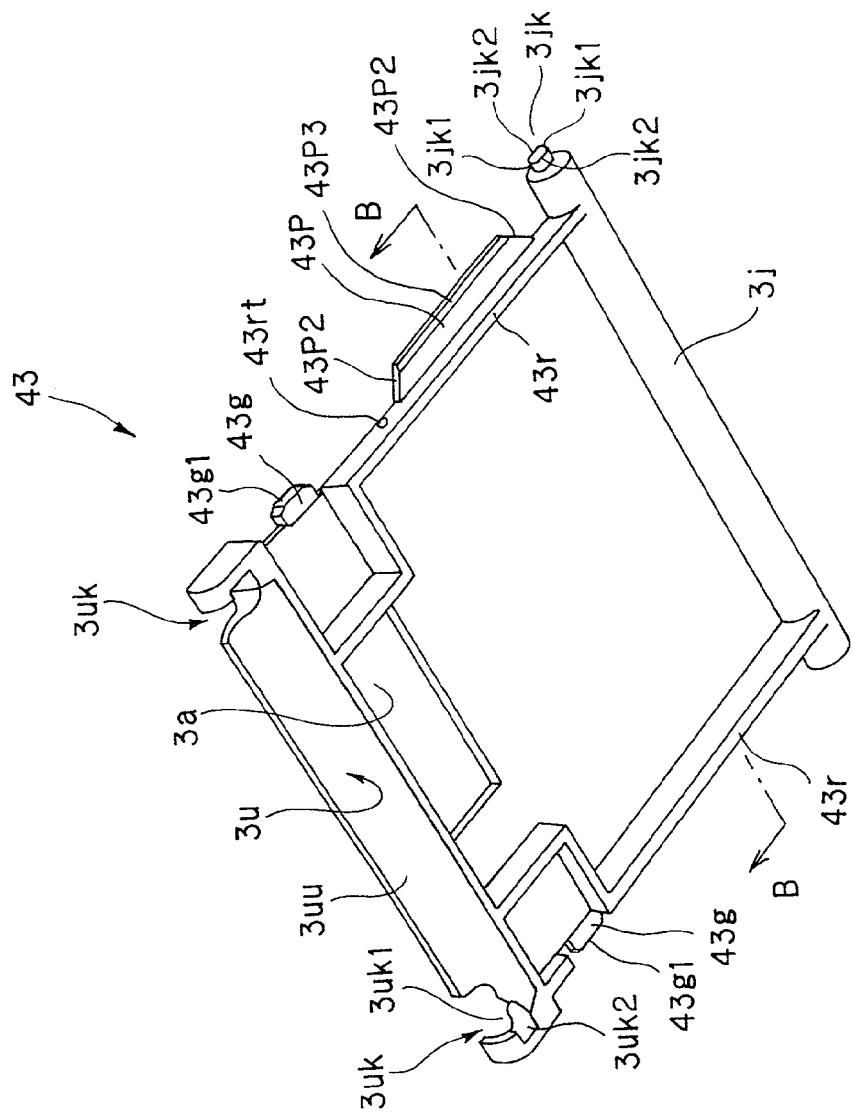
FIG. 39 is a diagonal view of a fourth embodiment of the electronic equipment mounting angle varying apparatus relating to the present invention, as seen from the lower surface of the tilt cover.

The tilt cover 43 in the fourth embodiment is a resin molding that is molded using upper and lower dies, and, as diagrammed in FIG. 39, presents a rectangular parallelepiped shape.

Figure 40:
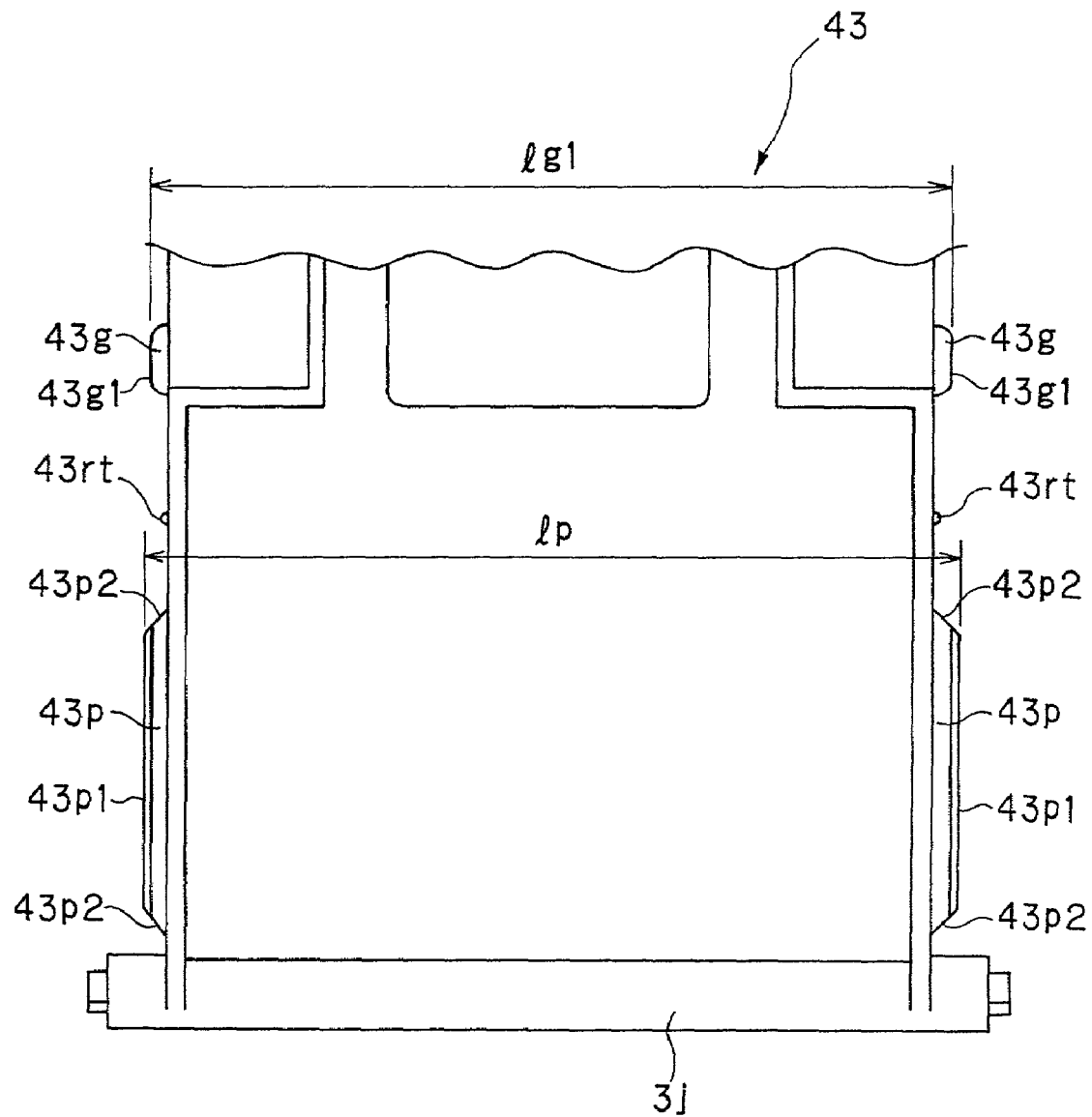
FIG. 40 is a view in the direction of arrow H in FIG. 39.

In the two side parts of the upper part of the tilt cover 43, as diagrammed in FIG. 39 and in FIG. 40 which is a view in the direction of arrow H in FIG. 39, two thin-sheet form attachment guide stoppers (positioning guide portions) 43g and 43g forming a pair having the same shape are erected in object positions. The corners of the attachment guide stoppers 43g are chamfered.

Now, in the lower surface of the telephone set 50, as diagrammed in FIG. 23, a pair of guide rails 50r for attaching a telephone number card affixing tray 50t is formed with the dimension 1r between the guide rail inner surfaces 50r1 and 50r1. The guide rails 50r, as diagrammed in FIG. 43(b), have L-shaped cross-sections each having an engagement groove with an accommodating height 1h and accommodating width and length 1y, into which the telephone number card affixing tray 50t is slidden, fit, and attached, formed integrally with the outer case of the telephone set 50.

Figure 46:
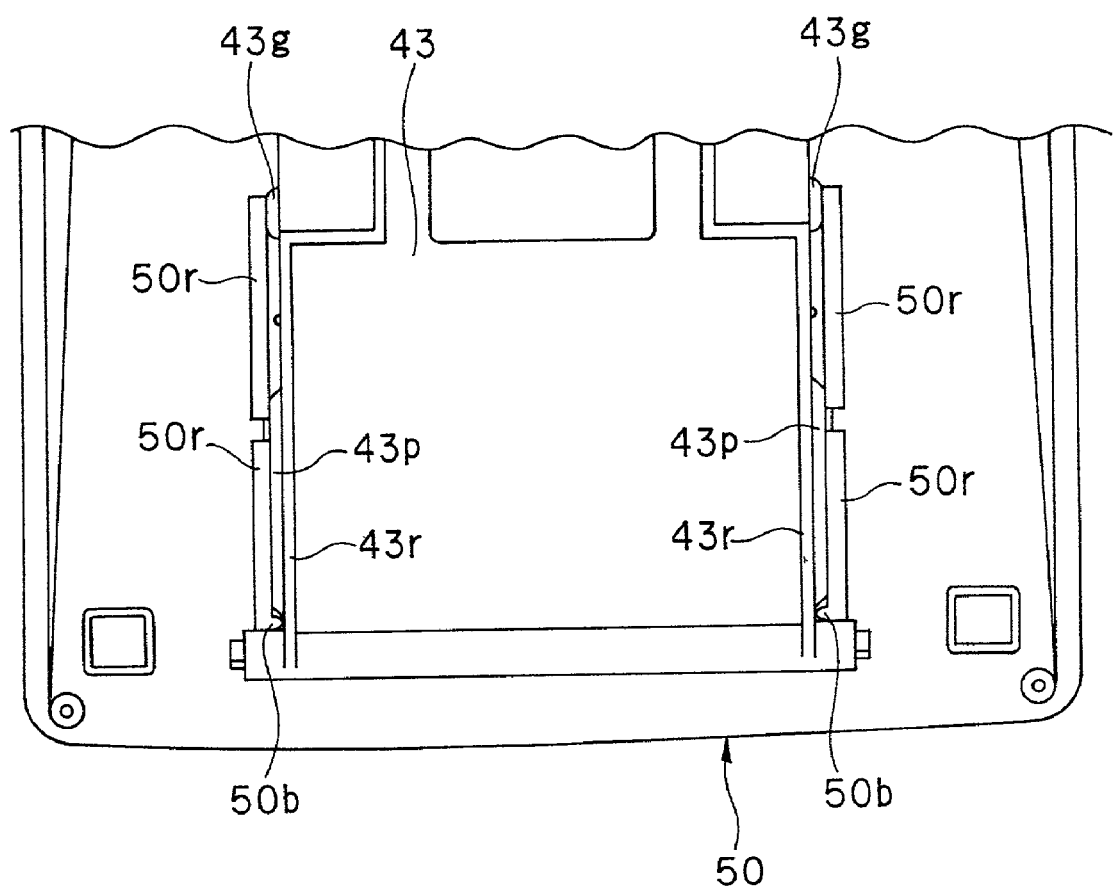
FIG. 46 is a diagram showing the relationship between guide rails on the lower surface of a telephone set, guide stoppers of the tilt cover 43, and attachment flanges in a case where the angle varying apparatus in the fourth embodiment is attached to a telephone set.

As diagrammed in FIG. 46, stoppers 50b are formed in parts of the guide rails 50r, and the cover ribs 43r of the tilt cover 43 are provided so that the stoppers 50b are abutted thereto from outside.

Figure 43A:
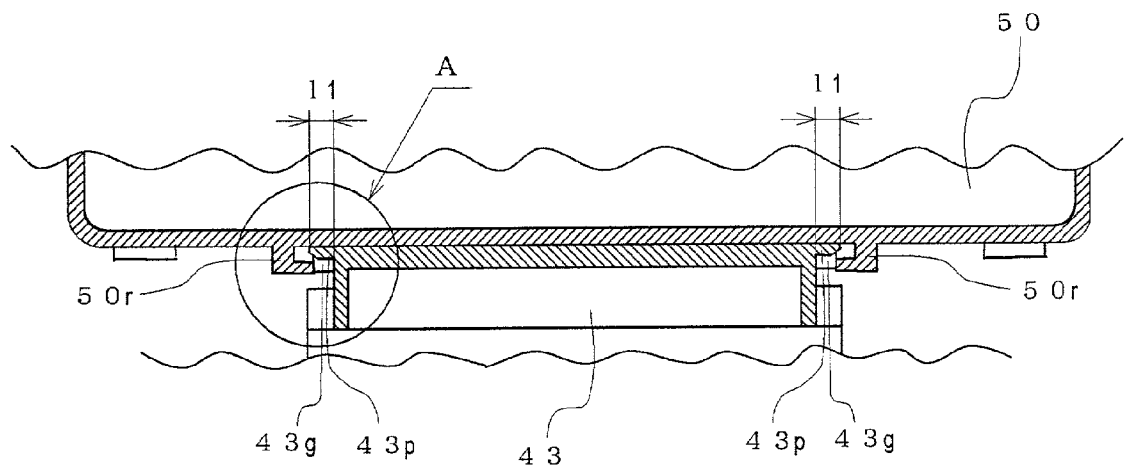
FIGS. 43(a) and 43(b) provides C—C cross-sections of the telephone set diagrammed in FIG. 42(c) and the angle varying apparatus of the fourth embodiment, and an enlarged detailed drawing of the A part in FIG. 43(a)

The dimension 1g1 between the outer end edges 43g1 and 43g1 of the two attachment guide stoppers 43g and 43g (cf FIG. 40) is made slightly smaller than the dimension 1r between the guide rail inner surfaces 50r1 and 50r1 so as to facilitate attachment to the guide rail inner surfaces 50r1 and 50r1 (cf. FIG. 23) of the guide rails 50r and 50r on the lower surface of the telephone set 50 while the attachment guide stoppers 43g and 43g are sliding, as diagrammed in FIG. 43(a).

Figure 43B:
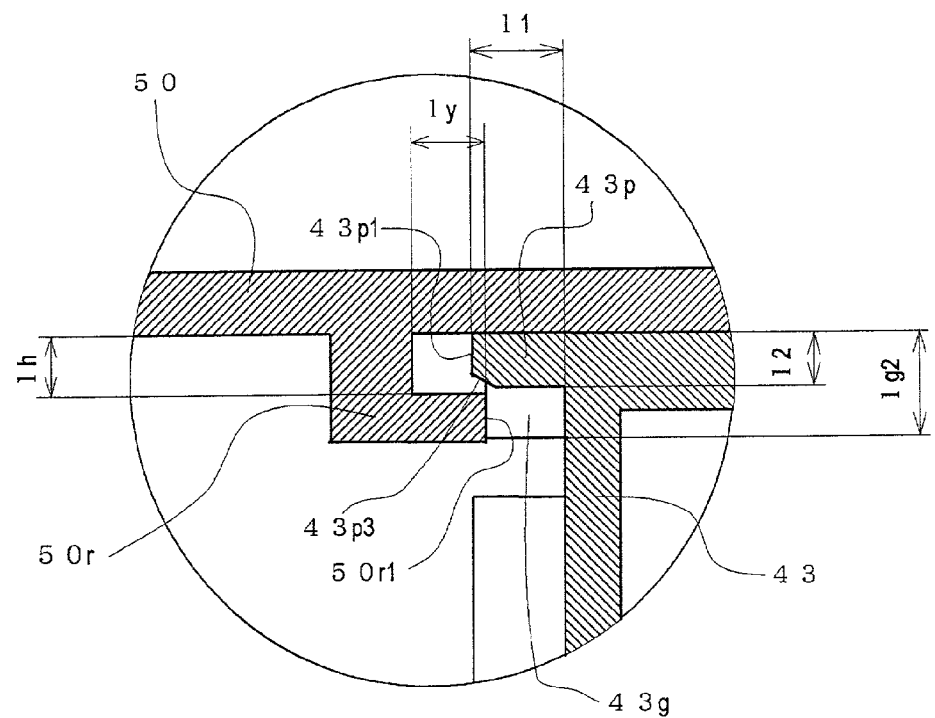

The thickness dimension 1g2 of the attachment guide stoppers 43g (cf. FIG. 41(b)), moreover, is made larger than the accommodating height 1h of the guide rails 50r, as diagrammed in FIG. 43(b).

The configuration is made so that, by the attachment guide stoppers 43g and 43g being guided and inserted between the guide rail inner surfaces 50r1 and 50r1 of the guide rails 50r and 50r, the outer end edges 43g1 and 43g1 of the attachment guide stoppers 43g and 43g are held between the guide rail inner surfaces 50r1 and 50r1 of the guide rails 50r and 50r, wobbling when fitting the attachment flanges 43p and 43p (described farther below) of the tilt cover 43 in the guide rails 50r and 50r is prevented, and the attachment flanges 43p and 43p are set at prescribed relative positions, relative to the guide rails 50r and 50r.

Further, at the both sides of the top face of the tilt cover 43, a pair of thin-sheet form attachment flanges (attachment portions) 43p and 43p having the same shape are erected at object positions, as diagrammed in FIG. 39 and FIG. 40.

The attachment flanges 43p and 43p are flanges for attaching the tilt cover 43 to the guide rails 50r and 50r on the lower surface of the telephone set 50. The dimension 1p between the outer end edges 43p1 and 43p1 of the two attachment flanges 43p and 43p is formed so as to have roughly the same length as the width dimension 150 of the telephone number card affixing tray 50t (cf. FIG. 23), and in the two corners of the attachment flanges 43p are formed sloping surfaces 43p2 and 43p2 to facilitate easy insertion into the guide rails 50r and 50r on the lower surface of the telephone set 50 (cf. FIG. 44) as well as easy removal therefrom.

Figure 47A:
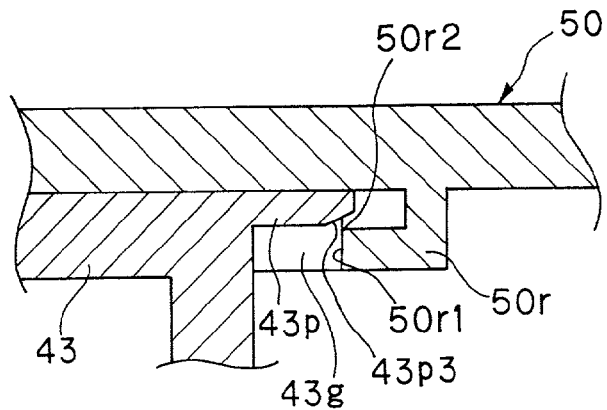
FIGS. 47(a) though 47(c) provides enlarged detailed cross-sections showing the conditions of the guide rails on the lower surface of the telephone set, the guide stoppers of the tilt cover, and the attachment flanges, in the process of the telephone set being removed from the angle varying apparatus when excessive force is applied to a telephone set attached to the angle varying apparatus of the fourth embodiment.
Figure 47B:
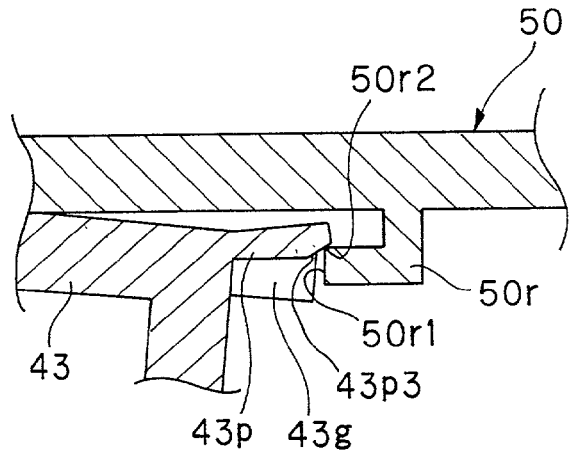
Figure 47C:
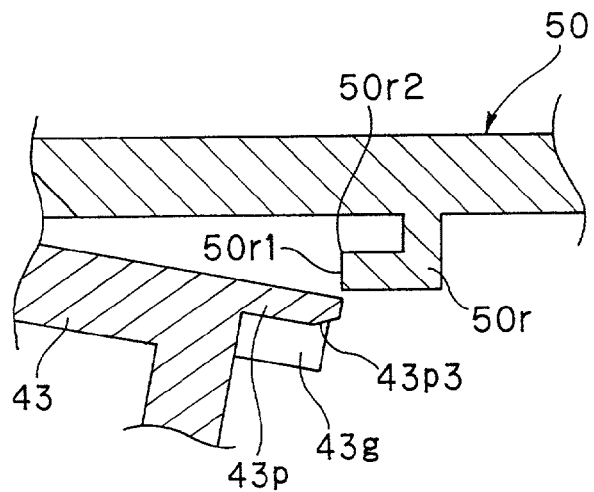
Figure 48A:
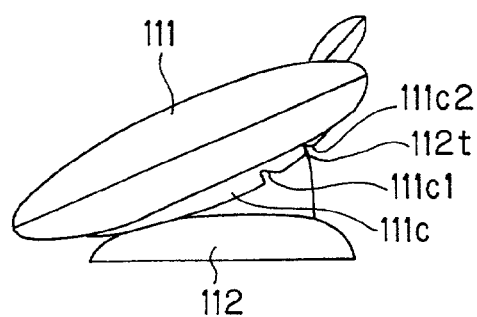
FIGS. 48(a) and 48(b) are side elevations representing different mounting angles for a telephone set equipped with a conventional mounting angle varying apparatus.
Figure 48B:
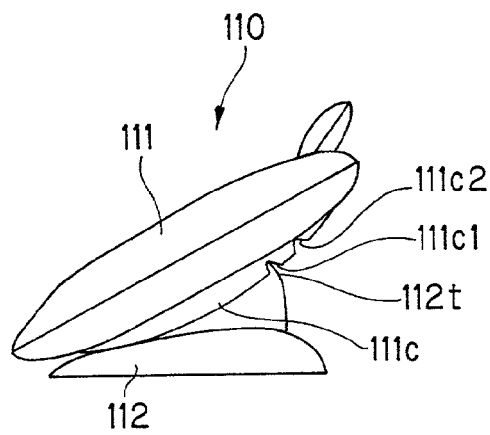
Figure 49A:
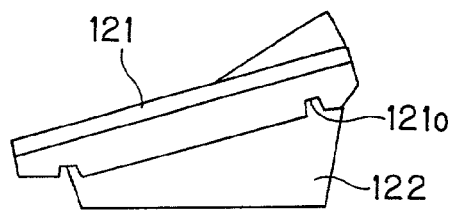
FIGS. 49(a) and 49(b) are side elevations representing different mounting angles for a telephone set equipped with a conventional mounting angle varying apparatus.
Figure 49B:
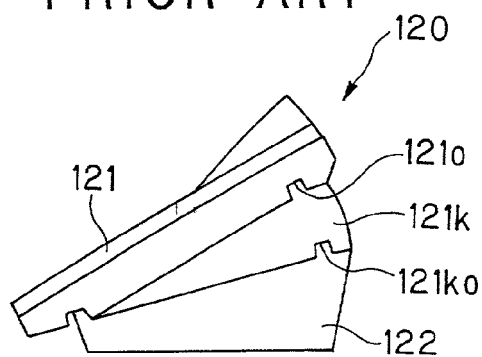
Figure 50A:
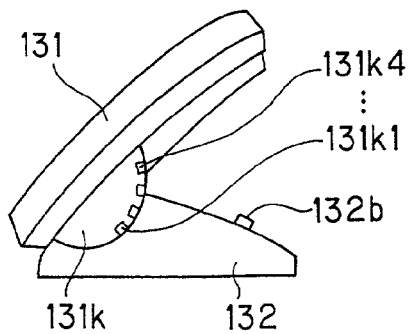
FIGS. 50(a) and 50(b) are side elevations representing different mounting angles for a telephone set equipped with a conventional mounting angle varying apparatus.
Figure 50B:
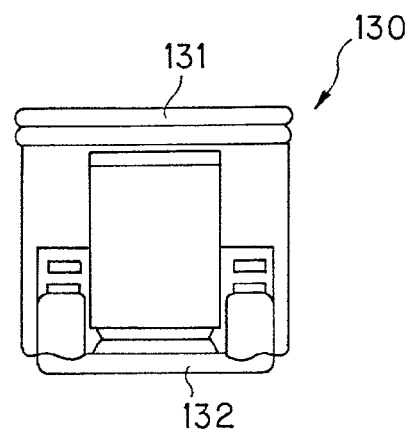
Figure 51A:
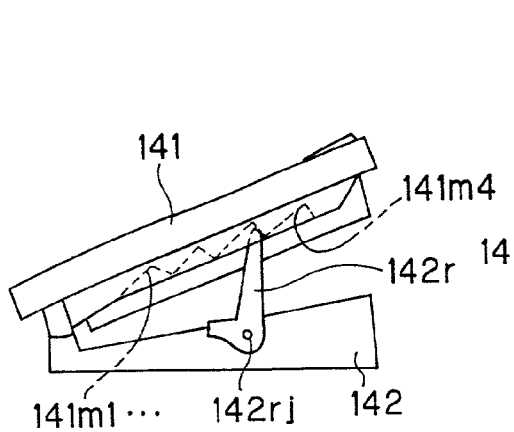
FIGS. 51(a) and 51(b) are side elevations representing different mounting angles for a telephone set equipped with a conventional mounting angle varying apparatus.
Figure 51B:
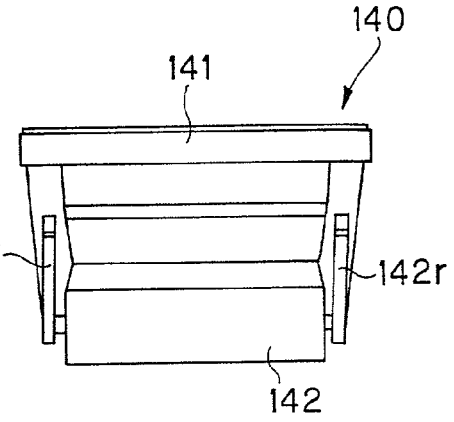
Figure 52A:
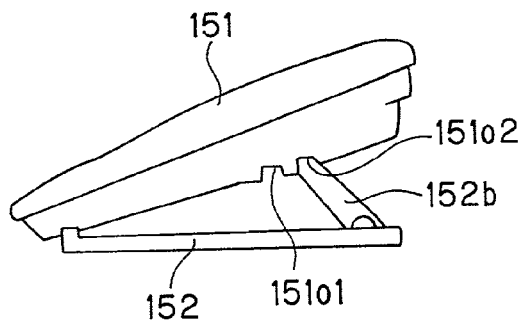
FIGS. 52(a) and 52(b) are side elevations representing different mounting angles for a telephone set equipped with a conventional mounting angle varying apparatus.
Figure 52B:
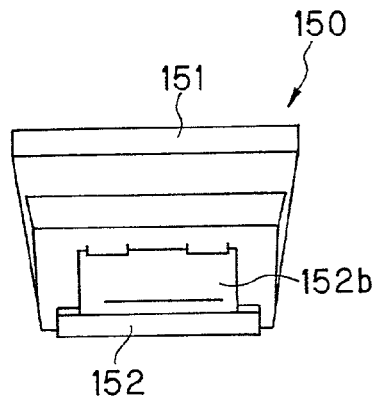
Figure 53A:
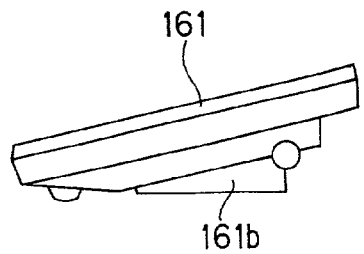
FIGS. 53(a) and 53(b) are side elevations representing different mounting angles for a telephone set equipped with a conventional mounting angle varying apparatus.
Figure 53B:
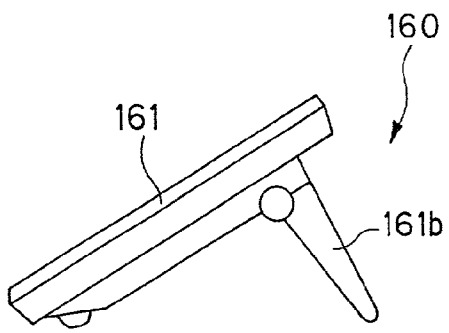

As to the attachment flanges 43p, when the projecting length 11 and sheet thickness 12 indicated in FIGS. 41(a) and 41(b) which are B—B sections in FIG. 39 apply excessive force to the telephone set 50 mounted to the angle varying apparatus 41, the attachment flanges 43p and 43p sag within stress tolerances (cf. FIG. 47(a) to 47(c)), so that the guide rails 50r on the lower surface of the telephone set 50 are not damaged, and are set so as to have a suitable gap between the guide rails 50r on the lower surface of the telephone set 50, so that the angle varying apparatus 41 will separate from the telephone set 50 (cf. FIGS. 43(a) and 43(b)).

Here, as diagrammed in FIG. 43(b), the sheet thickness 12 of the attachment flanges 43p relative to the accommodating height 1h of the guide rails 50r on the lower surface of the telephone set 50 is set so that there is a suitable gap between the guide rails 50r and the lower surfaces of the attachment flanges 43p. Also, the projecting length 11 of the attachment flanges 43p relative to the accommodating length 1y of the guide rails 50r is set so that there is a suitable gap between the guide rails 50r and the outer end edges 43p1 of the attachment flanges 43p.

Also, when the outer end edges 43p1 of the attachment flanges 43p and 43p are sharp corners, it is difficult for the attachment flanges 43p and 43p of the tilt cover 43 that are fit together with the guide rails 50r and 50r to separate when excessive force is applied to the telephone set 50, and there is a danger of the attachment flanges 43p and 43p or guide rails 50r and 50r being damaged, wherefore, as diagrammed in FIGS. 41(a) and 41(b), the corners in the lower parts of the outer end edges 43p1 of the attachment flanges 43p are removed and the sloping surfaces (attachment sloping surfaces) 43p3 are formed.

The configuration is also made so that, as diagrammed in FIGS. 43(a) and 43(b), there is a fit with the end edges 50r1 of the guide rails 50r at the locations of the sloping surfaces 43p3 of the attachment flanges 43p.

Furthermore, the lap of the fit of the attachment flanges 43p with the guide rails 50r is calculated from the shape of the attachment flanges 43p and the stress tolerances of the root, using material dynamics, and suitably set.

Here, as described earlier, the relative positions of the attachment flanges 43p and 43p of the tilt cover 43 and the guide rails 50r and 50r of the telephone set 50 are set by the attachment guide stoppers 43g and 43g of the tilt cover 43 being guided and inserted between the inner surfaces 50r1 and 50r1 of the guide rails 50r and 50r on the lower surface of the telephone set 50. For that reason, when the attachment flanges 43p and 43p fit together with the guide rails 50r and 50r, they do not fit together deeply, and wobbling is prevented.

Accordingly, when excessive force is applied to the telephone set 50, as diagrammed in FIG. 47(a) to 47(c), the attachment flanges 43p and 43p sag within the range of stress tolerances of the root, whereupon the attachment flanges 43p and 43p of the tilt cover separate from the guide rails 50r and 50r on the lower surface of the telephone set 50 without being forced, the angle varying apparatus 41 and the telephone set 50 main body are separated, and no damage occurs in either.

Instead of the sloping surfaces 43p3 at the corners of the outer end edges 43p1 and 43p1 of the attachment flanges 43p and 43p, moreover, R surfaces 43p4 may be formed, as diagrammed in FIG. 41(c).

Also, in the center of the outer surfaces of the cover ribs 43r formed on either side of the tilt cover 43, cover securing projections 43rt are erected which present a hemispherical shape oriented toward the outside.

When the mounting angle of the telephone set 50 is 0 degrees, the cover securing projections 43rt latch in the cover securing holes 2ro of the cover securing ribs 2r in the tilt base 2, and anchor the tilt cover 43 to the tilt base 2.

Next, the method of attaching the angle varying apparatus 41 to the telephone set 50 is described.

First, as diagrammed in FIG. 23, the telephone number card affixing tray 50t is slidden outward from the guide rails 50r and 50r having L-shaped cross-sections on the lower surface of the telephone set 50 and removed.

Next, as diagrammed in FIG. 24, the sides of the telephone number card affixing tray 50t are inserted into the pair of base guide rails 2t formed in the tilt base 2, slidden toward the back, and fit inside (cf. FIG. 25).

Figure 42A:
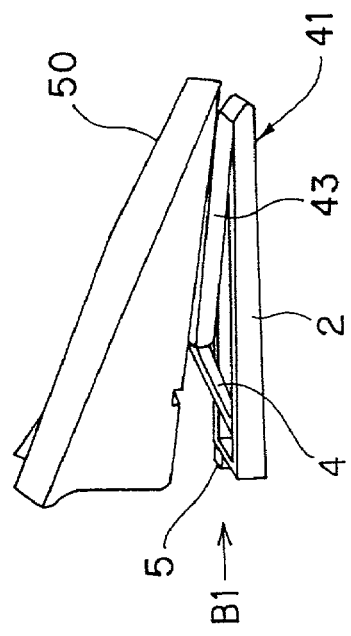
FIGS. 42(a) through 42(d) provides diagonal views representing mounting angles in a fourth embodiment of the electronic equipment mounting angle varying apparatus relating to the present invention.
Figure 42B:
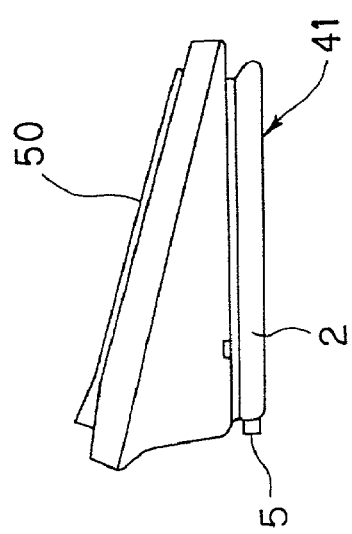
Figure 44:
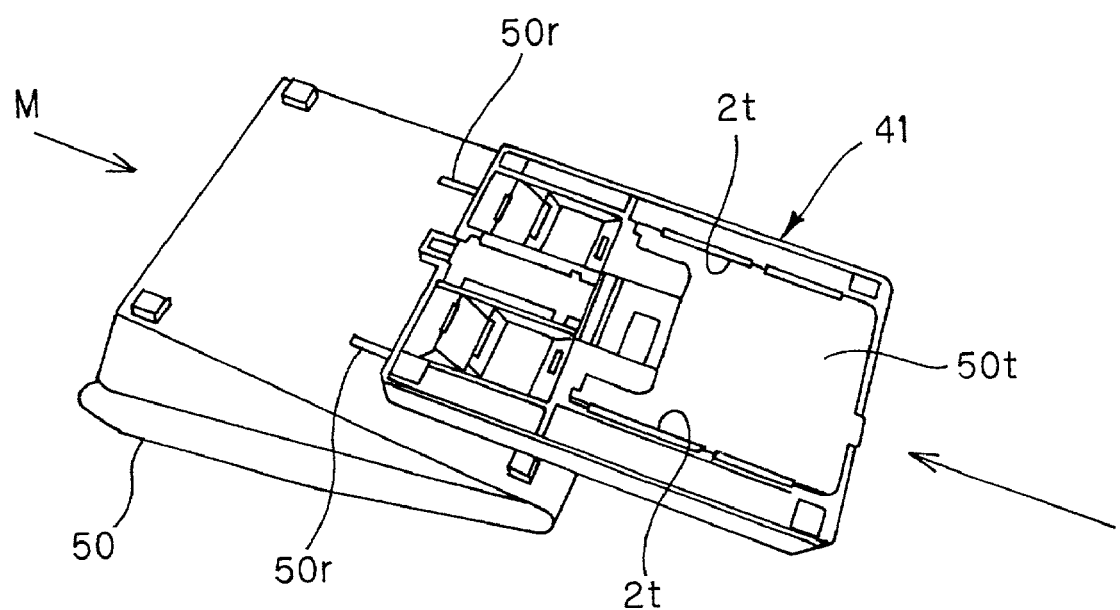
FIG. 44 is a diagonal diagram representing the attaching process in the is fourth embodiment of the electronic equipment mounting angle varying apparatus relating to the present invention.
Figure 45:
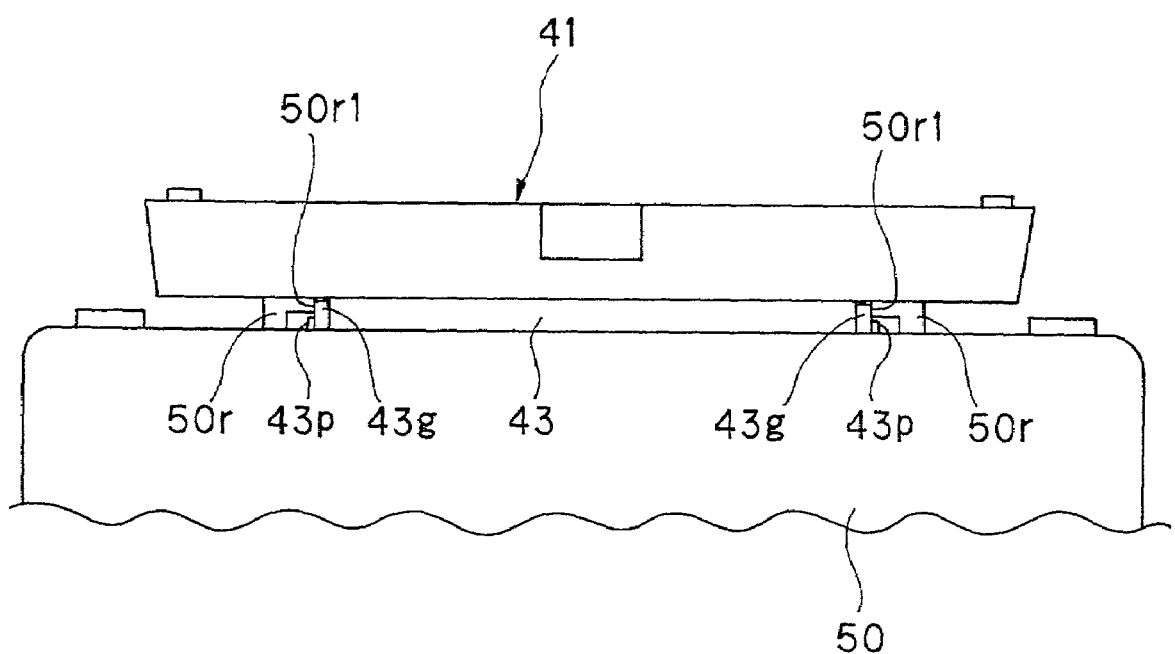
FIG. 45 is a view, in the direction of arrow M of the attachment process diagrammed in FIG. 44.

Then, as diagrammed in FIG. 44 and in FIG. 45 which is a view in the direction of arrow M in FIG. 44, the outer end edges 43g1 and 43g1 of the attachment guide stoppers 43g and 43g of the tilt cover 43 in the angle varying apparatus 41 are aligned in place between the inner surfaces 50r1 and 50r1 of the guide rails 50r and 50r on the lower surface of the telephone set 50, the outer end edges 43g1 and 43g1 of the attachment guide stoppers 43g and 43g are guided in the inner surfaces 50r1 and 50r1 of the guide rails 50r and 50r, and the angle varying apparatus 41 is caused to slide over the lower surface of the telephone set 50 and thereby the attachment flanges 43p and 43p of the tilt cover 43 are inserted into the pair of guide rails 50r and 50r on the lower surface of the telephone set 50, and fit inside by being slidden to the rear, whereupon, as diagrammed in FIG. 27, the angle varying apparatus 41 is attached to the telephone set 50. The telephone set 50 attached to the angle varying apparatus 41 is represented in FIG. 42(a).

The dimension between the lower surface of the telephone set 50 and the stoppers (guide portions) 50b and 50b that are parts of the guide rails 50r and 50r of the telephone set 50 is made sufficiently large for the attachment guide stoppers 43g and attachment flanges 43p of the tilt cover 43 to be passed through.

The relationship between the tilt cover 43 and the guide rails 50r and 50r on the lower surface of the telephone set 50 when the angle varying apparatus 41 is attached to the telephone set 50 is diagrammed in FIG. 46.

The attachment guide stoppers 43g and 43g in the tilt cover 43 of the angle varying apparatus 41 and the guide rails 50r and 50r of the telephone set 50 abut against each other, and the stoppers 50b and 50b that are parts of the guide rails 50r and 50r of the telephone set 50 and the cover ribs 43r and 43r of the tilt cover 43 of the angle varying apparatus 41 abut against each other. Due to these abutments, as diagrammed in FIG. 43 which is the C—C section in FIG. 42(c), the attachment flanges 43p and 43p of the tilt cover 43 and the guide rails 50r and 50r of the telephone set 50 take on a prescribed relative relationship having a prescribed gap between them, fitting is effected with the guide rail inner surfaces 50r1 of the guide rails 50r at the sites of the sloping surfaces 43p3 of the attachment flanges 43p, and there is no mutual deep fitting together.

Also, due to the abutments between the members described in the foregoing, wobbling of the angle varying apparatus 41 in the horizontal direction relative to the telephone set 50 is checked and prevented.

Figure 42C:
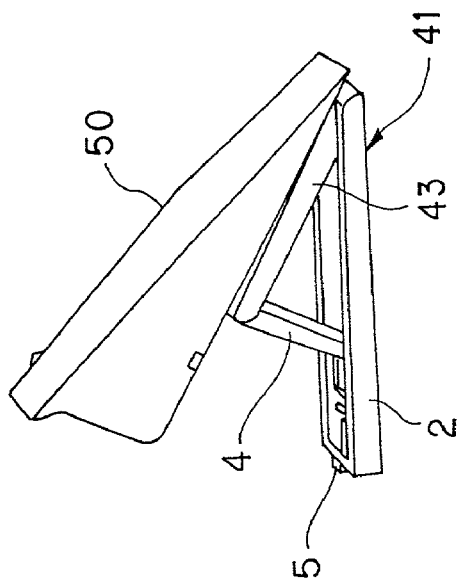
Figure 42D:
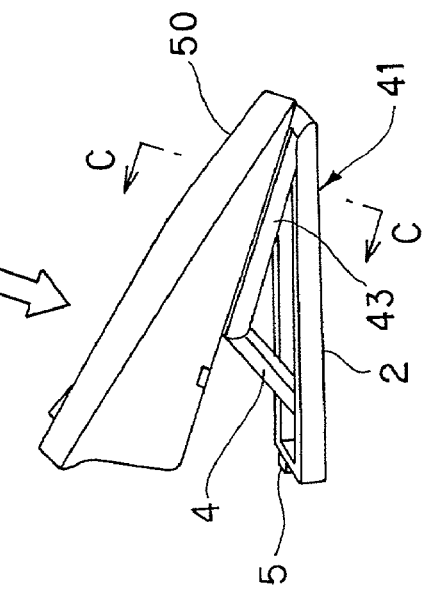

Next, a description is given of the dynamic behavior of the angle varying apparatus 41 when an excessive force is applied to the telephone set 50 to which the angle varying apparatus 41 has been attached, acting in the direction indicated by the arrow F, as diagrammed in FIG. 42(c).

Here, as diagrammed in FIG. 47(a) which is a detailed diagram of the way in which the guide rails 50r of the telephone set 50 and the attachment flanges 43p of the tilt cover 43 fit together, the guide rails 50r of the telephone set 50 and the attachment flanges 43p of the tilt cover 43 of the angle varying apparatus 41 have a prescribed gap between them, and fitting is effected with the end edges 50r1 of the guide rails 50r by the sloping surface 43p3 portions of the attachment flanges 43p.

When an excessive force is applied to the telephone set 50 as indicated by the arrow F in FIG. 42(c), as diagrammed in FIG. 47(b), the sloping surfaces 43p3 of the attachment flanges 43p of the tilt cover 43 abut against the end edge upper corners 50r2 of the guide rails 50r, the attachment flanges 43p sag within the range of stress tolerances, and the sloping surfaces 43p3 of the attachment flanges 43p slide over the end edge upper corners 50r2 of the guide rails 50r.

Following thereupon, as diagrammed in FIG. 47(c), the attachment flanges 43p of the tilt cover 43 of the angle varying apparatus 41 separate from the guide rails 50r of the telephone set 50 without being forced.

Based on the angle varying apparatus 41 having the configuration described in the foregoing, attachment guide stoppers 43g and 43g are provided in the tilt cover 43, and the amount of fitting together between the guide rails 50r on the lower surface of the telephone set 50 and the attachment flanges 43p of the tilt cover 43 can be set to a prescribed amount.

Also, sloping surfaces 43p3 are provided in the attachment flanges 43p of the tilt cover 43 which fit together with the guide rails 50r and 50r on the lower surface of the telephone set 50, wherefore, even when excessive force is applied to the telephone set 50 attached to the tilt cover 43, the attachment flanges 43p sag within stress tolerances, and slide over the sloping surfaces 43p3 without being forced.

Accordingly, the telephone set 50 and angle varying apparatus 41 separate without being forced, and damage does not occur in either the telephone set 50 or the angle varying apparatus 41.

Needless to say, the benefits afforded by the first embodiment are also afforded by the fourth embodiment.

Moreover, the second embodiment and third embodiment are also similarly applied in the fourth embodiment as in the first embodiment.

In the embodiments described in the foregoing, furthermore, a telephone set is exemplified as the electronic equipment, however it goes without saying that the electronic equipment mounting angle varying apparatus according to the present invention can be effectively applied to electronic equipment other than telephone sets.

As described in detail in the foregoing, based on the electronic equipment mounting angle varying apparatus relating to the first aspect of the present invention, the angle varying apparatus has a simple configuration configured by comprising a base member, mounting member, and arm member, the manufacturing cost whereof is low.

Also, the angle varying apparatus is configured in a separate portion from the electronic equipment, and users not requiring the angle varying apparatus can be spared the burden of extra product costs.

Based on the electronic equipment mounting angle varying apparatus related to the second aspect of the present invention, the mounting angle of the electronic equipment can be set in multiple stages through a large range, and the usability of the electronic equipment is enhanced.

Also, the configuration is made so that the arm latching member comprises a position latching member and an elastic latching member, operating reliability is high, and the arm latching portion can be latched in the arm latched portion with a definite feel.

Based on the electronic equipment mounting angle varying apparatus relating to the third aspect of the present invention, the base member comprises a latch guiding portion against which the arm member abuts in a manner such that the angle subtended with the inner surface of the arm member is acute, wherefore, when pressure acts downward on the electronic equipment, the arm latching portion of the arm member is guided so that it is fit together with the arm latched portion of the base member and latched, the arm member is guided to a horizontal attitude, and the operation of altering the mounting angle of the electronic equipment is easy.

Based on the electronic equipment mounting angle varying apparatus relating to the fourth aspect of the present invention, the arm member comprises an arm guide portion for releasing the latching of the arm latching portion, and also comprises an operating member comprising an operating guide portion for moving the arm guide portion of the arm member by being moved from the normal position to the operating position, and releasing the latching between the arm latching portion and the arm latched portion. Therefore, when altering the mounting angle of the angle varying apparatus, the user accomplishes that by pressing the operating member, releasing the latching of the arm member with the base member, and placing his or her hand lightly on the arm member, and lightly pushing the arm latching portion into the arm latched portion of the base member corresponding to the desired mounting angle. There is no need to perform the operation while visually monitoring the arm latched portion or the arm latching portion, and operability is good.

Based on the electronic equipment mounting angle varying apparatus relating to the fifth aspect of the present invention, the mounting member is attached to the base member by fitting a base support shaft portion into a base support shaft bearing portion, wherefore assembly is easy, and the assembling characteristics are good.

Based on the electronic equipment mounting angle varying apparatus relating to the sixth aspect of the present invention, the base support shaft portion is provided with fitting shaft portions, respectively, at either end of the main shaft portion, and the base support shaft bearing portion is provided with fitting shaft bearing portions, respectively, at either end of the first shaft bearing portion, wherefore the dimensions of the base support shaft bearing portion can be configured long, and it is possible to disperse the loads acting on the base support shaft bearing portion so that strength is high against loads.

Based on the electronic equipment mounting angle varying apparatus relating to the seventh aspect of the present invention, it is possible to mold the base support shaft bearing portion with a trimming die assembly, and it becomes possible to mold the base member and the mounting member with trimming die assemblies, whereupon manufacturing costs are low.

Based on the electronic equipment mounting angle varying apparatus relating to the eighth aspect of the present invention, the arm member is attached to the mounting member by fitting a mounting support shaft portion into a mounting support shaft bearing portion, wherefore assembly is easy and the assembling characteristics are good.

Based on the electronic equipment mounting angle varying apparatus relating to the ninth aspect of the present invention, the mounting support shaft bearing portion is provided with mounting fitting shaft bearing portions, respectively, at either end of a third shaft bearing portion, wherefore the dimensions of the mounting support shaft bearing portion can be configured long, and it is possible to disperse the loads acting on the mounting support shaft bearing portion so that strength is high against loads.

Based on the electronic equipment mounting angle varying apparatus relating to the tenth aspect of the present invention, the mounting support shaft bearing portion can be molded with a trimming die assembly, and it becomes possible to mold the mounting member and the arm member with trimming die assemblies, whereupon manufacturing costs are low.

Based on the electronic equipment mounting angle varying apparatus relating to the eleventh aspect of the present invention, the base member comprises a falling-out prevention portion for preventing the arm member from coming out, and the arm member comprises an arm pull-out prevention portion that engages the falling-out prevention portion of the base member, wherefore it is possible to prevent the arm member from separating from the base member.

Accordingly, the angle varying apparatus is configured so that the configuring members do not become separated, wherefore the configuring members can be prevented from being lost or damaged.

Based on the electronic equipment mounting angle varying apparatus relating to the twelfth aspect of the present invention, due to the respective abutments of the pair of positioning guide portions against the guide rails, and to the abutments between the guide portions and the mounting member, the respective attachment portions are made to fit with the guide rails, at prescribed positions opposed by the sloping surfaces of the attachment portions at the guide rail end edges, wherefore, when excessive force is applied to the electronic equipment, the electronic equipment and the angle varying apparatus can be separated without damage occurring in either the electronic equipment or the angle varying apparatus.

The angle varying apparatus can also be attached to or detached from the electronic equipment, making it highly convenient.

Based on the electronic equipment mounting angle varying apparatus relating to the thirteenth aspect of the present invention, by installing the mounting angle varying apparatus in the electronic equipment, the mounting angle of the electronic equipment can be set in a plurality of steps, and the utility of the electronic equipment is enhanced.

Furthermore, the mounting angle varying apparatus is configured separately from the electronic equipment, and can be attached and detached to and from the electronic equipment, wherefore users who do not require a mounting angle varying apparatus can be spared the burden of extra product cost.

Furthermore, when altering the mounting angle of the mounting angle varying apparatus, that is accomplished by pressing an operating unit, releasing the engagement between an arm unit and a base unit, then lightly placing the hands on the arm unit and lightly pressing an arm latching portion into an arm latched portion of the base unit corresponding to the desired mounting angle, wherefore there is no need to perform the operation while visually verifying the arm latched portion and arm latching portion, and operability is good.

Furthermore, the mounting angle varying apparatus is configured so that an arm pull-out preventing portion is engaged by a falling-out preventing portion, so that the configuring members do not become separated, wherefore the configuring members are prevented from being lost or damaged.

Moreover, the structure of the mounting angle varying apparatus is simple, and the mounting angle varying apparatus manufacturing cost is low.

According to an electronic equipment mounting angle varying apparatus relating to the fourteenth aspect of the present invention, the base unit comprises an equipment support portion, of narrower width than the equipment support portion of a standard base unit, molded, with the use of an insert die, in a standard die for molding the standard base unit for a mounting angle varying apparatus attached to electronic equipment wherein no auxiliary equipment is installed, and, when auxiliary equipment is installed in the electronic equipment, at least two mounting angle varying apparatuses are attached, to the electronic equipment and to the auxiliary equipment. Accordingly, as based on the electronic equipment mounting angle varying apparatus relating to the second aspect of the present invention, a base unit comprising an equipment support portion of narrow width can be manufactured using a standard die for molding a standard base unit by replacing the insert die therein, wherefore manufacturing costs are low.

Also, because at least two mounting angle varying apparatuses are attached to the electronic equipment wherein auxiliary equipment is installed, the electronic equipment having auxiliary equipment installed exhibits good balance and high stability.

According to an electronic equipment mounting angle varying apparatus relating to the sixteen aspect of the present invention, the mounting unit comprises a predetermined number of attachment hubs, formed using an insert die, in a standard die for forming mounting units, in the upper part thereof, and the mounting angle varying apparatus is attached to the electronic equipment by the attachment hubs. Accordingly, based on the electronic equipment mounting angle varying apparatus relating to the third aspect of the present invention, a mounting unit comprising attachment hubs can be manufactured using a standard die for forming a mounting unit by replacing the insert die therein, wherefore manufacturing costs are low.

Furthermore, because attachment hubs are formed in the upper part of the mounting angle varying apparatus mounting unit, the mounting angle varying apparatus can be attached to electronic equipment by the attachment hubs, without using spacers made of rubber or the like, while avoiding the projections and the like on the lower surface of the electronic equipment, whereupon equipment costs can be prevented from escalating.

According to an electronic equipment mounting angle varying apparatus relating to the seventeenth aspect of the present invention, the operating unit is attached to the base unit by being inserted into the operating unit insertion hole in the base unit, from the inside direction of the base unit toward the outside direction thereof, and brought back from the outside direction of the base unit toward the inside direction thereof, with the sliding guided portion being inserted downward in the operating unit overhead guiding portion of the base unit, and the operating unit is detached from the base unit by being passed through the disassembling hole from below the base unit and pressed upward, and being pressed from the inside direction of the base unit toward the outside direction thereof in a horizontal direction with the sliding guided portion being released from below the operating unit overhead guiding portion of the base unit. Accordingly, based on the electronic equipment mounting angle varying apparatus relating to the fourth aspect of the present invention, by elastically deforming the operating unit, the attachment and detachment of the operating unit to and from the base unit can be performed simply, assembly characteristics are good, and the disassembling operation is easy. Accordingly, the apparatus exhibits outstanding maintainability.

Also, this configuration can be effected without requiring attachment members such as screws or the like, material costs do not escalate, and, thanks also to the good assembling characteristics, manufacturing costs are low.

What is claimed is:

1. An electronic equipment mounting angle varying apparatus, comprising:
   a base member mounted at a place where electronic equipment is installed;
   a mounting member on which the electronic equipment is mounted, and which is supported by the base member so as to freely swing about a horizontal base support shaft axis; and
   an arm member supported by the mounting member so as to freely swing about a mounting member support shaft axis extending horizontally, which sets a mounting angle of the electronic equipment by being latched by the base member, whereby the electronic equipment is mounted at a prescribed angle;
   wherein the base member holds the electronic equipment at the prescribed mounting angle by latching the arm member, and comprises an arm latched portion constituted by a plurality of holes formed along a direction perpendicular to the horizontal base support shaft axis; and
   wherein the arm member has an arm latching portion comprising a positioning latching portion that is fit into the arm latched portion and determines a position relative to the base member, and an elastic latching portion that has a convex portion at a leading end thereof and is flexibly deformed so that the convex portion is fit inside the arm latched portion and engages therewith, the arm latching portion being latched by the engagement of the convex portion in the arm latched portion.

2. The electronic equipment mounting angle varying apparatus according to claim 1, wherein the base member comprises a latching guide surface portion against which the arm member abuts in a manner such that an angle subtended with an inner surface of the arm member is acute; and
   wherein, by pressing the electronic equipment downward, the arm latching portion of the arm member is guided so as to be fitted into and latched by the arm latched portion of the base member, and the arm member is guided to a horizontal attitude.

3. An electronic equipment mounting angle varying apparatus, comprising:
   a base member mounted at a place where electronic equipment is installed;
   a mounting member on which the electronic equipment is mounted, and which is supported by the base member so as to freely swing about a horizontal base support shaft axis; and
   an arm member supported by the mounting member so as to freely swing about a mounting member support shaft axis extending horizontally, which sets a mounting angle of the electronic equipment by being latched by the base member, whereby the electronic equipment is mounted at a prescribed angle;
   wherein the base member holds the electronic equipment at the prescribed mounting angle by latching the arm member, and comprises an arm latched portion constituted by a plurality of holes formed along a direction perpendicular to the horizontal base support shaft axis;
   wherein the arm member has an arm latching portion comprising a positioning latching portion that is fit into the arm latched portion and determines a position relative to the base member, and an elastic latching portion that has a convex portion at a leading end thereof and is flexibly deformed so that the convex portion is fit inside the arm latched portion and engages therewith, the arm latching portion being latched by the engagement of the convex portion in the arm latched portion;
   wherein the arm member comprises an arm guide portion for releasing latching of the arm latching portion; and
   wherein the equipment angle varying apparatus further comprises an operating member having an operating guide portion which, by being moved from a normal position to an operating position, causes the arm guide portion of the arm member to move for releasing latching between the arm latching portion and the arm latched portion, the operating member being energized so as to return from the operating position to the normal position by a return means.

4. An electronic equipment mounting angle varying apparatus, comprising:
   a base member mounted at a place where electronic equipment is installed;
   a mounting member on which the electronic equipment is mounted, and which is supported by the base member so as to freely swing about a horizontal base support shaft axis;
   an arm member supported by the mounting member so as to freely swing about a mounting member support shaft axis extending horizontally, which sets a mounting angle of the electronic equipment by being latched by the base member, whereby the electronic equipment is mounted at a prescribed angle; and
   a shaft bearing structure between the base member and the mounting member, which comprises a base support shaft portion and a base support shaft bearing portion provided to one or another of the base member and the mounting member, respectively;
   wherein the base support shaft portion comprises:
      a main shaft portion, centered on the horizontal base support shaft axis, having a first cylindrical surface extending along the horizontal base support shaft axis; and
      a fitting shaft portion, deployed concentrically with the main shaft portion, having a second cylindrical surface, one part of which is cut out with a first fitting surface; and
   wherein the base support shaft bearing portion comprises:
      a first shaft bearing portion that has a first circular arc shaped cross section and receives the first cylindrical surface of the main shaft portion slidably;
      a fitting shaft bearing portion comprising a second shaft bearing portion which has a second circular arc shaped cross section provided concentrically with the first shaft bearing portion, which receives the second cylindrical surface of the fitting shaft portion slidably, and which supports the base support shaft portion together with the first shaft bearing portion rotatably; and
      a first attachment hole formed through the second shaft bearing portion, and including a second fitting surface into which, from a relative position that cannot be assumed when the angle varying apparatus is in use, the base support shaft portion is fit into the base support shaft bearing portion, along the first fitting surface of the fitting shaft portion in the base support shaft portion.

5. The electronic equipment mounting angle varying apparatus according to claim 4, wherein the base support shaft portion is provided with the fitting shaft portion at both ends of the main shaft portion, respectively; and wherein the base support shaft bearing portion is provided with the fitting shaft bearing portion at both ends of the first shaft bearing portion, respectively.

6. The electronic equipment mounting angle varying apparatus according to claim 4, wherein the first shaft bearing portion in the base support shaft bearing portion has a first die extraction space oriented in one of upper and lower die extraction directions outside of the first cylindrical surface;

wherein the fitting shaft bearing portion in the base support shaft bearing portion has a second die extraction space, oriented in the other of the upper and lower die extraction directions, outside of the second shaft bearing portion; and wherein the first attachment hole is passed through in line with the upper and lower die extraction directions.

7. The electronic equipment mounting angle varying apparatus, according any one of claims 4 through 6, further comprising: a second shaft bearing structure between the mounting member and the arm member, further comprising a mounting support shaft portion and a mounting support shaft bearing portion provided to one or another of the mounting member and the arm member, respectively;

wherein the mounting support shaft portion comprises:

a mounting main shaft portion centered on the mounting member support shaft axis, having a third cylindrical surface extending along the mounting member support shaft axis; and a mounting fitting shaft portion deployed concentrically with the mounting main shaft portion, having a fourth cylindrical surface, one part of which is cut out with a third fitting surface; and wherein the mounting support shaft bearing portion comprises:

a third shaft bearing portion that has a third circular arc shaped cross section and receives the third cylindrical surface of the mounting main shaft portion slidably;

a fourth shaft bearing portion which has a fourth circular arc shaped cross section provided concentrically with the third shaft bearing portion, which receives the fourth cylindrical surface of the mounting fitting shaft portion slidably, and supports the mounting support shaft portion together with the third shaft bearing portion rotatably; and a second attachment hole, formed through the fourth shaft bearing portion, having a fourth fitting surface into which, from a relative position that cannot be assumed when the angle varying apparatus is in use, the mounting support shaft portion is fit into the mounting support shaft bearing portion, along the third fitting surface of the mounting filling shaft portion in the mounting support shaft portion.

8. The electronic equipment mounting angle varying apparatus according to claim 7, wherein the mounting support shaft portion is provided with the mounting fitting shaft portion at both ends of the mounting main shaft portion, respectively; and wherein the mounting support shaft bearing portion is provided with the mounting fitting shaft bearing portion at both ends of the third shaft bearing portion, respectively.

9. The electronic equipment mounting angle varying apparatus according to claim 7, wherein the third shaft bearing portion in the mounting support shaft bearing portion has a third die extraction space, oriented in one of the directions of upper and lower die extraction, outside of the third cylindrical surface;

wherein the mounting fitting shaft bearing portion in the mounting support shaft bearing has a fourth die extraction space oriented in the other of the directions of the upper and lower die extraction outside of the shaft bearing surface of the fourth shaft bearing portion; and wherein the second attachment hole is formed through in line with the upper and lower die extraction directions.

10. An electronic equipment mounting angle varying apparatus, comprising:

a base member mounted at a place where electronic equipment is installed;

a mounting member on which the electronic equipment is mounted, and which is supported by the base member so as to freely swing about a horizontal base support shaft axis; and an arm member supported by the mounting member so as to freely swing about a mounting member support shaft axis extending horizontally, which sets a mounting angle of the electronic equipment by being latched by the base member, whereby the electronic equipment is mounted at a prescribed angle;

wherein the base member further comprises a falling-out prevention portion for preventing the arm member from coming out; and wherein the arm member further comprises an arm pulling-out prevention portion which engages the falling-out prevention portion of the base member.

11. An electronic equipment mounting angle varying apparatus, comprising:

a base member mounted at a place where electronic equipment is installed;

a mounting member on which the electronic equipment is mounted, and which is supported by the base member so as to freely swing about a horizontal base support shaft axis; and an arm member supported by the mounting member so as to freely swing about a mounting member support shaft axis extending horizontally, which sets a mounting angle of the electronic equipment by being latched by the base member, whereby the electronic equipment is mounted at a prescribed angle;

wherein the base member holds the electronic equipment at the prescribed mounting angle by latching the arm member, and comprises an arm latched portion constituted by a plurality of holes formed along a direction perpendicular to the horizontal base support shaft axis;

wherein the arm member has an arm latching portion comprising a positioning latching portion that is fit into the arm latched portion and determines a position relative to the base member, and an elastic latching portion that has a convex portion at a leading end thereof and is flexibly deformed so that the convex portion is fit inside the arm latched portion and engages therewith, the arm latching portion being latched by the engagement of the convex portion in the arm latched portion; and wherein the arm member comprises an arm guide portion for releasing latching of the arm latching portion.

12. An electronic equipment mounting angle varying apparatus, comprising:

a base member mounted at a place where electronic equipment is installed;

a mounting member on which the electronic equipment is mounted, and which is supported by the base member so as to freely swing about a horizontal base support shaft axis; and an arm member supported by the mounting member so as to freely swing about a mounting member support shaft axis extending horizontally, which sets a mounting angle of the electronic equipment by being latched by the base member; whereby the electronic equipment is mounted at a prescribed angle;

wherein the base member further comprises a falling-out prevention portion for preventing the arm member from coming out;

wherein the arm member further comprises an arm pulling-out prevention portion which engages the falling-out prevention portion of the base member; and wherein the arm member comprises an arm guide portion for releasing latching of an arm latching portion.

* * * * *